US008126742B2

(12) United States Patent
Bond, Jr. et al.

(10) Patent No.: US 8,126,742 B2
(45) Date of Patent: Feb. 28, 2012

(54) AUTOMATED ASSIGNMENT OF INSURABLE EVENTS

(75) Inventors: William E. Bond, Jr., New York, NY (US); Michael A. Jackowski, Crystal Lake, IL (US); Hussein Hezarkhani, Mendham, NJ (US); Joseph J. Allogio, Sussex, NJ (US); Cynthia S. Benes, Chicago, IL (US); Michael R. Krans, Denver, CO (US); Josh Doyle, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1405 days.

(21) Appl. No.: 10/434,827

(22) Filed: May 9, 2003

(65) Prior Publication Data

US 2004/0225535 A1 Nov. 11, 2004

(51) Int. Cl.
*G06Q 99/00* (2006.01)
(52) U.S. Cl. .......................................................... 705/4
(58) Field of Classification Search .................. 705/4
See application file for complete search history.

(56) References Cited

U.S. PATENT DOCUMENTS 4,648,037 A 3/1987 Valentino
(Continued)

FOREIGN PATENT DOCUMENTS

EP 0841612 A2 5/1998
(Continued)

OTHER PUBLICATIONS

Rayner, et al., While the Industry Had Sufficient Funds Available to Handle the Sep. 11 Claims, Insurers Say They Must Raise Rates Now to Help Rebuild Capacity and to Adjust for Higher Levels of Risk, Feb. 4, 2002, Richmond Times—Dispatch. Richmond, Va.: Feb. 4, 2002. p. D.16.*

(Continued)

*Primary Examiner* — Thomas M Hammond, III
(74) *Attorney, Agent, or Firm* — Brinks Hofer Gilson & Lione

(57) ABSTRACT

An automated assignment system may operate with a computer to automatically assign insurable events to one or more organizational entities associated with an insurance organization. The automated assignment system may categorize the insurable event. In addition, the automated assignment system may identify at least one target organizational entity based on the categorization that is capable of handling the insurable event. Identification of the target organizational entity or entities may be a function of properties associated with the insurable event and the availability of the organizational entity or entities. Automatic assignment may also be a function of the current workload of the target organizational entity or entities.

39 Claims, 11 Drawing Sheets

U.S. PATENT DOCUMENTS

| | | | |
|---|---|---|---|
| 4,713,755 A | 12/1987 | Worley, Jr. et al. | |
| 4,796,181 A * | 1/1989 | Wiedemer | 705/52 |
| 4,831,526 A | 5/1989 | Luchs et al. | |
| 4,975,840 A * | 12/1990 | DeTore et al. | 705/4 |
| 5,093,794 A * | 3/1992 | Howie et al. | 700/100 |
| 5,128,859 A | 7/1992 | Carbone et al. | |
| 5,181,162 A | 1/1993 | Smith et al. | |
| 5,182,705 A | 1/1993 | Barr et al. | |
| 5,191,522 A | 3/1993 | Bosco et al. | |
| 5,208,748 A | 5/1993 | Flores et al. | |
| 5,216,603 A | 6/1993 | Flores et al. | |
| 5,241,664 A | 8/1993 | Ohba et al. | |
| 5,253,362 A | 10/1993 | Nolan et al. | |
| 5,307,262 A | 4/1994 | Ertel | 364/413.01 |
| 5,325,291 A | 6/1994 | Garrett et al. | |
| 5,367,619 A | 11/1994 | Dipaolo et al. | |
| 5,392,428 A | 2/1995 | Robins | |
| 5,404,518 A | 4/1995 | Gilbertson et al. | |
| 5,420,973 A | 5/1995 | Dagdeviren | |
| 5,445,653 A | 8/1995 | Hixson et al. | |
| 5,446,653 A | 8/1995 | Miller et al. | |
| 5,523,942 A | 6/1996 | Tyler et al. | |
| 5,530,861 A | 6/1996 | Diamant et al. | |
| 5,557,515 A * | 9/1996 | Abbruzzese et al. | 705/9 |
| 5,581,682 A | 12/1996 | Anderson et al. | |
| 5,592,611 A | 1/1997 | Midgely et al. | |
| 5,613,108 A | 3/1997 | Morikawa | |
| 5,627,764 A | 5/1997 | Schutzman et al. | |
| 5,630,069 A | 5/1997 | Flores et al. | |
| 5,632,015 A | 5/1997 | Zimowski et al. | |
| 5,640,501 A | 6/1997 | Turpin | |
| 5,649,182 A | 7/1997 | Reitz | |
| 5,655,085 A | 8/1997 | Ryan et al. | |
| 5,664,109 A | 9/1997 | Johnson et al. | |
| 5,671,360 A | 9/1997 | Hambrick et al. | |
| 5,673,402 A | 9/1997 | Ryan et al. | |
| 5,675,745 A | 10/1997 | Oku et al. | |
| 5,687,385 A | 11/1997 | Janay | |
| 5,692,501 A | 12/1997 | Minturn | 128/630 |
| 5,701,400 A | 12/1997 | Amado | |
| 5,706,452 A | 1/1998 | Ivanov | |
| 5,721,913 A | 2/1998 | Ackroff et al. | |
| 5,721,940 A | 2/1998 | Luther et al. | |
| 5,724,575 A | 3/1998 | Hoover et al. | |
| 5,726,884 A | 3/1998 | Sturgeon et al. | |
| 5,734,837 A | 3/1998 | Flores et al. | |
| 5,742,836 A | 4/1998 | Turpin et al. | |
| 5,745,687 A | 4/1998 | Randell | |
| 5,745,901 A | 4/1998 | Entner et al. | |
| 5,752,055 A | 5/1998 | Redpath et al. | |
| 5,758,351 A | 5/1998 | Gibson et al. | |
| 5,765,170 A | 6/1998 | Morikawa | |
| 5,768,506 A | 6/1998 | Randell | |
| 5,790,116 A | 8/1998 | Malone et al. | |
| 5,799,297 A | 8/1998 | Goodridge et al. | |
| 5,809,318 A | 9/1998 | Rivette et al. | |
| 5,809,478 A | 9/1998 | Greco et al. | |
| 5,819,230 A | 10/1998 | Christie et al. | |
| 5,826,020 A | 10/1998 | Randell | |
| 5,826,237 A | 10/1998 | Macrae et al. | |
| 5,826,239 A | 10/1998 | Du et al. | |
| 5,836,011 A | 11/1998 | Hambrick et al. | |
| 5,839,112 A | 11/1998 | Schreitmueller et al. | |
| 5,845,289 A | 12/1998 | Baumeister et al. | |
| 5,848,271 A | 12/1998 | Caruso et al. | |
| 5,848,393 A | 12/1998 | Goodridge et al. | |
| 5,855,005 A | 12/1998 | Schuler et al. | |
| 5,860,066 A | 1/1999 | Rouse | |
| 5,862,327 A | 1/1999 | Kwang et al. | |
| 5,867,385 A | 2/1999 | Brown et al. | |
| 5,870,711 A * | 2/1999 | Huffman | 705/8 |
| 5,873,066 A | 2/1999 | Underwood et al. | |
| 5,875,330 A | 2/1999 | Goti | |
| 5,881,230 A | 3/1999 | Christensen et al. | |
| 5,884,256 A | 3/1999 | Bennett et al. | |
| 5,886,693 A | 3/1999 | Ho et al. | |
| 5,890,130 A | 3/1999 | Cox et al. | |
| 5,890,133 A | 3/1999 | Ernst | |
| 5,899,989 A | 5/1999 | Ikeuchi et al. | |
| 5,903,873 A | 5/1999 | Peterson et al. | |
| 5,907,828 A | 5/1999 | Meyer et al. | |
| 5,920,696 A | 7/1999 | Brandt et al. | |
| 5,925,100 A | 7/1999 | Drewry et al. | |
| 5,940,804 A | 8/1999 | Turley et al. | |
| 5,946,694 A | 8/1999 | Copeland et al. | |
| 5,950,169 A * | 9/1999 | Borghesi et al. | 705/4 |
| 5,956,687 A | 9/1999 | Wamsley et al. | |
| 5,970,464 A | 10/1999 | Apte et al. | |
| 5,974,390 A | 10/1999 | Ross | |
| 5,987,247 A | 11/1999 | Lau | |
| 5,991,733 A | 11/1999 | Aleia et al. | |
| 5,999,911 A | 12/1999 | Berg et al. | |
| 6,002,396 A | 12/1999 | Davies | |
| 6,003,007 A | 12/1999 | DiRienzo | |
| 6,003,011 A | 12/1999 | Sarin et al. | |
| 6,012,066 A | 1/2000 | Discount et al. | |
| 6,021,418 A | 2/2000 | Brandt et al. | |
| 6,023,572 A | 2/2000 | Lautzenheiser et al. | |
| 6,023,578 A | 2/2000 | Birsan et al. | |
| 6,028,997 A | 2/2000 | Leymann et al. | |
| 6,038,590 A | 3/2000 | Gish | |
| 6,041,304 A | 3/2000 | Meyer et al. | |
| 6,044,382 A | 3/2000 | Martino | |
| 6,044,384 A | 3/2000 | Ishima et al. | |
| 6,049,773 A * | 4/2000 | McCormack et al. | 705/4 |
| 6,055,519 A | 4/2000 | Kennedy et al. | |
| 6,058,413 A | 5/2000 | Flores et al. | |
| 6,061,665 A | 5/2000 | Bahreman et al. | |
| 6,065,000 A | 5/2000 | Jensen | |
| 6,065,009 A | 5/2000 | Leymann et al. | |
| 6,067,525 A | 5/2000 | Johnson et al. | |
| 6,070,152 A | 5/2000 | Carey et al. | |
| 6,073,109 A | 6/2000 | Flores et al. | |
| 6,076,066 A | 6/2000 | DiRienzo et al. | |
| 6,078,890 A | 6/2000 | Mangin et al. | |
| 6,098,070 A | 8/2000 | Maxwell | |
| 6,108,673 A | 8/2000 | Brandt et al. | |
| 6,112,190 A | 8/2000 | Fletcher et al. | 705/38 |
| 6,115,646 A | 9/2000 | Fiszman et al. | |
| 6,119,093 A | 9/2000 | Walker et al. | |
| 6,125,363 A | 9/2000 | Buzzeo et al. | |
| 6,131,155 A | 10/2000 | Alexander et al. | |
| 6,134,536 A | 10/2000 | Shepherd | 705/37 |
| 6,141,011 A | 10/2000 | Bodnar et al. | |
| 6,151,660 A | 11/2000 | Aoki | |
| 6,158,044 A | 12/2000 | Tibbetts | |
| 6,163,781 A | 12/2000 | Wess, Jr. | |
| 6,163,784 A | 12/2000 | Taguchi | |
| 6,170,002 B1 * | 1/2001 | Ouchi | 709/206 |
| 6,182,274 B1 | 1/2001 | Lau | |
| 6,199,099 B1 | 3/2001 | Gershman et al. | |
| 6,223,164 B1 | 4/2001 | Seare et al. | 705/2 |
| 6,230,169 B1 | 5/2001 | Nagae | |
| 6,233,537 B1 | 5/2001 | Gryphon et al. | |
| 6,253,369 B1 | 6/2001 | Cloud et al. | |
| 6,256,636 B1 | 7/2001 | Choy | |
| 6,266,645 B1 | 7/2001 | Simpson | 705/3 |
| 6,266,666 B1 | 7/2001 | Ireland et al. | |
| 6,272,482 B1 * | 8/2001 | McKee et al. | 706/47 |
| 6,278,977 B1 | 8/2001 | Agrawal et al. | |
| 6,279,009 B1 | 8/2001 | Smirnov et al. | |
| 6,289,348 B1 | 9/2001 | Richard et al. | |
| 6,289,385 B1 | 9/2001 | Whipple et al. | |
| 6,308,224 B1 | 10/2001 | Leymann et al. | |
| 6,311,192 B1 | 10/2001 | Rosenthal et al. | |
| 6,321,133 B1 | 11/2001 | Smirnov et al. | |
| 6,321,374 B1 | 11/2001 | Choy | |
| 6,327,046 B1 | 12/2001 | Miyamoto et al. | |
| 6,330,541 B1 | 12/2001 | Meyer et al. | |
| 6,332,155 B1 | 12/2001 | Notani | |
| 6,334,146 B1 | 12/2001 | Parasnis et al. | |
| 6,336,096 B1 | 1/2002 | Jernberg | |
| 6,343,271 B1 * | 1/2002 | Peterson et al. | 705/4 |
| 6,347,303 B2 | 2/2002 | Nagai et al. | |
| 6,349,238 B1 | 2/2002 | Gabbita et al. | |
| 6,349,320 B1 | 2/2002 | Emberton et al. | |
| 6,356,905 B1 | 3/2002 | Gershman et al. | |

| | | |
|---|---|---|
| 6,370,508 B2 | 4/2002 | Beck et al. |
| 6,380,951 B1 | 4/2002 | Petchenkine et al. |
| 6,389,588 B1 | 5/2002 | Wadhwa et al. |
| 6,393,431 B1 | 5/2002 | Salvati et al. |
| 6,393,456 B1 | 5/2002 | Ambler et al. |
| 6,397,191 B1 | 5/2002 | Notani et al. |
| 6,397,192 B1 | 5/2002 | Notani et al. |
| 6,415,259 B1 | 7/2002 | Wolfinger et al. |
| 6,426,759 B1 | 7/2002 | Ting et al. |
| 6,442,528 B1 | 8/2002 | Notani et al. |
| 6,442,557 B1 | 8/2002 | Buteau et al. |
| 6,442,563 B1 | 8/2002 | Bacon et al. |
| 6,470,303 B2 | 10/2002 | Kidd et al. |
| 6,493,675 B1 | 12/2002 | Kanaya et al. |
| 6,501,832 B1 | 12/2002 | Saylor et al. |
| 6,505,176 B2 | 1/2003 | DeFrancesco, Jr. et al. |
| 6,516,322 B1 | 2/2003 | Meredith |
| 6,519,578 B1 | 2/2003 | Reddy |
| 6,535,883 B1 | 3/2003 | Lee et al. |
| 6,546,396 B1 | 4/2003 | Borkowski et al. |
| 6,549,893 B1 | 4/2003 | Lannert et al. |
| 6,567,783 B1 | 5/2003 | Notani et al. |
| 6,574,636 B1 | 6/2003 | Balon et al. ............ 707/103 |
| 6,606,740 B1 | 8/2003 | Lynn et al. |
| 6,625,602 B1 | 9/2003 | Meredith et al. |
| 6,632,251 B1 | 10/2003 | Rutten et al. |
| 6,651,060 B1 | 11/2003 | Harper et al. |
| 6,671,692 B1 | 12/2003 | Marpe et al. |
| 6,671,693 B1 | 12/2003 | Marpe et al. |
| 6,671,716 B1 | 12/2003 | Diedrichsen et al. |
| 6,679,959 B2 | 1/2004 | Boyd et al. |
| 6,684,190 B1 | 1/2004 | Powers et al. |
| 6,687,557 B2 | 2/2004 | Ouchi |
| 6,687,878 B2 | 2/2004 | Eintracht et al. |
| 6,697,784 B2 | 2/2004 | Bacon et al. |
| 6,714,914 B1 | 3/2004 | Peters et al. |
| 6,725,224 B1 | 4/2004 | McCarthy et al. |
| 6,728,947 B1 | 4/2004 | Bengston |
| 6,738,736 B1 | 5/2004 | Bond |
| 6,738,757 B1 | 5/2004 | Wynne et al. |
| 6,763,353 B2 | 7/2004 | Li et al. |
| 6,768,984 B2 | 7/2004 | Allen et al. |
| 6,769,112 B1 | 7/2004 | Montana et al. |
| 6,810,383 B1 * | 10/2004 | Loveland ............ 705/9 |
| 6,826,579 B1 | 11/2004 | Leymann et al. |
| 6,832,368 B1 | 12/2004 | Zimowski |
| 6,862,732 B1 | 3/2005 | Schultz et al. |
| 6,868,193 B1 | 3/2005 | Gharbia et al. |
| 6,874,008 B1 | 3/2005 | Eason et al. |
| 6,877,153 B2 | 4/2005 | Konnersman |
| 6,879,959 B1 | 4/2005 | Chapman et al. |
| 6,888,929 B1 | 5/2005 | Saylor et al. |
| 6,889,375 B1 | 5/2005 | Chan et al. |
| 6,895,084 B1 | 5/2005 | Saylor et al. |
| 6,896,574 B2 | 5/2005 | Needham et al. |
| 6,898,574 B1 | 5/2005 | Regan |
| 6,901,405 B1 | 5/2005 | McCrady et al. |
| 6,918,053 B1 | 7/2005 | Thatte et al. |
| 6,920,456 B2 | 7/2005 | Lee et al. |
| 6,925,593 B1 | 8/2005 | Knutson et al. |
| 6,928,487 B2 | 8/2005 | Eggebraaten et al. |
| 6,937,990 B1 | 8/2005 | Walker et al. |
| 6,938,030 B1 | 8/2005 | Simone, Jr. et al. |
| 6,944,603 B2 * | 9/2005 | Bergan et al. ............ 706/45 |
| 6,950,801 B2 * | 9/2005 | Brookes et al. ............ 705/7 |
| 6,952,679 B1 | 10/2005 | Pulford |
| 6,970,931 B1 | 11/2005 | Bellamy et al. |
| 6,975,914 B2 | 12/2005 | DeRemer et al. |
| 6,993,528 B1 | 1/2006 | Aver et al. |
| 7,000,186 B1 | 2/2006 | Gropper et al. |
| 7,007,227 B1 | 2/2006 | Constantino et al. |
| 7,013,284 B2 | 3/2006 | Guyan et al. |
| 7,013,309 B2 | 3/2006 | Chakraborty et al. |
| 7,039,597 B1 | 5/2006 | Notani et al. |
| 7,047,535 B2 | 5/2006 | Lee et al. |
| 7,051,036 B2 | 5/2006 | Rosnow et al. |
| 7,051,071 B2 | 5/2006 | Stewart et al. |
| 7,051,072 B2 | 5/2006 | Stewart et al. |
| 7,051,074 B1 | 5/2006 | Buchsbaum et al. |
| 7,054,887 B2 | 5/2006 | Kozina |
| 7,065,504 B2 | 6/2006 | Sakuma et al. |
| 7,069,536 B2 | 6/2006 | Yaung |
| 7,076,504 B1 | 7/2006 | Handel et al. |
| 7,100,147 B2 | 8/2006 | Miller et al. |
| 7,110,952 B2 | 9/2006 | Kursh |
| 7,113,913 B1 | 9/2006 | Davis et al. |
| 7,117,271 B2 | 10/2006 | Haverstock et al. |
| 7,124,203 B2 | 10/2006 | Joshi et al. |
| 7,150,000 B1 | 12/2006 | Feldman |
| 7,171,647 B1 | 1/2007 | Smith et al. |
| 7,181,427 B1 | 2/2007 | De Francesco et al. |
| 7,184,967 B1 | 2/2007 | Mital et al. |
| 7,188,073 B1 | 3/2007 | Tam et al. |
| 7,194,679 B1 | 3/2007 | Green |
| 7,203,654 B2 | 4/2007 | Menendez ............ 705/4 |
| 7,216,163 B2 | 5/2007 | Sinn |
| 7,219,050 B2 | 5/2007 | Ishikawa et al. |
| 7,228,547 B2 | 6/2007 | Yaung |
| 7,242,991 B2 | 7/2007 | Budinger et al. |
| 7,249,157 B2 | 7/2007 | Stewart et al. |
| 7,249,180 B2 | 7/2007 | Erickson et al. |
| 7,269,621 B2 | 9/2007 | Chang et al. |
| 7,269,718 B2 | 9/2007 | Alexander, III et al. |
| 7,296,056 B2 | 11/2007 | Yaung |
| 7,305,488 B2 | 12/2007 | Wallace et al. |
| 7,310,607 B2 | 12/2007 | Brandt et al. |
| 7,337,121 B1 | 2/2008 | Beinat et al. ............ 705/3 |
| 7,398,218 B1 * | 7/2008 | Bernaski et al. ............ 705/3 |
| 7,617,240 B2 | 11/2009 | Guyan et al. |
| 7,933,786 B2 | 4/2011 | Wargin et al. |
| 7,979,382 B2 | 7/2011 | Guyan et al. |
| 2002/0035488 A1 * | 3/2002 | Aquila et al. ............ 705/4 |
| 2002/0165739 A1 | 11/2002 | Guyan et al. ............ 705/4 |
| 2002/0188674 A1 | 12/2002 | Brown et al. |
| 2003/0009357 A1 | 1/2003 | Pish ............ 705/4 |
| 2003/0023473 A1 | 1/2003 | Guyan et al. ............ 705/9 |
| 2003/0145124 A1 | 7/2003 | Guyan et al. ............ 709/318 |
| 2003/0154172 A1 | 8/2003 | Guyan et al. ............ 705/80 |
| 2003/0200527 A1 | 10/2003 | Lynn et al. |
| 2005/0149376 A1 | 7/2005 | Guyan et al. |
| 2005/0246206 A1 | 11/2005 | Obora et al. |
| 2006/0155622 A1 * | 7/2006 | Laux ............ 705/35 |
| 2006/0218017 A1 | 9/2006 | Ren et al. |
| 2007/0005463 A1 | 1/2007 | Davis et al. |
| 2007/0100669 A1 * | 5/2007 | Wargin et al. ............ 705/4 |
| 2007/0156463 A1 | 7/2007 | Burton et al. |
| 2007/0255601 A1 | 11/2007 | Heydon et al. |

FOREIGN PATENT DOCUMENTS

| | | |
|---|---|---|
| EP | 0844558 A2 | 5/1998 |
| EP | 0854431 A2 | 7/1998 |
| EP | 0897149 A1 | 2/1999 |
| JP | 11-353234 A2 | 12/1999 |
| WO | WO 8401448 A1 | 4/1984 |
| WO | WO 9108543 A1 | 6/1991 |
| WO | WO 9300643 A1 | 1/1993 |
| WO | WO 9416395 A1 | 7/1994 |
| WO | WO 9503569 A2 | 2/1995 |
| WO | WO 9631828 A1 | 10/1996 |
| WO | WO 9812616 A2 | 3/1998 |
| WO | WO 9821680 A1 | 5/1998 |
| WO | WO 9838563 A2 | 9/1998 |
| WO | WO 00/67182 A1 | 11/2000 |
| WO | WO 00/067186 | 11/2000 |
| WO | WO 0067180 A2 | 11/2000 |
| WO | WO 0067181 A2 | 11/2000 |
| WO | WO 0067182 A2 | 11/2000 |
| WO | WO 0067184 A2 | 11/2000 |
| WO | WO 0067186 A2 | 11/2000 |

OTHER PUBLICATIONS

Irina, Is Your Insurance Healthy?, 2003, available: http://aids.hallym.ac.kr/success/018/r0152.html.?, 2003, available: http://aids.hallym.ac.kr/success/018/r0152.html.*

Jennings, CRS Report for Congress, Sep. 11 Insurance Litigation, Jun. 14, 2002, Order Code RS21158.*

Falsey, Promises of 'higher rates of return' miss the point, Mar. 20, 2005, Anchorage Daily News, Section: Ideas; p. K3.*
McCall, Grant Watch, 1991, Health Affairs, Spring 1991, p. 164-176.*
Accenture, Accenture to Implement Claim Components Solution for OneBeacon Insurance, Jan. 10, 2002, available: http://www.accenture.com.*
Georgakopoulos, An Overview of Workflow Management: From Process Modeling to Workflow Automation Infrastructure, 1995, Distributed and Parallel Databases, 3, 119-153 (1995).*
Zhao, Temporal workflow management in a claim handling system, 1999, ACM SIGSOFT Software Engineering Notes, vol. 24, Issue 2, pp. 187-195.*
Bloss, Code optimizations for lazy evaluation, Sep. 1988, Lisp and Symbolic Computation, vol. 1, p. 147-164.*
Duda, Pattern Classification, 2001, John Wiley & Sons, Inc., p. vii-xx, Chapter I.*
U.S. Appl. No. 09/649,766, filed Aug. 28, 2000, Bernaski et al., non-published application.
Anonymous, Accountancy, "Proposals to admit corporate capital lift off," Nov. 1993, vol. 112, Iss. 1203, p. 57, 1 pg. (3 printed pages).
Anonymous, National Underwriter, "Market Mix," Property & casualty/risk & benefits management ed.), Erlanger: Jun. 21, 1993, vol. 97, Iss. 25, p. 47, 1 pg. (2 printed pages).
Patent Owner's Response with Appendices dated Jan. 3, 2011, for merged Reexamination Nos. 90/010,201 and 90/010,713 regarding commonly owned U.S. Patent No. 7,013,284. 928 pgs. (Document filed in 25 parts).
Final Office Action mailed Feb. 4, 2011 for Reexamination No. 90/010,735 regarding commonly owned U.S. Patent No. 7,617,240. 22 pgs.
Notice of Allowance mailed Feb. 7, 2011, for commonly owned U.S. Appl. No. 11/264,115, filed Nov. 1, 2005. 24 pgs.
U.S. Patent 7,013,284 Re-Examination Request Application No. 90/011,484, filed Feb. 10, 2011. 90 pgs.
Exhibit D—Archived description of the Diamond product from Applied Systems, published at least by Jul. 15, 1997, filed in U.S. Patent 7,013,284 Re-Examination Request Application No. 90/011,484, filed Feb. 10, 2011. 8 pgs.
Exhibit I—Claim Interpretations, filed in U.S. Patent 7,013,284 Re-Examination Request Application No. 90/011,484, filed Feb. 10, 2011. 18 pgs.
Exhibit J—Claims Charts for Claims 1-40 based on Flores and Abbruzzese under 35 U.S.C. § 103, filed in U.S. Patent 7,013,284 Re-Examination Request Application No. 90/011,484, filed Feb. 10, 2011. 207 pgs.
Exhibit K—Claim Chart for Claims 1-40 based on Flores, Diamond and Abbruzzese under 35 U.S.C. § 103, filed in U.S. Patent 7,013,284 Re-Examination Request Application No. 90/011,484, filed Feb. 10, 2011. 186 pgs.
Exhibit L—Claim Chart for Claims 1-40 based on Flores, Borghesi, and Abbruzzese under 35 U.S.C. § 103, filed in U.S. Patent 7,013,284 Re-Examination Request Application No. 90/011,484, filed Feb. 10, 2011. 181 pgs.
Exhibit M—Claim Chart for Claims 1-40 based on Lynn and Abbruzzese under 35 U.S.C. § 103, filed in U.S. Patent 7,013,284 Re-Examination Request Application No. 90/011,484, filed Feb. 10, 2011. 138 pgs.
Exhibit N—Claim Chart for Charts 1-40 based on Schutzman and Abbruzzese under 35 U.S.C. § 103, filed in U.S. Patent 7,013,284 Re-Examination Request Application No. 90/011,484, filed Feb. 10, 2011. 119 pgs.
Exhibit O—Claim Chart for Charts 1-40 based on Caruso and Abbruzzese under 35 U.S.C. § 103, filed in U.S. Patent 7,013,284 Re-Examination Request Application No. 90/011,484, filed Feb. 10, 2011. 102 pgs.
Exhibit P—Action Finishes 1995 with Strong Dec. Sales, PR Newswire, Jan. 1996, filed in U.S. Patent 7,013,284 Re-Examination Request Application No. 90/011,484, filed Feb. 10, 2011. 3 pgs.
Request for Continued Examination filed Feb. 18, 2011, for commonly owned U.S. Appl. No. 09/305,146, filed May 4, 1999. 2 pgs.
Interview Summary dated Mar. 3, 2011 in Reexamination (Control No. 90/010,735) filed Nov. 10, 2009, for commonly owned U.S. Patent No. 7,617,240. 49 pgs.
Order Granting Re-Examination (Control No. 90/011,484) dated Mar. 4, 2011, for commonly owned U.S. Patent No. 7,013,284. 15 pgs.
Notice of Allowance issued Mar. 7, 2011, for commonly owned U.S. Appl. No. 09/305,146. 5 pgs.
Guidewire Software, Inc.'s Dec. 2, 2010 Answering Brief in Opposition to Accenture's Motion to Strike Allegations in Guidewire's Amended Answer and Counterclaims, in lawsuit asserting U.S. Patent No. 7,617,240, captioned *Accenture Global Services GmbH, et al. v. Guidewire Software, Inc.*, Case No. 09cv848, D. Del. Nov. 10, 2009, Dkt.No. 70, 22 pgs.
Accenture Global Service's GmbH and Accenture LLP's Jan. 18, 2011 Response to Guidewire, Inc.'s Third Set of Interrogatories, in lawsuit asserting U.S. Patent No. 7,617,240, captioned *Accenture Global Services GmbH, et al. v. Guidewire Software, Inc.*, Case No. 09cv848, D. Del. Nov. 10, 2009, 8 pgs.
Defendant Guidewire Software, Inc.'s Feb. 28, 2011 Supplemental Objections and Response to Accenture's Interrogatory No. 4, in lawsuit asserting U.S. Patent No. 7,617,240, captioned *Accenture Global Services GmbH, et al. v. Guidewire Software, Inc.*, Case No. 09cv848, D. Del. Nov. 10, 2009, 6 pgs.
Accenture Global Services GmbH, and Accenture LLP's Supplemental Response to Interrogatories Nos. 7 and 8, dated Mar. 11, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009, 15 pgs.
Exhibit F of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based on Access 97, 22 pgs.
Exhibit G of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based on '109 Patent (Flores), 22 pgs.
Exhibit H of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based on '764 Patent (Schutzman), 27 pgs.
Exhibit J of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based on '169 Patent (Borghesi) ,27 pgs.
Exhibit K of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based '247 Patent (Lau), 37 pgs.
Exhibit L of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based on '740 Patent (Lynn), 27 pgs.
Exhibit M of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based on '271 Patent (Caruso), 33 pgs.
Exhibit N of Accenture Global Services GmbH, and Accenture LLP's Mar. 11, 2011 Supplemental Response to Interrogatories Nos. 7 and 8—Rebuttal of Guidewire's Invalidity Assertions Against '240 Patent Based on Agarwal, 22 pgs.
Defendant Guidewire Software, Inc.'s Mar. 29, 2011 Redacted Supplemental Objections and Response to Accenture's Interrogatory No. 3, in lawsuit asserting U.S. Patent No. 7,617,240, captioned *Accenture Global Services GmbH, et al. v. Guidewire Software, Inc.*, Case No. 09cv848, D. Del. Nov. 10, 2009, 24 pgs.
Exhibit C of Defendant Guidewire Software, Inc.'s Mar. 29, 2011 Redacted Supplemental Objections and Response to Accenture's Interrogatory No. 3 (Microsoft TODD, as cited in Mar. 14, 2001 and Dec. 3, 2001 Office Actions in 284 Patent File History)—Guidewire Invalidity Contentions Invalidity Claim Chart for '240 Patent, 19 pgs.
Exhibit F of Defendant Guidewire Software, Inc.'s Mar. 29, 2011 Redacted Supplemental Objections and Response to Accenture's Interrogatory No. 3 (Microsoft Access 97)—Guidewire Invalidity Contentions Invalidity Claim Chart for '240 Patent, 15 pgs.
Exhibit G of Defendant Guidewire Software, Inc.'s Mar. 29, 2011 Redacted Supplemental Objections and Response to Accenture's Interrogatory No. 3 ('109 Patent (Flores))—Guidewire Invalidity Contentions Invalidity Claim Chart for '240 Patent, 42 pgs.
Exhibit H of Defendant Guidewire Software, Inc.'s Mar. 29, 2011 Redacted Supplemental Objections and Response to Accenture's Interrogatory No. 3 ('764 Patent (Shutzman)—Guidewire Invalidity Contentions Invalidity Claim Chart for '240 Patent, 73 pgs.
Exhibit J of Defendant Guidewire Software, Inc.'s Mar. 29, 2011 Redacted Supplemental Objections and Response to Accenture's Interrogatory No. 3 ('169 Patent (Borgheshi)—Guidewire Invalidity Contentions Invalidity Claim Chart for '240 Patent, 39 pgs.
Exhibit K of Defendant Guidewire Software, Inc.'s Mar. 29, 2011 Redacted Supplemental Objections and Response to Accenture's Interrogatory No. 3 ('247 Patent (Lau))—Guidewire Invalidity Contentions Invalidity Claim Chart for '240 Patent, 25 pgs.
Exhibit L of Defendant Guidewire Software, Inc.'s Mar. 29, 2011 Redacted Supplemental Objections and Response to Accenture's Interrogatory No. 3 ('740 Patent (Lynn)—Guidewire Invalidity Contentions Invalidity Claim Chart for '240 Patent, 44 pgs.
Exhibit M of Defendant Guidewire Software, Inc.'s Mar. 29, 2011 Redacted Supplemental Objections and Response to Accenture's Interrogatory No. 3 (271 Patent (Caruso))—Guidewire Invalidity Contentions Invalidity Claim Chart for '240 Patent, 39 pgs.
Exhibit O of Defendant Guidewire Software, Inc.'s Mar. 29, 2011 Redacted Supplemental Objections and Response to Accenture's Interrogatory No. 3 (Project Salsa)—Guidewire Invalidity Contentions Invalidity Claim Chart for '240 Patent, 44 pgs.
Accenture Global Services GmbH, Accenture LLP's and Guidewire Software, Inc.'s Joint Claim Construction Statement (Dkt #183) and Joint Claim Construction Chart—Exhibit A (Dkt #184) filed Apr. 11, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 6 pages.
Accenture's Opening Claim Construction Brief, filed Apr. 25, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. Dkt. No. 187. 22 pages.
Puustjarvi, Juha, Transactional Workflows. Department of Computer Science, University of Helsinki, Finland, 1999. pp. 1-116.
Smith et al., "Workflow is Just a PI Process", BP Trends, Jan. 2004. pp. 1-36.
Notice of Allowance issued Oct. 19, 2010, for commonly owned U.S. Appl. No. 09/305,146, filed May 4, 1999. 4 pages.
U.S. Office Action mailed on Nov. 9, 2010, for commonly owned U.S. Appl. No. 12/691,515, filed Jan. 21, 2010. 10 pages.
Examiner Interview Summary mailed Dec. 15, 2010, for merged Reexamination Nos. 90/010,201 and 90/010,713 regarding commonly owned U.S. Patent No. 7,013,284. 56 pages.
Examiner Interview Summary mailed Dec. 15, 2010, for Reexamination No. 90/010,735 regarding commonly owned U.S. Patent No. 7,617,240. 6 pages.
Patent Owner's Response with Appendices dated Dec. 27, 2010, for Reexamination No. 90/010,735 regarding commonly owned U.S. Patent No. 7,617,240. 1,103 pages. (Document filed in 26 parts).
Guidewire's Supplemental Reply Brief in Support of Its Motion for Partial Summary Judgment Regarding Invalidity of the '284 and 111 Patents as Claiming Unpatentable Subject Matter filed Aug. 26, 2010, *Accenture Global Services, Gmbh et al.* v. *Guidewire Software Inc.*, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. (Dkt No. 513). 10 pages.
Accenture's Brief in Opposition to Guidewire's Supplemental Brief in Support of Its Motion for Partial Summary Judgment of Invalidity as Claiming Unpatentable Subject Matter filed Oct. 15, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. (Dkt No. 514). 15 pages.
Guidewire's Amended Answer and Counterclaims to Accenture's Complaint for Patent Infringement filed Nov. 2, 2010, in lawsuit asserting U.S. Patent No. 7,617,240, captioned *Accenture Global Services GmbH, et al.* v. *Guidewire Software, Inc.*, Case No. 09cv848, D. Del. Nov. 10, 2009, (Dkt. No. 59). 17 pages.
Accenture's Opening Brief in Support of Motion to Strike Allegations in Defendant Guidewire's Amended Answer and Counterclaims filed Nov. 15, 2010, in lawsuit asserting U.S. Patent No. 7,617,240, captioned *Accenture Global Services GmbH, et al.* v. *Guidewire Software, Inc.*, Case No. 09cv848, D. Del. Nov. 10, 2009 (Dkt. No. 63). 23 pages.
Plaintiffs Accenture Global Service GmbH and Accenture LLP's Reply to Guidewire's Amended Counterclaims to Accenture's Complaint for Infringement of the '240 Patent filed Nov. 15, 2010, in lawsuit asserting U.S. Patent No. 7,617,240, captioned *Accenture Global Services GmbH, et al.* v. *Guidewire Software, Inc.*, Case No. 09cv848, D. Del. Nov. 10, 2009, (Dkt. No. 65). 8 pages.
Jun. 25, 2007 Response to Ex Parte Quayle dated May 18, 2007, for commonly owned U.S. Appl. No. 09/305,234, filed May 4, 1999. 10 pages.
Notice of Allowance and Fees Due, mailed Jan. 10, 2008, for commonly owned U.S. Appl. No. 09/305,234. 4 pages.
Apr. 10, 2008 Request for Continued Examination, for commonly owned U.S. Appl. No. 09/305,234, filed May 4, 1999. 2 pages.
Notice of Allowance mailed Apr. 30, 2008, for commonly owned U.S. Appl. No. 09/305,234, filed May 4, 1999. 4 pages.
Issue Notification dated Jun. 25, 2008, for commonly owned U.S. Appl. No. 09/305,234, filed May 4, 1999. 1 page.
Jul. 3, 2008 Request for Continued Examination, for commonly owned U.S. Appl. No. 09/305,234, filed May 4, 1999. 2 pages.
Notice of Withdrawal from Issue mailed Jul. 8, 2008, for commonly owned U.S. Appl. No. 09/305,234, filed May 4, 1999. 1 page.
U.S. Office Action mailed Aug. 1, 2008, for commonly owned U.S. Appl. No. 09/305,234, filed May 4, 1999. 6 pages.
Examiner Interview Summary mailed Oct. 27, 2008, for commonly owned U.S. Appl. No. 09/305,234, filed May 4, 1999. 2 pages.
Dec. 1, 2008 Response to the Non-Final Office Action mailed Aug. 1, 2008, for commonly owned U.S. Appl. No. 09/305,234, filed May 4, 1999. Dated Dec. 1, 2008. 22 pages.
Examiner's Amendment mailed Aug. 12, 2009, for commonly owned U.S. Appl. No. 09/305,234, filed May 4, 1999. 7 pages.
Notice of Allowance mailed Sep. 3, 2009, for commonly owned U.S. Appl. No. 09/305,234, filed May 4, 1999. 10 pages.
Request for Ex Parte Reexamination, including exhibits H,I,J, and K, dated Nov. 10, 2009, for commonly owned U.S. Appl. No. 09/305,234, filed May 4, 1999 and later assigned Application No. 90/010,735. 831 pages.
Dec. 16, 2009 Report on the Filing or Determination of an Action Regarding a Patent or Trademark, for commonly owned U.S. Appl. No. 09/305,234, filed May 4, 1999. 1 page.
Order Granting Ex Parte Reeexamination mailed Jan. 7, 2010, for commonly owned U.S. Appl. No. 09/305,234 filed May 4, 1999 and later assigned Application No. 90/010,735. 17 pages.
U.S. Office Action mailed Mar. 9, 2001, for commonly owned U.S. Appl. No. 09/305,146, filed May 4, 1999. 6 pages.
Sep. 10, 2001 Amendment and Response to Office Action mailed Mar. 9, 2001, for commonly owned U.S. Appl. No. 09/305,146, filed May 4, 1999. 7 pages.
U.S. Office Action mailed Dec. 4, 2001, for commonly owned U.S. Appl. No. 09/305,146, filed May 4, 1999. 7 pages.
Preliminary Amendment dated Apr. 19, 2002, for commonly owned U.S. Appl. No. 09/305,146, filed May 4, 1999. 12 pages.
Continuing Prosecution Application (ACPA) dated Apr. 19, 2002, for commonly owned U.S. Appl. No. 09/305,146, filed May 4, 1999. 2 pages.
U.S. Office Action mailed May 6, 2002, for commonly owned U.S. Appl. No. 09/305,146, filed May 4, 1999. 6 pages.
Amendment dated Jul. 3, 2002, for commonly owned U.S. Appl. No. 09/305,146, filed May 4, 1999. 10 pages.
Advisory Action mailed Jul. 23, 2002, for commonly owned U.S. Appl. No. 09/305,146, filed May 4, 1999. 3 pages.
Request for Continued Examination and Amendment dated Oct. 7, 2002, for commonly owned U.S. Appl. No. 09/305,146, filed May 4, 1999. 14 pages.

Jan. 9, 2003 Supplemental Response and Request for Continued Examination, for commonly owned U.S. Appl. No. 09/305,146, filed May 4, 1999. 14 pages.
Jan. 17, 2003 Request for Corrected RCE Filing, for commonly owned U.S. Appl. No. 09/305,146, filed May 4, 1999. 5 pages.
U.S. Office Action mailed Mar. 18, 2003, for commonly owned U.S. Appl. No. 09/305,146, filed May 4, 1999. 6 pages.
Amendment dated Jun. 17, 2003, for commonly owned U.S. Appl. No. 09/305,146, filed May 4, 1999. 7 pages.
U.S. Office Action mailed Nov. 13, 2003, for commonly owned U.S. Appl. No. 09/305,146, filed May 4, 1999. 6 pages.
Proposed Amendment for Rce for personal Interview on Feb. 3, 2004 dated Jan. 29, 2004, for commonly owned U.S. Appl. No. 09/305,146, filed May 4, 1999. 8 pages.
Interview Summary dated Feb. 3, 2004, for commonly owned U.S. Appl. No. 09/305,146, filed May 4, 1999. 2 pages.
Amendment dated Feb. 13, 2004, for U.S. Appl. No. 09/305,146, filed May 4, 1999. 7 pages.
Request for Continued Examination dated Feb. 13, 2004, for commonly owned U.S. Appl. No. 09/305,146, filed May 4, 1999. 2 pages.
U.S. Office Action mailed May 20, 2004, for commonly owned U.S. Appl. No. 09/305,146, filed May 4, 1999. 6 pages.
Amendment dated Aug. 20, 2004, for commonly owned U.S. Appl. No. 09/305,146, filed May 4, 1999. 11 pages.
U.S. Office Action mailed Jan. 21, 2005, for commonly owned U.S. Appl. No. 09/305,146, filed May 4, 1999. 7 pages.
Mar. 21, 2005 Amendment and Response to Office Action mailed Jan. 21, 2005, for commonly owned U.S. Appl. No. 09/305,146, filed May 4, 1999. 11 pages.
Advisory Action mailed Apr. 28, 2005, for commonly owned U.S. Appl. No. 09/305,146, filed May 4, 1999. 3 pages.
Request for Continued Examination dated May 31, 2005, for commonly owned U.S. Appl. No. 09/305,146, filed May 4, 1999. 2 pages.
Amendment dated May 31, 2005, for commonly owned U.S. Appl. No. 09/305,146, filed May 4, 1999. 11 pages.
U.S. Office Action mailed Aug. 23, 2005, for commonly owned U.S. Appl. No. 09/305,146, filed May 4, 1999. 5 pages.
Amendment dated Nov. 22, 2005, for commonly owned U.S. Appl. No. 09/305,146, filed May 4, 1999. 14 pages.
U.S. Office Action mailed Feb. 24, 2006, for commonly owned U.S. Appl. No. 09/305,146, filed May 4, 1999. 7 pages.
Pre-Appeal Brief Request for Review dated Apr. 24, 2006, for commonly owned U.S. Appl. No. 09/305,146, filed May 4, 1999. 5 pages.
Notice of Appeal dated Apr. 24, 2006, for commonly owned U.S. Appl. No. 09/305,146, filed May 4, 1999. 1 page.
Appeal Brief dated Jul. 24, 2006, for commonly owned U.S. Appl. No. 09/305,146, filed May 4, 1999. 28 pages.
Notification of Non-Compliant Appeal Brief mailed Oct. 13, 2006, for commonly owned U.S. Appl. No. 09/305,146, filed May 4, 1999. 2 pages.
Response to Notification of Non-Compliant Appeal Brief dated Nov. 13, 2006, for commonly owned U.S. Appl. No. 09/305,146, filed May 4, 1999. 2 pages.
Amended Appeal Brief dated Nov. 13, 2006, for commonly owned U.S. Appl. No. 09/305,146, filed May 4, 1999. 30 pages.
Notification of Non-Compliant Appeal Brief mailed Mar. 9, 2007, for commonly owned U.S. Appl. No. 09/305,146, filed May 4, 1999. 2 pages.
Response to Notification of Non-Compliant Appeal Brief dated Mar. 28, 2007, for commonly owned U.S. Appl. No. 09/305,146, filed May 4, 1999. 7 pages.
Examiner's Answer mailed Jul. 30, 2007, for commonly owned U.S. Appl. No. 09/305,146, filed May 4, 1999. 11 pages.
Reply Brief dated Oct. 1, 2007, for commonly owned U.S. Appl. No. 09/305,146, filed May 4, 1999. 12 pages.
Reply Brief noted by Examiner mailed Dec. 17, 2007, for commonly owned U.S. Appl. No. 09/305,146, filed May 4, 1999. 3 pages.
Decision of the Board of Patent Appeals and Interferences mailed Jun. 9, 2009, for commonly owned U.S. Appl. No. 09/305,146, 14 pages.
Notice of Allowance mailed Sep. 2, 2009, for commonly owned U.S. Appl. No. 09/305,146, filed May 4, 1999. 5 pages.
Request for Continued Examination dated Sep. 3, 2009, for commonly owned U.S. Appl. No. 09/305,146, filed May 4, 1999. 4 pages.
Notice of Allowance mailed Nov. 3, 2009, for commonly owned U.S. Appl. No. 09/305,146, filed May 4, 1999. 4 pages.
Request for Continued Examination dated Feb. 2, 2010, for commonly owned U.S. Appl. No. 09/305,146, filed May 4, 1999. 2 pages.
Notice of Allowance mailed Apr. 2, 2010, for commonly owned U.S. Appl. No. 09/305,146, filed May 4, 1999. 4 pages.
Preliminary Amendment filed Dec. 20, 2004, for commonly owned U.S. Appl. No. 11/017,086, filed Dec. 20, 2004. 9 pages.
U.S. Office Action mailed Sep. 23, 2005, for commonly owned U.S. Appl. No. 11/017,086, filed Dec. 20, 2004. 22 pages.
Jan. 23, 2006 Response to Office Action dated Sep. 23, 2005, for commonly owned U.S. Appl. No. 11/017,086, filed Dec. 20, 2004. 19 pages.
U.S. Office Action mailed Apr. 18, 2006, for commonly owned U.S. Appl. No. 11/017,086, filed Dec. 20, 2004. 24 pages.
Notice of Appeal filed Sep. 15, 2006, for commonly owned U.S. Appl. No. 11/017,086, filed Dec. 20, 2004. 1 page.
Feb. 14, 2007 Amendment and Request for Continued Examination, for commonly owned U.S. Appl. No. 11/017,086, filed Dec. 20, 2004. 18 pages.
U.S. Office Action mailed Mar. 22, 2007, for commonly owned U.S. Appl. No. 11/017,086, filed Dec. 20, 2004. 21 pages.
Aug. 17, 2007 Response to U.S. Office Action dated Mar. 22, 2007, for commonly owned U.S. Appl. No. 11/017,086, filed Dec. 20, 2004. 16 pages.
Office Action, mailed Nov. 5, 2007, for commonly owned U.S. Appl. No. 11/017,086. 23 pages.
Request for Continued Examination dated May 2, 2008, for commonly owned U.S. Appl. No. 11/017,086, filed Dec. 20, 2004. 2 pages.
Office Action mailed Aug. 11, 2008, for commonly owned U.S. Appl. No. 11/017,086, filed Dec. 20, 2004. 23 pages.
Jan. 8, 2009 Response to the final Office Action of Aug. 11, 2008, for commonly owned U.S. Appl. No. 11/017,086, filed Dec. 20, 2004. 17 pages.
Advisory Action mailed Feb. 2, 2009, for commonly owned U.S. Appl. No. 11/017,086, filed Dec. 20, 2004. 2 pages.
Request for Continued Examination dated Feb. 10, 2009, for commonly owned U.S. Appl. No. 11/017,086, filed Dec. 20, 2004. 2 pages.
U.S. Office Action mailed Mar. 3, 2009, for commonly owned U.S. Appl. No. 11/017,086, filed Dec. 20, 2004. 26 pages.
USPTO Communication mailed Mar. 12, 2009, for commonly owned U.S. Appl. No. 11/017,086, filed Dec. 20, 2004. 2 pages.
U.S. Office Action mailed Jul. 21, 2009, for commonly owned U.S. Appl. No. 11/017,086, filed Dec. 20, 2004. 25 pages.
Notice of Abandonment mailed Mar. 24, 2010, for commonly owned U.S. Appl. No. 11/017,086, filed Dec. 20, 2004. 3 pages.
U.S. Patent 7,013,284 Re-Examination Request Application No. 90/010,201, filed Jun. 19, 2008. 128 pages.
Determination of Reexam mailed Aug. 1, 2008, for commonly owned U.S. Reexamination No. 90/010,201, filed Jun. 19, 2008. 12 pages.
U.S. Office Action mailed Jul. 17, 2009, for commonly owned U.S. Reexamination No. 90/010,201, filed Jun. 19, 2008. 28 pages.
Sep. 17, 2009 Response to Office Action mailed Jul. 17, 2009, for commonly owned U.S. Reexamination No. 90/010,201, filed Jun. 19, 2008. 49 pages.
Examiner Interview Summary Record dated Sep. 17, 2009, for commonly owned U.S. Reexamination No. 90/010,201, filed Jun. 19, 2008. 3 pages.
Sep. 17, 2009 Affidavits, Declarations, and/or Exhibits filed, for commonly owned U.S. Reexamination No. 90/010,201, filed Jun. 19, 2008. 201 pages.
Decision Merging Proceedings Granted, mailed Feb. 26, 2010, for commonly owned U.S. Reexamination No. 90/010,201, filed Jun. 19, 2008. 3 pages.
Mar. 26, 2010 Amendment and Response to Office Action dated Feb. 26, 2010, for commonly owned U.S. Reexamination No. 90/010,201, filed Jun. 19, 2008. 11 pages.
Preliminary Amendment dated Jan. 21, 2010, for commonly owned U.S. Appl. No. 12/691,515, filed Jan. 21, 2010. 3 pages.

Decision Merging Proceedings Granted, mailed Feb. 26, 2010, for commonly owned U.S. Reexamination No. 90/010,713, filed Oct. 9, 2009. 3 pages.

Mar. 26, 2010 Amendment and Response to Office Action dated Feb. 26, 2010, for commonly owned U.S. Reexamination No. 90/010,713, filed Oct. 9, 2009. 11 pages.

U.S. Appl. No. 12/691,515, filed Jan. 21, 2010.

U.S. Appl. No. 90/010,201, filed Jun. 19, 2008.

U.S. Appl. No. 90/010,713, filed Oct. 9, 2009.

U.S. Appl. No. 90/010,735, filed Nov. 10, 2009.

International Search Report dated Apr. 17, 2002, for PCT Application No. PCT/US00/12351, filed May 4, 2000. 5 pages.

International Search Report dated Jun. 3, 2002, for corresponding international application PCT/US00/12240. 2 pages.

International Search Report dated Aug. 6, 2002, for PCT Application No. PCT/US00/12501, filed May 4, 2000. 3 pages.

International Search Report dated Aug. 8, 2002 for PCT/US00/12508, 2 pages.

International Search Report dated Dec. 9, 2002 for PCT/US00/12238, 2 pages.

European Examination Report dated Feb. 18, 2004, for European Patent Application No. 00928844.0, filed May 4, 2000. 4 pages.

European Examination Report dated Feb. 1, 2005, for European Patent Application No. 00928844.0, filed May 4, 2000. 16 pages.

Extended European Search Report for European Patent Application No. 06005193.5, dated Aug. 22, 2006. 8 pages.

Agarwal et al., Architecting Object Applications for High Performance with Relational Databases, High Performance Object/Relational Applications. Aug. 10, 1995, 8 pages.

Bandat, K, "Document Based Customization and Adaptation of Process" *IBM Technical Disclosure Bulletin*, Sep. 1994, pp. 629-630.

Bulletin of the Technical Committee on Data Engineering, *IEEE Computer Society*, vol. 16 No. 2, Jun. 1993, pp. 1-56.

Cugola, G., et al., "Exploiting an event-based infrastructure to develop complex distributed systems," Software Engineering, 1988; Proceedings of the 1988 International Conference on Kyoto, Japan, Apr. 19-25, 1998, IEEE pp. 261-270.

Denning, Peter J. et al. "Completing the Loops," *Interfaces: Institute for Operations Research and the Management Science*, vol. 25 No. 3, May-Jun. 1995. pp. 42-57.

Engel, James D., "Technology in claims management", *Risk Management*, vol. 42 No. 12. Dec. 1995, 2 pages.

Feiler, Peter H. et al. "An Incremental Programming Environment," *Proceedings of the 5th International Conference on Software Engineering*, San Diego, California, 1981. pp. 44-53.

Fisher, Susan, E., "Insurer streamlines info gathering" (Client/Server Deployment: Arkwright Mutual Insurance) *PC Week*, vol. 10 No. 45, Nov. 15, 1993. 2 pages.

Freeman, Charles, "Microsoft Access 97 Step by Step," published by Microsoft Press, 1997, Table of Contents and Quick Look Guide vii-xiv, Finding You Best Starting Point pp. xvi-xxvi, Part 1, Lesson 1 and Lesson 2, pp. Cover-40, 63-108, 251-254.

Groiss, Herbert, et al., "Interoperability with World Wide Workflows," *1st World Conference on Integrated Design & Process Technology*, 1995, pp. 1-7.

Held, Jeffrey J., Network Computing Practice, "GroupWare In Investment Banking: Improving Revenue and Deal Flow", *GroupWare '92*, Edited by David D. Coleman, The Conference Group, Morgan Kaufmann Publishers, 1992, pp. 461-464.

Hung K. Sun Y. Rose T. "A dynamic business object architecture for an insurance industrial project." *Proceedings of International Conference on Object Oriented Information Systems, (OOIS'97)*. Brisbane, Qld., Australia Nov. 10-12, 1997, Published 1998, abstract 1 page.

Image-Enabled App Streams Workflow for Gerling Re. (Gerling Global Reinsurance's use of keyFile's document management software and insurance Software and Systems' SICS insurance record-keeping software)(Product Information). *Insurance & Technology*, Feb. 1, 1997, 3 pages.

Kappel, G. et al., "Coordination in Workflow Management Systems A Rule-Based Approach", *Department of Information Systems*, University of Linz, A-4040 Linz, Austria, 1998. pp. 99-119.

Kellogg et al. "Interface management: a CORBA universal service manager," *Systems Management*, 1998. Proceedings of the IEEE Third International Workshop On Newport, RI, USA, Apr. 22-24,1998, Los Alamitos, CA, USA, IEEE Comput. Soc., US, Apr. 22,1998. pp. 148-149.

Koehler SH, "Objects in Insurance. Gaining the Competitive Edge in Financial Services." *Proceedings of Object Expo '94*. New York, NY, USA Jun. 6-10, 1994, Published 1994. Abstract, 1 page.

Korzeniowski, Paul, "Workflow software automates processes; passing messages on network platform helps CareAmerica process insurance claims" (use of workflow software to streamline business processes) (Client/Service Computing), *Software Magazine*, vol. 13 No. 3. Feb. 1993, 4 pages.

Koschel et al. "Configurable event triggered services for CORB-based systems," *Enterprise Distributed Object Computing Workshop, 1998*. EDOC '98 Proceedings, Second International La Jolla, CA, USA, Nov. 3-5, 1998. New York, NY, USA, IEEE, US. Nov. 1998, pp. 306-318.

Medina-Mora, Raul et al. "ALOE Users' and Implentors' Guide," *Technical Report CMUCS-81-145, CMU, Computer Science Department*, Nov. 1981. pp. I-III and 1-79.

Medina-Mora, Raul "Syntax-Directed Editing Towards Integrated Programming Environments," *Doctoral Thesis, Department of Computer Science, Carnegie-Mellon University*. Mar. 1982, Summary pp. 1-14 and pp. 1-149.

Medina-Mora, "Action Workflow™ Technology and Applications for Groupware" *GroupWare '92*, Edited by David D. Coleman, The Conference Group, Morgan Kaufmann Publishers, 1992. pp. 165-167.

Medina-Mora, Raul et al. "The Action Workflow Approach to Workflow Management Technology," *Proceedings of the 1992 ACM conference on Computer-supported cooperative work*, Nov. 1992. pp. 281-288.

Medina-Mora, Raul et al. "ActionWorkflow in Use: Clark County Department of Business License," *Proceedings of the Twelfth International Conference on Data Engineering*, Feb.-Mar. 1996, pp. 288-294.

Medina-Mora, Raul, et al. "Action Workflow as the Enterprise Integration Technology." Bulletin of the Technical Committee on Data Engineering. *IEEE Computer Societ*. vol. 16 No. 2, pp. 49-52. Jun. 1993.

Milligan, John. "Case study: Advantage. (Motorists Insurance Companies uses Advantage, a business-rule DBMS developed in-house, to manage quoting, data entry, rating and other core processes)" (Data Architect) (Company Operations). *Database Programming & Design*, vol. 10 No. 12, Dec. 1997, 5 pages.

Nilsson, Y. "TFM: tool for task flow management." *Philips Telecommunication and Data Systems Review*, vol. 47, No. 4, Dec. 1989, pp. 33-46. Netherlands. Abstract.

Potel, M. "MVP: Model-View-Presenter The Taligent Programming Model for C++ and Java," Taligent, Inc., 1994, 16 pages.

"Primavera Extends Lead in High-End Project Management Software," *Business Wire*, Apr. 4, 1995. 3 pages.

"Primavera Products and Solutions," www.primavera.com/products/p3.html, downloaded from internet Feb. 2, 2001, 2 pages.

Stickel E., "Competitive product development in the financial services industry—a knowledge-based approach" *International Journal of Intelligent Systems in Accounting, Finance and Management*, vol. 4, No. 4, Dec. 1995, pp. 273-87, abstract 1 page.

Sutherland, RW, "Table Driven Health Insurance Claim Preparation" *IBM Technical Disclosure Bulletin*, Jul. 1986, abstract 1 page.

Tauhert, Christy, "AFLAC cuts processing time with object system. (American Family Life Assurance, Portable Systems Technology's SmartImage insurance processing automation system) (Company Operations)". *Insurance & Technology*, vol. 22 No. 6, Jun. 1997, pp. 25(2) abstract, 1 page.

Todd, G. et al. "Microsoft Exchange Server 5.5", published by SAMS publishing, Indianapolis, Indiana, 1998, pp. i-xliii and 1-1060.

Tombros, Dimitrios et al., "Semantics of Reactive Components in Event-Driven Workflow EXecution", *Institut for Informatic, Universitat Zurich, Advanced Information systems Engineering, 9th International Conference, SAiSE'97*, Barcelona,Catalonia, Spain, Jun. 16-20, 1997 Proceedings, pp. 409-422.

Tsai, W.H. et al. "Architecture of a Multi-Microprocessor System for Parallel Processing of Image Sequences," *Proceedings of 1981 IEEE Computer Society Workshop on Computer Architecture of Pattern Analysis and Image Database Management*, 1981. pp. 104-111.

Tsuchiya et al. "Operator-oriented approach for the inter-work of service and network management," *Global Convergence of Telecommunications and Distributed Object Computing*, 1997. Proceedings. Tine 97 Santiago, Chile, Nov. 17-20, 1997, Los Alamitos, CA, USA, EEE Comput. Soc., US, Nov. 17, 1997. pp. 144-150.

Way, P. John Hancock streamlines legacy systems with objects. (John Hancock Mutual Life Insurance)(Company Operations). *Insurance & Technology* vol. 22. No. 9 Sep. 1997. Abstract, 1 page.

Winograd, Terry et al. (1986) Understanding Computers and Cognition: A New Foundation for Design, Ablex Publishing Corporation, Norwood, New Jersey, 1986. pp. i-xii and 1-207.

Winograd, Terry "A Language/Action Perspective on the Design of Cooperative Work," *Published in Human-Computer Interaction* vol. 3 No. 1, 1987-88, 15 pages.

Winograd, Terry, "Groupware and the Emergence of Business Technology", *GroupWare '92*, Edited by David D. Coleman, The Conference Group, Morgan Kaufmann Publishers, 1992, pp. 69-72.

Office Action, mailed Mar. 14, 2001, for commonly owned U.S. Appl. No. 09/305,331. 11 pages.

Sep. 14, 2001 Response to Office Action, mailed Mar. 14, 2001, for commonly owned U.S. Appl. No. 09/305,331. 10 pages.

Office Action, mailed Dec. 3, 2001, for commonly owned U.S. Appl. No. 09/305,331. 10 pages.

May 31, 2002 Amendment and Request for Reconsideration after Office Action mailed Dec. 3, 2001, for commonly owned U.S. Appl. No. 09/305,331. 12 pages.

Office Action, mailed Aug. 14, 2002, for commonly owned U.S. Appl. No. 09/305,331. 15 pages.

Nov. 14, 2002 Response to Office Action, mailed Aug. 14, 2002, for commonly owned U.S. Appl. No. 09/305,331. 13 pages.

Office Action, mailed Dec. 20, 2002, for commonly owned U.S. Appl. No. 09/305,331. 14 pages.

Feb. 20, 2003 Response to Office Action, mailed Dec. 20, 2002, for commonly owned U.S. Appl. No. 09/305,331. 7 pages.

Office Action, mailed Mar. 4, 2003, for commonly owned U.S. Appl. No. 09/305,331. 3 pages.

Request for continued Examination dated Apr. 28, 2003, for commonly owned U.S. Appl. No. 09/305,331 filed May 4, 1999. 2 pages.

Office Action, mailed Jun. 30, 2003, for commonly owned U.S. Appl. No. 09/305,331. 15 pages.

Sep. 22, 2003 Response to Office Action, mailed Jun. 30, 2003, for commonly owned U.S. Appl. No. 09/305,331. 6 pages.

Office Action, mailed Dec. 3, 2003, for commonly owned U.S. Appl. No. 09/305,331. 2 pages.

Jan. 5, 2004 Response to Office Action, mailed Dec. 3, 2003, for commonly owned U.S. Appl. No. 09/305,331. 8 pages.

Feb. 2, 2004 Response to Office Action, mailed Dec. 3, 2003, for commonly owned U.S. Appl. No. 09/305,331. 8 pages.

Notice of Allowability mailed Oct. 27, 2004, for commonly owned U.S. Appl. No. 09/305,331, filed May 4, 1999. 9 pages.

Second Request for Ex Parte Reexamination, including exhibits I,J,K,L,M,N,O,P, and Q, dated Oct. 9, 2009, for commonly owned U.S. Appl. No. 09/305,331 and later assigned Application No. 90/010,713. 974 pages.

Order Granting Ex Parte Reeexamination mailed Dec. 17, 2009, for commonly owned U.S. Appl. No. 09/305,331 and later assigned Application No. 90/010,713. 15 pages.

U.S. Office Action mailed May 9, 2001, for commonly owned U.S. Appl. No. 09/305,234, filed May 4, 1999. 5 pages.

Nov. 27, 2001 Response to Office Action dated May 9, 2001, for commonly owned U.S. Appl. No. 09/305,234, filed May 4, 1999. 9 pages.

U.S. Office Action mailed Feb. 7, 2002, for commonly owned U.S. Appl. No. 09/305,234, filed May 4, 1999. 4 pages.

Mar. 6, 2002 Response to Office Action dated Feb. 7, 2002, for commonly owned U.S. Appl. No. 09/305,234, filed May 4, 1999. 2 pages.

U.S. Office Action dated Jun. 3, 2002, for commonly owned U.S. Appl. No. 09/305,234, filed May 4, 1999. 6 pages.

Sep. 3, 2002 Amendment in Response to Office Action dated Jun. 3, 2002, for commonly owned U.S. Appl. No. 09/305,234, filed May 4, 1999. 5 pages.

Advisory Action mailed Sep. 17, 2002, for commonly owned U.S. Appl. No. 09/305,234, filed May 4, 1999. 3 pages.

Filing of Continued Prosecution Application dated Nov. 4, 2002, for commonly owned U.S. Appl. No. 09/305,234, filed May 4, 1999. 2 pages.

U.S. Office Action mailed Nov. 26, 2002, for commonly owned U.S. Appl. No. 09/305,234, filed May 4, 1999. 4 pages.

Mar. 4, 2003 Response to Office Action dated Nov. 26, 2002, for commonly owned U.S. Appl. No. 09/305,234, filed May 4, 1999. 13 pages.

U.S. Office Action mailed May 21, 2003, for commonly owned U.S. Appl. No. 09/305,234, filed May 4, 1999. 6 pages.

Sep. 22, 2003 Amendment in Response to Office Action mailed May 21, 2003, for commonly owned U.S. Appl. No. 09/305,234, filed May 4, 1999. 10 pages.

Request for Continued Examination dated Oct. 21, 2003, for commonly owned U.S. Appl. No. 09/305,234, filed May 4, 1999. 2 pages.

Advisory Action mailed Oct. 28, 2003, for commonly owned U.S. Appl. No. 09/305,234, filed May 4, 1999. 2 pages.

U.S. Office Action mailed Nov. 17, 2003 for commonly owned U.S. Appl. No. 09/305,234, filed May 4, 1999. 5 pages.

Feb. 17, 2004 Response to Office Action mailed Nov. 17, 2003, for commonly owned U.S. Appl. No. 09/305,234, filed May 4, 1999. 11 pages.

U.S. Office Action mailed May 4, 2004, for commonly owned U.S. Appl. No. 09/305,234, filed May 4, 1999. 4 pages.

Jul. 6, 2004 Amendment in Response to Office Action mailed May 4, 2004, for commonly owned U.S. Appl. No. 09/305,234, filed May 4, 1999. 9 pages.

Advisory Action mailed Aug. 31, 2004, for commonly owned U.S. Appl. No. 09/305,234, filed May 4, 1999.3 pages.

Request for Continued Examination and Amendment dated Sep. 7, 2004, for commonly owned U.S. Appl. No. 09/305,234, filed May 4, 1999. 10 pages.

Advisory Action mailed Sep. 14, 2004, for commonly owned U.S. Appl. No. 09/305,234, filed May 4, 1999. 3 pages.

U.S. Office Action mailed Nov. 3, 2004, for commonly owned U.S. Appl. No. 09/305,234, filed May 4, 1999. 6 pages.

May 5, 2005 Amendment and Response to Office Action mailed Nov. 3, 2004, for commonly owned U.S. Appl. No. 09/305,234, filed May 4, 1999. 13 pages.

Notice of Informal or Non-Responsive Amendment mailed Jul. 26, 2005, for commonly owned U.S. Appl. No. 09/305,234, filed May 4, 1999. 2 pages.

Aug. 24, 2005 Response to Office Action mailed Jul. 26, 2005, for commonly owned U.S. Appl. No. 09/305,234, filed May 4, 1999. 8 pages.

U.S. Office Action mailed Nov. 17, 2005, for commonly owned U.S. Appl. No. 09/305,234, filed May 4, 1999. 6 pages.

Jan. 17, 2006 Amendment after Final Rejection dated Nov. 17, 2005, for commonly owned U.S. Appl. No. 09/305,234, filed May 4, 1999. 14 pages.

Advisory Action mailed Feb. 9, 2006, for commonly owned U.S. Appl. No. 09/305,234, filed May 4, 1999. 3 pages.

Mar. 29, 2006 Second Response to Office Action dated Nov. 17, 2005, for commonly owned U.S. Appl. No. 09/305,234, filed May 4, 1999. 12 pages.

Examiner Interview Summary mailed Mar. 30, 2006, for commonly owned U.S. Appl. No. 09/305,234, filed May 4, 1999. 4 pages.

Ex Parte Quayle Action mailed Apr. 12, 2006, for commonly owned U.S. Appl. No. 09/305,234, filed May 4, 1999. 4 pages.

May 18, 2006 Amendment and Response to Ex Parte Quayle Action mailed Apr. 12, 2006, for commonly owned U.S. Appl. No. 09/305,234, filed May 4, 1999. 5 pages.

Notice of Informal or Non-Responsive Amendment mailed Jun. 1, 2006, for commonly owned U.S. Appl. No. 09/305,234, filed May 4, 1999. 2 pages.

Jun. 16, 2006 Response to Notice of Non-Compliant Amendment dated Jun. 1, 2006, for commonly owned U.S. Appl. No. 09/305,234, filed May 4, 1999. 4 pages.

Ex Parte Quayle mailed May 18, 2007, for commonly owned U.S. Appl. No. 09/305,234, filed May 4, 1999. 3 pages.

Claims Technology, A Five-Step Diagnosis for Your Claim Operation by John Raguin, available at http://web/archive.org/20040808072822/www.claimsmag.com/Issues/sept02/claims_tech.asp (Sep. 2002). 3 pages.

Publishing A FileMaker Pro 4/5, Database on the Web: A tutorial, available at http://ion.uillinois.edu/resources/tutorials/software/tutorials/fmpro/filemakertutorial1.doc (last updated May 21, 2000). 10 pages.

Robert W. Baldwin, Naming and Grouping Privileges to Simplify Security Management in Large Databases, available at http://www.cs.purdue.edu/homes/ninghui/courses/Fall03/papers/baldwin.pdf (Copyrighted in 1990). 17 pages.

Vendor branches, Chapter 7. Advanced Topics, available at http://svnbook.red-bean.com/en/1.1/ch07s05.html (6 pages) (available as early as Nov. 2005).

Accenture's Responses to Interrogatory No. 14, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007.

Accenture's Responses to Interrogatory No. 16, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007.

Memorandum Order denying without Prejudice and to be re-filed after the Supreme Court issues its ruling in *Bilski* v. *Doll*, 129 S. Ct. 2735 (U.S. 2009), filed Feb. 26, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 3 pages. (Dkt. No. 478).

Memorandum Order regarding claim construction of the '284 patent and '111 patent, filed Mar. 5, 2010, filed in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 7 pages. (Dkt. No. 482).

Memorandum Opinion, filed Mar. 5, 2010, filed in lawsuit asserting U.S. Patent No. 7,013,284 B2, captioned Accenture *Accenture Global Services GmbH, et al.* v. *Guidewire Software, Inc.*, Case No. 07cv826, D. Del. Dec. 18, 2007. 43 pages. (Dkt. No. 483).

Opening Brief in Support re Motion for Summary Judgment (Partial) That the '284 Patent is Invalid as Indefinite, filed Dec. 16, 2009, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 21 pages. (Dkt. No. 347).

Opening Brief in Support re Motion for Summary Judgment (Partial) That the '284 Patent is Invalid as Claiming Unpatentable Subject Matter, filed Dec. 16, 2009, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 15 pages. (Dkt. No. 349).

Redacted version of Opening Brief in Support of Motion for Summary Judgment (Partial) of Invalidity of '284 Patent because of an On-Sale Bar, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 31 pages. (Dkt. No. 392).

Redacted version of Opening Brief in Support of Motion for Summary Judgment(Partial) of filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 75 pages. (Dkt. No. 393).

Redacted Version of Opening Brief in Support of Motion for Summary Judgment (Partial) Regarding Statute of Limitations, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 14 pages. (Dkt. No. 395).

Redacted Version of Opening Brief in Support, of Motion for Summary Judgment That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 46 pages. (Dkt. No. 396).

Answering Brief in Opposition re Motion for Summary Judgment (Partial) That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 23 pages. (Dkt. No. 397).

Redacted version of Appendix, vol. 1 of 12, filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 202 pages.(Dkt. No. 398).

Redacted version of Appendix, (vol. 2 of 12—Exhibits 26-38), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 34 pages. (Dkt. No. 399).

Redacted version of Appendix, (vol. 3 of 12—Exhibits 39-58), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 44 pages. (Dkt. No. 400).

Redacted version of Appendix, (vol. 4 of 12—Exhibits 59-64), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 39 pages. (Dkt. No. 401).

Redacted version of Appendix, (vol. 5 of 12—Exhibits 65-99), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 190 pages. (Dkt. No. 404).

Redacted version of Appendix, (vol. 6 of 12—Exhibits 100-129), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 427 pages. (Dkt. No. 405).

Redacted version of Appendix, (vol. 7 of 12—Exhibits 130-154), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 467 pages. (Dkt. No. 406).

Redacted version of Appendix, (vol. 8 of 12—Exhibits 155-161), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 330 pages. (Dkt. No. 407).

Redacted version of Appendix, (vol. 9 of 12—Exhibits 162-164), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 13 pages. (Dkt. No. 408).

Redacted version of Appendix, (vol. 10 of 12—Exhibits 165-170), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 18 pages. (Dkt. No. 409).

Redacted version of Appendix, (vol. 11 of 12—Exhibit 171), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 13 pages. (Dkt. No. 410).

Redacted version of Appendix, (vol. 12 of 12—Exhibits 172-183), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 80 pages. (Dkt. No. 412).

Redacted version of Appendix, Corrected vol. 12 (Exhibits 172-183), filed Jan. 8, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 80 pages. (Dkt. No. 413).

Redacted version of Declaration of W. Michael Flaherty in Support of Plaintiffs Briefs in Opposition to Defendants' Motions for Summary Judgment, filed Jan. 20, 2010, in lawsuit asserting U.S. Patent No.

7,013,284 B2, captioned *Accenture Global Services GmbH, et al.* v. *Guidewire Software, Inc.*, Case No. 07cv826, D. Del. Dec. 18, 2007. 6 pages. (Dkt. No. 432).

Redacted version of Declaration of Diana Luo in Support of Plaintiffs Briefs in Opposition to Defendants' Motions for Partial Summary Judgment, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 68 pages. (Dkt. No. 433).

Redacted Version of Answering Brief in Opposition to Defendant's Motion for Partial Summary Judgment of Invalidity for Indefiniteness of the '284 Patent, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 22 pages. (Dkt. No. 435).

Redacted Version of Declaration of Michael Ian Shamos in Support of Plaintiffs' Brief in Opposition to Defendants Motion for Partial Summary Judgment, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 6 pages. (Dkt. No. 436).

Redacted version of Answering Brief in Opposition to Defendant's Motion for Partial Summary Judgment of Invalidity of the '284 Patent as Anticipated or, in the alternative, Obvious, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 36 pages. (Dkt. No. 437).

Redacted version of Answering Brief in Opposition to Defendant's Motion for Partial Summary Judgment of Invalidity of '284 Patent Because of an On-Sale Bar, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 51 pages. (Dkt. No. 442).

Redacted version of Declaration of Ruchika Agrawal in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 33 pages. (Dkt. No. 443).

Redacted version of Declaration of Michael Ian Shamos in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 26 pages. (Dkt. No. 444).

Redacted version of Declaration of George Victor Guyan in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 7 pages. (Dkt. No. 445).

Redacted version of Declaration of Jeffrey Wargin in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 8 pages. (Dkt. No. 446).

Redacted version of Reply Brief re Motion for Summary Judgment (Partial) of Invalidity of '284 Patent because of an On-Sale Bar, filed Feb. 2, 2010, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 8 pages. (Dkt. No. 454).

Redacted version of Reply Brief re Motion for Summary Judgment (Partial) That the '284 Patent is Invalid as Indefinite, filed Feb. 2, 2010, in lawsuit asserting U.S. Patent No 7,013,284 B2, captioned *Accenture Global Services GmbH, et al.* v. *Guidewire Software, Inc.*, Case No. 07cv826, D. Del. Dec. 18, 2007. 18 pages. (Dkt. No. 455).

Redacted version of Reply Brief re Motion for Summary Judgment (Partial) that the '284 Patent is Invalid as claiming Unpatentable Subject Matter, filed Feb. 2, 2010, filed in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 14 pages. (Dkt. No. 456).

Redacted version of Reply Brief re Motion for Summary Judgment that the '284 is Invalid as Anticipated or, in the Alternative, Obvious, filed Feb. 2, 2010, filed in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 13 pages. (Dkt. No. 458).

Order denying Motion for Summary Judgment (Partial) denying Motion for Summary Judgment, denying Motion for Summary Judgment, denying Motion to Strike, denying Motion for Summary Judgment, denying Motion for Summary Judgment, re Memorandum Opinion, filed Mar. 5, 2010, filed in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 2 pages. (Dkt. No. 484).

Request for Continued Examination dated Jul. 1, 2010, for commonly owned U.S. Appl. No. 09/305,146, filed May 4, 1999. 2 pages.

Notice of Allowance mailed Jul. 15, 2010, for commonly owned U.S. Appl. No. 09/305,146, filed May 4, 1999. 4 pages.

Examiner Interview Summary Record dated Jul. 13, 2010, for merged Reexamination Nos. 90/010,201 and 90/010,713 regarding commonly owned U.S. Patent No. 7,013,284 (41 pages).

Patent Owner's Statement of the Interview Under 37 C.F.R. 1.560(b) dated Jul. 30, 2010 for merged Reexamination Nos. 90/010,201 and 90/010,713 regarding commonly owned U.S. Patent No. 7,013,284 (17 pages).

Supplemental Response dated Aug. 27, 2010, for merged Reexamination Nos. 90/010,201 and 90/010,713 regarding commonly owned U.S. Patent No. 7,013,284 (63 pages).

Office Action, mailed Jun. 8, 2010, for commonly owned U.S. Appl. No. 11/264,115. (12 pages.).

Stipulation and Order to Amend Answer and Counterclaims filed Sep. 13, 2010, in lawsuit asserting U.S. Patent No. 7,617,240, captioned *Accenture Global Services GmbH, et al.* v. *Guidewire Software, Inc.*, Case No. 07cv826, D. Del. Dec. 18, 2007. 46 pages. (Dkt. No. 47).

U.S. Office Action mailed Sep. 24, 2010, for Reexamination No. 90/010,735 regarding commonly owned U.S. Patent No. 7,617,240. 18 pages.

U.S. Office Action mailed Oct. 1, 2010, for merged Reexamination Nos. 90/010,201 and 90/010,713 regarding commonly owned U.S. Patent No. 7,013,284. 40 pages.

Request for Continued Examination dated Oct. 14, 2010, for commonly owned U.S. Appl. No. 09/305,146, filed May 4, 1999. 2 pages.

Accenture's Opening Claim Construction Brief filed Oct. 2, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 31 pages.

Declaration of Diana Luo in Support of Plaintiffs Accenture Global Services GmbH and Accenture LLP'S Opening Claim Construction Brief filed Oct. 5, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 5 pages.

Guidewire's Answering Claim Construction Brief filed on Oct. 30, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 49 pages.

Declaration of Diana Luo in Support of Accenture's Claim Construction Answering Brief filed Nov. 5, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 8 pages.

Accenture's Claim Construction Answering Brief filed Nov. 5, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 25 pages.

Defendant Guidewire's Opening Claim Construction Brief filed Nov. 6, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 30 pages.

Complaint for Patent Infringement filed Nov. 10, 2009, in lawsuit asserting U.S. Patent No. 7,617,240, captioned *Accenture Global Services GmbH, et al.* v. *Guidewire Software, Inc.*, Dkt. No. 09cv848, D. Del. Nov. 10, 2009. 6 pages.

Defendant Guidewire's Answer and Counterclaims to Accenture's Complaint for Patent Infringement filed Nov. 30, 2009, in lawsuit asserting U.S. Patent No. 7,617,240, captioned *Accenture Global Services GmbH, et al.* v. *Guidewire Software, Inc.*, Dkt. No. 09cv848, D. Del. Nov. 10, 2009, 9 pages.

Office Action, mailed Feb. 26, 2001, for commonly owned U.S. Appl. No. 09/305,228. 7 pages.

Aug. 27, 2001 Response to Office Action mailed Feb. 26, 2001, for commonly owned U.S. Appl. No. 09/305,228. 9 pages.

Office Action, mailed Oct. 18, 2001, for commonly owned U.S. Appl. No. 09/305,228. 12 pages.

Jan. 18, 2002 Response to Office Action, mailed Oct. 18, 2001, for commonly owned U.S. Appl. No. 09/305,228. 6 pages.

Mar. 11, 2002 Amendment after Office Action mailed Oct. 18, 2001, for commonly owned U.S. Appl. No. 09/305,228, filed May 4, 1999. 16 pages.

Office Action, mailed Mar. 1, 2002, for commonly owned U.S. Appl. No. 09/305,228. 3 pages.

Office Action, mailed Apr. 9, 2002, for commonly owned U.S. Appl. No. 09/305,228. 3 pages.

Continued Prosecution Application (CPA) Request dated Apr. 18, 2002, for commonly owned U.S. Appl. No. 09/305,228, filed May 4, 1999. 2 pages.

Jul. 1, 2002 Response to Office Action, mailed Mar. 1, 2002, for commonly owned U.S. Appl. No. 09/305,228. 9 pages.

Office Action, mailed Sep. 11, 2002, for commonly owned U.S. Appl. No. 09/305,228. 10 pages.

Mar. 11, 2003 Response to Office Action mailed Sep. 11, 2002, for commonly owned U.S. Appl. No. 09/305,228. 14 pages.

Office Action, mailed Jun. 4, 2003, for commonly owned U.S. Appl. No. 09/305,228. 12 pages.

Oct. 6, 2003 Response to Office Action mailed Jun. 4, 2003, for commonly owned U.S. Appl. No. 09/305,228. 7 pages.

Request for Continued Examination dated Oct. 6, 2003, for commonly owned U.S. Appl. No. 09/305,228, filed May 4, 1999. 2 pages.

Office Action, mailed Oct. 22, 2003, for commonly owned U.S. Appl. No. 09/305,228. 11 pages.

Feb. 20, 2004 Response to Office Action mailed Oct. 22, 2003, for commonly owned U.S. Appl. No. 09/305,228. 8 pages.

Office Action, mailed May 13, 2004, for commonly owned U.S. Appl. No. 09/305,228. 12 pages.

Office Action, mailed Nov. 16, 2004, for commonly owned U.S. Appl. No. 09/305,228. 3 pages.

Office Action, mailed Mar. 21, 2001, for commonly owned U.S. Appl. No. 09/305,816. 11 pages.

Sep. 21, 2001 Response to Office Action, mailed Mar. 21, 2001, for commonly owned U.S. Appl. No. 09/305,816. 4 pages.

Office Action, mailed Nov. 23, 2001 for commonly owned U.S. Appl. No. 09/305,816. 10 pages.

Apr. 19, 2002 Response to Office Action, mailed Nov. 23, 2001 for commonly owned U.S. Appl. No. 09/305,816. 7 pages.

Office Action, Notice of Allowability, mailed May 3, 2002 for commonly owned U.S. Appl. No. 09/305,816. 9 pages.

Office Action, mailed Aug. 13, 2001, for commonly owned U.S. Appl. No. 09/305,817. 8 pages.

Feb. 12, 2002 Response to Office Action, mailed Aug. 13, 2001, for commonly owned U.S. Appl. No. 09/305,817. 14 pages.

Office Action, mailed Mar. 22, 2002, for commonly owned U.S. Appl. No. 09/305,817. 11 pages.

Preliminary Amendment and Continued Prosecution Application mailed Aug. 22, 2002, for commonly owned U.S. Appl. No. 09/305,817, filed May 4, 1999. 4 pages.

Oct. 9, 2002 Response to Office Action, mailed Mar. 22, 2002, for commonly owned U.S. Appl. No. 09/305,817. 14 pages.

Office Action, mailed Dec. 20, 2002, for commonly owned U.S. Appl. No. 09/305,817. 17 pages.

Jun. 20, 2003 Response to Office Action, mailed Dec. 20, 2002, for commonly owned U.S. Appl. No. 09/305,817. 23 pages.

Office Action, mailed Jul. 22, 2003, for commonly owned U.S. Appl. No. 09/305,817. 16 pages.

Office Action, mailed Apr. 6, 2004, for commonly owned U.S. Appl. No. 09/305,817. 2 pages.

Altiero, S.F., Dahle, D.R., Weiss, J.G., "Insight: Unlocking Value—Outsourcing is an important tool to help insurance manage claims," (2 pgs.); Best's Review, Jun. 1, 2004 Issue© 2009 A.M. Best Company, published under license from the Gale Group, Farmington Hillis, MI.

Merante, J., Castelli, T., "Advantages of express claim handling," IBM, vol. 5, No. 9, http://www-03.ibm.com/industries/financialservices/doc/content/news/newsletter/1135797, Sep. 9, 2004.

Accenture, Gartner, "Insurance Insights: Insights into Innovations in the insurance industry from Accenture with Gartner research," vol. 1, No. 3, Jun. 2004© 2004 Accenture.

"Report on the Filing or Determination of an Action Regarding a Patent or Trademark," identifying U.S. Patent No. 7,013,284 B2 asserted in *Accenture Global Services GmbH, et al.* v. *Guidewire Software, Inc.*, Dkt. No. 07cv826, D. Del. Dec. 18, 2007. 1 page.

"Answers and Counterclaims," filed on Feb. 6, 2008 in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007, 25 pages.

Accenture's Reply to Guidewire's Counterclaims with Defenses filed Mar. 25, 2008, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 13 pages.

Defendant Guidewire Software Inc.'s Objections and Response to Plaintiff Accenture's First Set of Interrogatories, Aug. 22, 2008, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. pp. 1-5.

Accenture's Amended Complaint for Patent Infringement, Trade Secret Misappropriation, and related State Law Claims filed Nov. 13, 2008, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 17 pages.

Accenture's Second Amended Complaint for Patent Infringement, Trade Secret Misappropriation, and related State Law Claims filed Dec. 17, 2008, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 19 pages.

Guidewire's Answer to Second Amended Complaint filed Jan. 9, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 19 pages.

Accenture's Reply to Guidewire's Counterclaims with Defenses to Accenture's Second Amended Complaint filed Jan. 29, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 9 pages.

Memorandum Opinion filed Jul. 1, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 11 pages.

Accenture's Reply to Guidewire's Amended Counterclaims with Defenses to Accenture's Second Amended Complaint filed Aug. 6, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 14 pages.

Joint Claim Construction Statement filed Sep. 29, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 7 pages.

Joint Claim Construction Appendix vol. III of III Exhibits 3-4 filed Oct. 2, 2009, in lawsuit asserting U.S. Patent No. 7,013,284 B2, captioned *Accenture Global Services GmbH, et al.* v. *Guidewire Software, Inc.*, Dkt. No. 07cv826, D. Del. Dec. 18, 2007. 219 pages.

Muth et al., "Integrating Light-Weight Workflow Management Systems within Existing Business Environments", Proceedings, 15th International Conference on Data Engineering Mar. 23-26, 1999. 8 pages.

Response to Non-Final Office Action dated Nov. 9, 2010, for commonly owned U.S. Appl. No. 12/691,515, filed May 6, 2011. 6 pages.

Patent Owner's Response with Appendices dated May 4, 2011, for Reexamination No. 90/010,735 regarding commonly owned U.S. Patent No. 7,617,240. 55 pages.

Appendix AA—Declaration of John A. Pierce dated May 3, 2011, and Accompanying exhibits, filed with Patent Owner's Response of May 4, 2011, in Reexamination No. 90/010,735 regarding commonly owned U.S. Patent No. 7,617,240. 8 pages.

Appendix BB—Therese Rutkowski, "Keeping the Promise: Insurance Network News Executive Strategies for Technology Management" Feb. 1, 2002, filed with Patent Owner's Response of May 4, 2011, in Reexamination No. 90/010,735 regarding commonly owned U.S. Patent No. 7,617,240. 3 pages.

Appendix CC—"Affirmative Insurance Selects Accenture Claims Solution for Its Transformation Program" Sep. 13, 2007, filed with Patent Owner's Response of May 4, 2011, in Reexamination No. 90/010,735 regarding commonly owned U.S. Patent No. 7,617,240. 4 pages.

Appendix DD—"Accenture Claim Components Solution Version 6.0 Implemented At OneBeacon" Jul. 10, 2007, filed with Patent Owner's Response of May 4, 2011, in Reexamination No. 90/010,735 regarding commonly owned U.S. Patent No. 7,617,240. 4 pages.

Appendix EE—"Kemper Insurance Selects Accenture's Claim Components Software" May 14, 2002, filed with Patent Owner's Response of May 4, 2011, in Reexamination No. 90/010,735 regarding commonly owned U.S. Patent No. 7,617,240. 4 pages.

Appendix Z—Celent, "Claim Systems Vendors: North American P/C Insurance 2011" Jan. 2011, filed with Patent Owner's Response of May 4, 2011, in Reexamination No. 90/010,735 regarding commonly owned U.S. Patent No. 7,617,240. 143 pages.

Patent Owner's Petition to Expunge the Request for Reexamination and Vacate the Filing Date and Order Granting Reexamination dated May 4, 2011, for Reexamination No. 90/011,484 regarding commonly owned U.S. Patent No. 7,013,284. 6 pages.

Advisory Action issued May 27, 2011, for Reexamination No. 90/010,735 regarding commonly owned U.S. Patent No. 7,617,240. 4 pages.

Memorandum Opinion filed May 31, 2011, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages. Dkt. No. 527.

Guidewire's Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 25 pages. Dkt. No. 207.

Declaration of Clement S. Roberts in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 3 pages. Dkt. No. 208.

Exhibit 3—Accenture Newsroom, "Accenture Unveils Enhanced Property and Casualty Insurance Software Platforms", http://newsroom.accenture.com/article_display.cfm?article_id=5212, in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 4 pages. Dkt. No. 208-1.

Exhibit 4—"Segment" definition, http://www.merriam-webster.com/dictionary/segment, in Support of Guidewire Inc.'s Answering Claim Construction Brief filed May 27, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 3 pages. Dkt. No. 208-1.

Diamond Personal Auto, Applied Systems, Date Unknown. Deposition Exhibit 123, 12 pages.

The Diamond System—Overview and Features. http://web.archive.org/web/19981201192832/www.appliedsystems.com/Diamond/overview.htm. I. Printed from the Internet May 31, 2009. Deposition Exhibit 141, p. 1.

Freedom's Claim Station, the Freedom Group, 1999. Deposition Exhibit 151, 14 pages.

"The Claims Workstation", The Freedom Group, 1997. Deposition Exhibit 154, 4 pages.

"AAA Missouri Implements Claims Management System", Case Study—The Freedom Group, 1998. Deposition Exhibit 156. 2 pages.

"Higher Customer Satisfaction. Lower Leakage. With Freedom's Claims Workstation." The Freedom Group, 1998. Deposition Exhibit 157, 4 pages.

Fawley, "Arbella Mutual Insurance Company Adds Freedom's Claims Workstation", The Freedom Group, Apr. 2, 1998. Deposition Exhibit 158, 2 pages.

Fawley, "Permanent General Assurance Corporation Adds Freedom's Claims Workstation", The Freedom Group, Dec. 29, 1998. Deposition Exhibit 159, 2 pages.

"AAA Missouri Implements Claims Management System", Date Unknown. Deposition Exhibit 160, 1 page.

Fawley, "The Concord Group Insurance Companies Go 'Live' with Freedom's Claims WorkStation", The Freedom Group, Feb. 1, 1999. Deposition Exhibit 161, 2 pages.

"Claims Workstation", USPTO Trademark Electronic Search System (TESS), printed from United States Patent and Trademark Office website Apr. 10, 2009. Deposition Exhibit 163, 2 pages.

Publically available documents taken from the Internet Archive on the Diamond System—http://web.archive.org/web/19970619183517/www.appliedsystems.com/compsys.htm, circa 1997, 12 pages.

Publically available documents taken from the Internet Archive on the Claims Workstation—web.archive.org/web/19971008183730/www.freedomgroup.com/tfgclmws.htm, circa 1997, 3 pages.

Publically available documents taken from the Internet Archive on the Pyramid—web.archive.org/web/19981212032130/http://www.pyramidservices.com, circa 1998, 37 pages.

Stipulation and Order of Partial Dismissal filed Jun. 17, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 4 pages. Dkt. No. 219.

Final Judgment filed Jun. 22, 2011, in lawsuit asserting U.S. Patent No. 7,617,240, captioned *Accenture Global Services GmbH, et al. v. Guidewire Software, Inc.*, Case No. 09cv848, D. Del. Nov. 10, 2009. 1 page. Dkt. No. 221.

Issue Notification mailed Jun. 22, 2011, for commonly owned U.S. Appl. No. 09/305,146. 1 page.

Office Action mailed Jul. 20, 2011, in commonly owned U.S. Appl. No. 12/691,515. 15 pages.

Nov. 21, 2011 Response to Office Action issued Jul. 20, 2011, in commonly owned U.S. Patent Application No. 12/691,515. 9 pages.

Ex-Parte Re-Examination Certificate issued Dec. 6, 2011, in commonly owned U.S. Patent No. 7,617,240 (Re-Examination Application No. 90/010,735). 2 pages.

Appeal Brief filed Oct. 12, 2011 by Plaintiff-Appellant Accenture Global Services GmbH and Accenture LLP, in United States Court of Appeals. Appeal from United States District lawsuit asserting U.S. Patent No. 7,013,284 B2, captioned *Accenture Global Services GmbH, et al. v. Guidewire Software, Inc.*, Case No. 07cv826, D. Del. 12/18/07. Appeal Case No. 2011-1486. 50 pages.

Dec. 1, 2011 Office Action issued in commonly owned U.S. Patent Application No. 13/180,318. 5 pages.

Non-Confidential Brief of Defendant-Appellee Guidewire Software Inc., filed Jan. 6, 2012, in United States Court of Appeals. Appeal from United States District lawsuit asserting U.S. Patent No. 7,013,284 B2, captioned *Accenture Global Services GmbH, et al. v. Guidewire Software, Inc.*, Case No. 07cv826, D. Del. 12/18/07. Appeal Case No. 2011-1486. 74 pages.

\* cited by examiner

AUTOMATED ASSIGNMENT OF INSURABLE EVENTS

FIELD OF THE INVENTION

The present invention relates generally to insurance, and more particularly, to a system for automated assignment of insurable events as a function of information associated with the insurable event.

BACKGROUND

Issuing insurance policies and processing insurance claims of previously insured customers is a significant part of the business activities of insurance companies. When handling a new insurance claim (or other insurable event), the process of getting the insurance claim information to the appropriately skilled individual (claim handler) within an insurance company's claims organization is, for many insurance carriers, a manual process. Many times this is the responsibility of managers within the insurance claims organization portion of the insurance business.

Depending to some extent on the skills of the managers and the processes utilized, a number of inefficiencies may be present. The inefficiencies may lead to increased handling time for new insurance claims. Examples of inefficiencies that cause increased handling time include bottlenecks caused by the manual assignment process, inappropriate assignment due to of lack of manager skill with various types of insurance claims, and inefficiencies because many similar insurance claims of relatively low complexity require the same assignment attention of the managers as high-complexity claims.

In larger insurance organizations, managers may also have difficulty in determining the availability and existing workload of claims handlers. Accordingly, schedule conflicts among the insurance claims assigned to specific claim handlers may create further inefficiency. In addition, managers may have difficulty identifying potential claim handlers with the technical skills appropriate for certain types of insurance claims. When claims are not optimally assigned, further inefficiencies may occur such as increased cost of negotiated insurance claim payment due to lack of skill of the assigned claim handler. The inefficiencies related to increased handling time may become especially acute in insurance organizations having multiple offices in various geographic locations. With various geographically distant offices, it is difficult for managers to remain familiar with the expertise and availability of the various claims handlers at the different locations. As is readily apparent, similar inefficiencies may be present in the manual assignment of any other type of insurable event.

SUMMARY

The present invention includes an automated assignment system capable of determining the proper assignment and automatically assigning insurable events to organizational entities such as internal or external adjusters, vendors, offices, teams and/or other third parties associated with an insurance organization. The automated assignment system is lightweight and configurable to provide insurance organizations fast, accurate and efficient assignment of insurable events.

The automatic assignment of an insurable event is performed with the automated assignment system by systematically choosing the organizational entity or entities best able to handle the insurable event. Systematic selection of the organizational entity or entities may be based on properties associated with the insurable event that are stored in a memory device. Analysis of the properties with the automated assignment system may be used to categorize and automatically assign the insurable event. Properties considered by the automated assignment system during categorization and automatic assignment may include jurisdiction, line of business, complexity, insurable event group and assignment group.

The automated assignment system may also consider factors such as experience/skills, availability and/or workload related to the organizational entity or entities during automatic assignment. The availability of organizational entities being considered for automatic assignment may vary from week to week and/or between different organizational entities. (i.e. holidays, vacations, part-time vs. full-time, etc.). The automated assignment system may also perform load balancing when assigning insurable events to organizational entities. Load balancing may be based on consideration of current workload, such as, the number of insurable events currently assigned in a given period, resource availability percentages assigned to each organizational entity, etc.

Insurable events may also be identified as exceptions by the automated assignment system. For example, insurable events not fitting within automatic assignment rules may be identified as exceptions. Insurable events identified as exceptions may be automatically assigned to organizational entities identified as exception organizational entities capable of addressing such insurable events. The automated assignment system may automatically assign such insurable events to an exception organizational entity or entities by similarly considering properties and/or factors associated with the insurable event and/or the exception organizational entity.

The automated assignment system may also have access to a pattern analyzer system. Data associated with the insurable event may be used to trigger one or more specific determined patterns (or profiles) to divide the insurable event into segments. The patterns within each of the segments may be analyzed to provide different outcomes. At least one outcome from each of the segments may be selected for aggregation with the other selected outcomes to generate a pattern result. Where there are multiple outcomes in one or more of the segments, the outcomes from the segments may be sequentially selected for aggregation to produce a plurality of pattern results. The pattern results may be part of the properties considered by the automated assignment system during automatic assignment.

Further objects and advantages of the present invention will be apparent from the following description, reference being made to the accompanying drawings wherein preferred embodiments of the present invention are clearly shown.

DETAILED DESCRIPTION

The present invention includes an automated assignment system for automated assignment of insurable events. Data representative of an insurable event may be analyzed by the automated assignment system. Based on automated data analysis as well as availability and workload considerations, one or more organizational entities associated with an insurance organization may be identified by the automated assignment system. The identified organizational entity or entities may be automatically assigned to handle (e.g. manage and/or work on) the insurable event by the automated assignment system.

The automated assignment system may be utilized for assignment of any insurable event. As used herein, the term "insurable event" refers to any business related to an existing insurance policy, and the corresponding business related to claims against that policy including application for a new insurance policy, renewal of an insurance policy, changes to an existing insurance policy, first notice of loss or fraud investigation.

Figure 1:
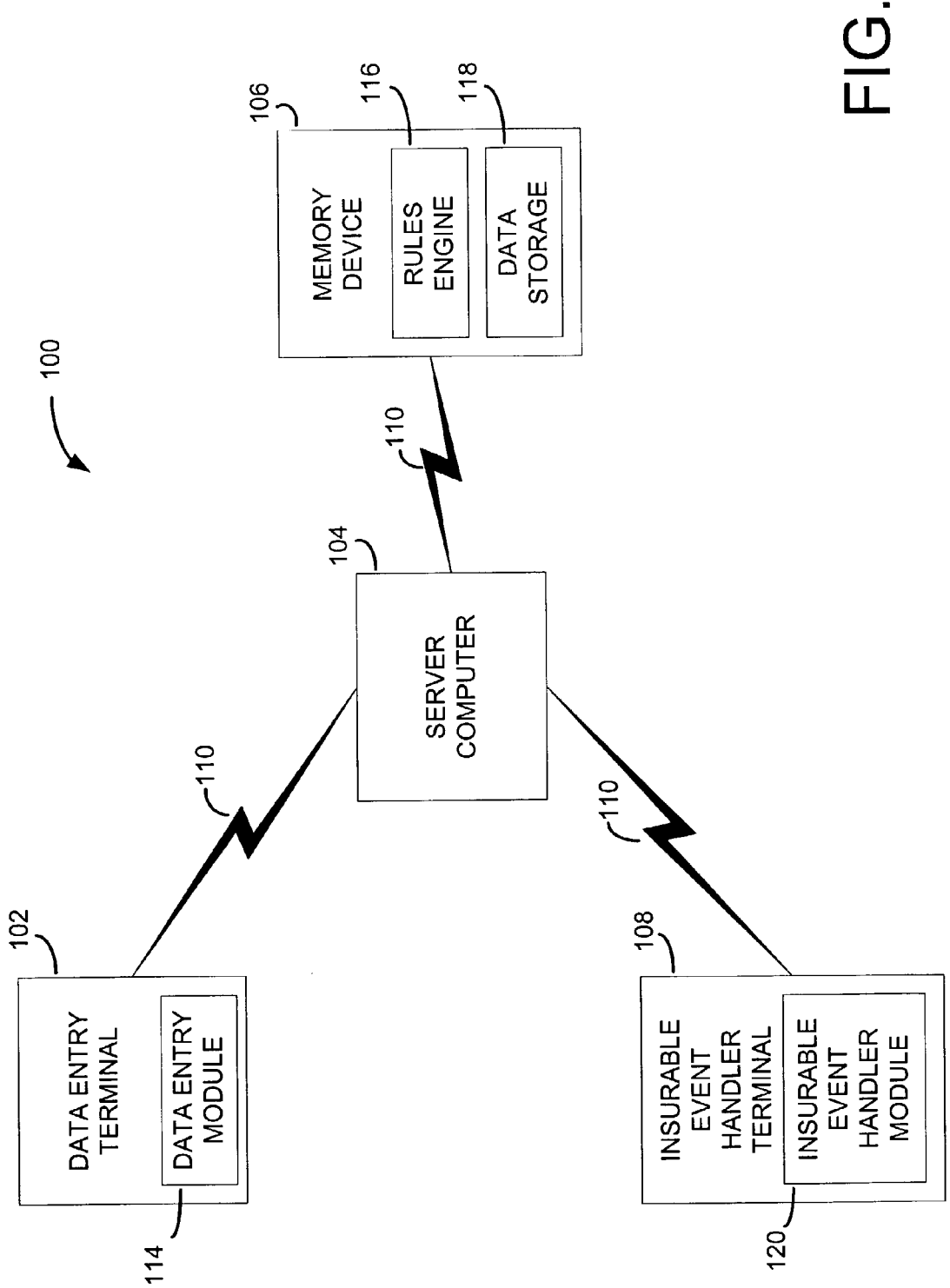
FIG. 1 is a block diagram of an example automated assignment system.

FIG. 1 is a block diagram of an example automated assignment system 100. The illustrated automated assignment system 100 includes at least one data entry terminal 102, at least one server computer 104, at least one database 106 and at least one insurable event handler terminal 108 all capable of communication over a network 110. In other examples, additional terminals, servers and/or any other devices capable of being coupled with the network 110 may be included in the automated assignment system 100. As used herein, the term "coupled", "connected", or "interconnected" may mean electrically coupled, optically coupled, wirelessly coupled and/or any other form of association providing an interface between systems, devices and/or components.

The network 110 may include the Internet, a public and/or private intranet(s), an extranet(s), a dedicated communication line(s) and/or any other configuration to enable transfer of data and commands. Communication within the network 110 may be performed with a communication medium that includes wireline based communication systems and/or wireless based communication systems. The communication medium may be for example, a communication channel, radio waves, microwave, wire transmissions, fiber optic transmissions, or any other communication medium capable of transmitting data, audio and/or video information.

The data entry terminal 102 may be any device(s) with data entry capability that is also able to transmit the entered data over the network 110. Example data entry terminals 102 include a terminal, a laptop computer, a desktop computer, a personal digital assistant (PDA), a wireless phone, etc. The data entry terminal 102 may be operated by, for example, an employee of an insurance organization responsible for entry of data related to an insurable event.

As illustrated in FIG. 1, the data entry terminal 102 may also include a data entry module 114. The data entry module 114 may include instructions to enable operation of the data entry terminal 102 to provide data entry and retrieval capability. In addition, the data entry module 114 may include instructions to enable communication over the network 110 with the server computer 104. The data entry terminal 102 may operate with the data entry module 114 as a stand-alone device capable of selective communication with the server computer 104. Alternatively, the data entry terminal 102 may operate as a remote terminal dependant on communication with the server computer 104 for operational capability. Example data entry modules include LOTUS NOTES® software, proprietary software, browsers (such as NETSCAPE NAVIGATOR® or MICROSOFT EXPLORER® browser software) or any other form of executable instructions that provide data manipulation and communication capability. Data entered, retrieved and/or modified with the data entry module 114 may be transmitted over the network 110 between the data entry terminal 102 and the server computer 104.

The server computer 104 (or computer) may be any form of computing device(s) capable of receiving requests and transmitting responses over the network 110. Operation of the server computer 104 may be based on instructions selectively executed by at least one processor (not shown) operating within the server computer 104. In addition to executing instructions to provide the functionality commonly provided in computing devices operating as servers on a network, the server computer 104 may execute instructions to enable operation of the automated assignment system 100. Instructions executed by the server computer 104 may be stored in a memory device 106.

The memory device 106 may be one or more data storage devices accessible by the server computer 104. The memory device 106 may be at least one magnetic data storage device, such as a hard drive, an optical disk, a tape, etc., and/or at least one electronic memory device such as flash memory, random access memory (RAM), etc. The memory device 106 may be located within the server computer 104. Alternatively, the memory device 106 may be located anywhere within the network 110 that allows communication with the server computer 104. In another alternative, a portion of the memory device 106 may be located within the server computer 106 and other portion(s) of the memory device 106 may be located elsewhere within the network 110.

Included within the illustrated memory device 106 is at least one rules engine 116 and at least one data storage database 118. The rules engine 116 may be executable instructions capable of providing the functionality of the automated assignment system 100. In addition, the rules engine 116 may include instructions providing rules and other parameters for operation of the automated assignment system 100. The data storage database 118 may be a database, such as a relational database that allows data storage capability for data entered via the remote terminal 102. In addition, data utilized or generated during operation of the rules engine 116 may be stored in the data storage database 118. Also in communication with the server computer 104 is the insurable event handler terminal 108.

The insurable event handler terminal 108 may be any device capable of display and manipulation of information, such as, a terminal, a PC, a laptop, a wireless device, etc. The insurable event handler terminal 108 may be operated by an organizational entity associated with an insurance organization. The organizational entity may be assigned responsibility for insurable events submitted to the insurance organization. As used herein, the term "organizational entity," "organizational entities" or "OE" is broadly defined to include an individual employee, any number of individual employees, offices, work groups, teams, etc. within an insurance organization. The term "organizational entity," "organizational entities" or "OE" may also refer to individuals, offices, work groups, teams, etc. that are external to the insurance organization performing functions based on a relationship with the insurance organization.

Operating in conjunction with the insurable event handler terminal 108 is an insurable event handler module 120. Similar to the data entry module 114, the insurable event handler module 120 may include instructions enabling the capability to view, enter and manipulate data, as well as communicate data between the insurable event handler terminal 108 and the server computer 104. The insurable event handler module 120 may also provide indication of assignment of an insurable event to an organizational entity operating the insurable event handler terminal 108. In addition, the insurable event handler module 120 may enable the capability to maintain the status of the organizational entity via the insurable event handler terminal 108.

The status is indicative of the availability and workload of an organizational entity. For example, non-availability of an organizational entity during a holiday or vacation period may be indicated. Where the organizational entity is an individual, availability may be used to indicate whether the individual is in the office or out of the office. Similarly, workload may indicate the number of insurable events the organizational entity is currently addressing. Indication of availability and/or workload may be provided by the organizational entity via the insurable event handler terminal 108. Indication of availability and/or workload may also be provided by the server computer 104 based on information stored in the memory device 106.

Although illustrated as separate devices, it should be recognized that the functionality of the data entry terminal 102 and the insurable event handler terminal 108 may be combined in the same device. In addition, the illustrated automated assignment system 100 is only one example of the almost unlimited configurations of hardware, software and/or firmware capable of providing the functionality of the automated assignment system 100. Further, it should be recognized that an organizational entity may include any number of data entry terminals 102 and/or insurable event handler terminals 108.

When an insurable event, such as an insurance claim, is submitted to an insurance organization, data related to the insurable event may be entered into the data entry terminal 102. In insurance claims for example, the data may include identification of the insured, the insurance policy number, details of the insurance claim, etc. The data may be transmitted over the network 110 to the server computer 104. The server computer 104 may execute instructions within the rules engine 116 to store the data within the data storage database 118 of the memory device 106.

The server computer 104 may also execute instructions to identify additional properties associated with the stored data. As used herein, the term "properties" or "property" is broadly defined to include the entered data associated with an insurable event as well as identified attributes, parameters, classifications, categorizations, pattern results, etc., that are associated, a result of, and/or are derived from the stored data.

Properties of the stored data may include jurisdiction and line of business (LOB). Jurisdiction refers to the laws and other rules governing the insurable event, such as, the laws and rules of a State in the United States, or the laws and rules of a country, such as Germany. Line of business refers to the classification of the type of insurable event such as, property, vehicle, medical, workers compensation, etc. The types of insurable events may be further identified with line of business (also known as "feature"), such as, for example, automobile related insurable events may be related to bodily injury, collision, comprehensive, uninsured motorist, etc. Further classifications of an insurable event, such as complexity, financial impact, severity, possibility for fraud, etc. may also be performed with the rules engine 116 by the server computer 104 based on the properties associated with an insurable event.

The server computer 104 may also execute instructions to generate additional properties by categorizing an insurable event based on the available properties. In addition, as described later, patterns of the insurable event may be determined using a pattern analyzer system and the available properties to further categorize the insurable event. As used herein, "categorizing" or "categorization" refers to classification of an insurable event into a predetermined category or categories that has been identified by an insurance organization. Each of the patterns may also be referred to as a profile. In general, various patterns may be developed representative of different segments within insurable events. The patterns may be matched to an insurable event. Outcomes from each of the patterns may be aggregated to generate additional properties in the form of pattern results to further categorize the event.

Utilizing the existing and identified properties, instructions in the rules engine 116 may be executed to identify target organizational entities best able to handle the insurable event. Target organizational entities may be identified based on matching the insurable event with the skill set of organizational entities. The skill set of an organizational entity or entities may be matched to an insurable event based on, for example, identified skills, expertise, experience, efficiency, grouping with other similar insurable events, geographic location, or any other criterion related to the organizational entity or entities.

In addition, the status of the identified target organizational entities may be determined by the server computer 104. As used herein, the term "status" refers to the workload and/or availability of an organizational entity. As a function of the status of the target organizational entities, instructions in the rules engine 116 may be executed to automatically assign the insurable event to a target organizational entity or entities. Automatic assignment may involve transmission of notification and/or the data related to the insurable event over the network 110 to the insurable event handler terminal 108 of the target organizational entity or entities.

The automatic assignment capability provided by the automated assignment system 100 allows insurance organizations fast, accurate and repeatable assignment of insurable events. The insurable events may be automatically assigned to any organizational entity, such as internal or external adjusters, vendors and/or any other third parties without the need for human intervention. Automated assignment may be performed with a systematic process of choosing an organizational entity or entities based on the properties associated with the insurable event.

The organizational entity or entities may be chosen by being previously associated with one or more pattern results developed from the insurable event. Alternatively, an organizational entity or entities may be chosen based on complexity of the insurable event, experience/skills of the organizational entity or entities, availability, workload and/or any other considerations that provide efficient and cost-effective management of an insurable event. The resulting chosen organizational entity or entities will be capable of efficiently executing the process to handle the insurable event.

For illustrative purposes, the automated assignment system 100 will be further described in the context of insurable events related to insurance claims, however, application to other types of insurable events are contemplated. Insurance claims typically occur when a customer of an insurance organization experiences an incident, such as property loss/damage and/or bodily injury that is covered by an existing insurance policy issued by an insurance organization. Upon notification of an incident (first notice of loss (FNOL)), the insurance organization may utilize the automated assignment system 100 to analyze the properties associated with the incident and determine appropriate course(s) of action.

Figure 2:
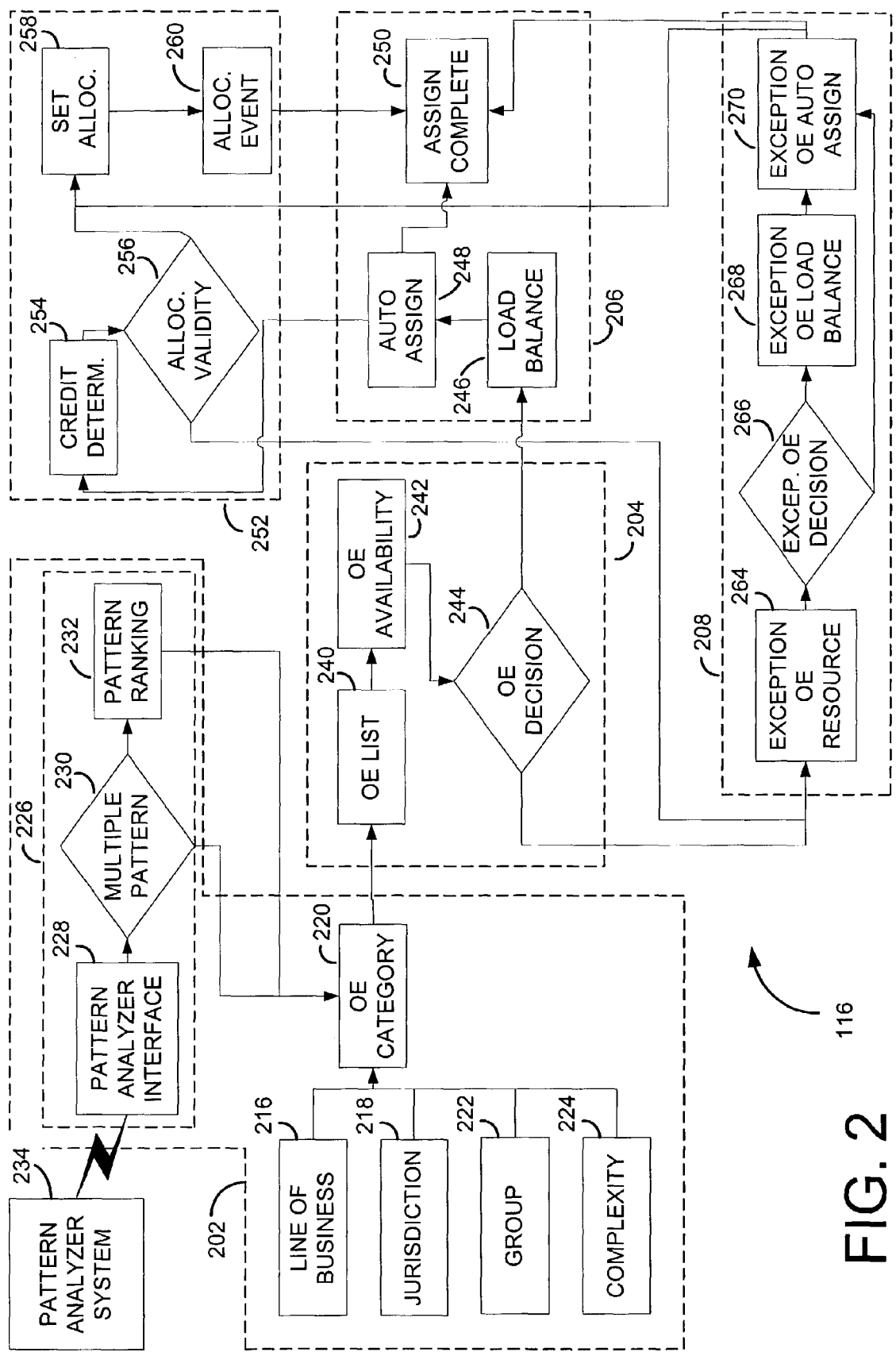
FIG. 2 is a block diagram illustrating an example rules engine within the automated assignment system of FIG. 1.

FIG. 2 is an expanded block diagram example of the rules engine 116 depicted in FIG. 1. The illustrated rules engine 116 includes a properties identification (ID) module 202, an organizational entity (OE) ID module 204, an assignment module 206 and an exception module 208. In other examples, any number of modules may be depicted to describe the functionality of the instructions within the rules engine 116.

The properties ID module 202 includes a line of business (LOB) component 216, a jurisdiction component 218 and an OE category component 220. In addition, the properties ID module 202 may include a group component 222, a complexity component 224 and a pattern analyzer module 226. In other examples, any number of components/modules may be used to describe the functionality of the instructions in the properties ID module 202. The properties ID module 202 may be utilized to process previously stored data representative of an insurable event and identify properties related to the insurable event. In addition, the properties ID module 202 may be utilized to establish the granularity for determination of the type(s) of target organizational entities selected by the automated assignment system 100 (FIG. 1).

The LOB component 216 may retrieve the line of business included as part of the stored data. The jurisdiction component 218 may similarly retrieve the jurisdiction from the stored data. The line of business and jurisdiction may be manually entered utilizing the data entry terminal 102 (FIG. 1) as part of the data related to the insurable event.

The OE category module 220 may determine the OE category or categories of organizational entities to which the insurable event may be assigned. The OE category or categories of organizational entities chosen to handle an insurable event may be individuals, groups, teams, offices, divisions and/or any other identifiable segment that is internal and/or external to an insurance organization. The organizational entities may be selected by the insurance organization to be identified within one or more OE categories based on the configured OE categories. The different OE categories within a particular insurance organization may be configured to best suit the needs of the organization.

Selection of one or more OE categories as applicable to the particular insurable event may be based on categorizing the insurable event. As previously discussed, categorization may be based on the line of business, jurisdiction, complexity, group ID and/or results provided by a pattern analyzer system 234 via the pattern analyzer module 226. The pattern analyzer system 234 includes the capability to analyze the stored data and logically determine pattern results. For example, the pattern analyzer system 234 may determine the OE categories for an insurance claim based on pattern matching the facts associated with the loss. Pattern results may also be referred to as profile results.

The pattern analyzer system 234 may, for example, provide pattern results for an insurable event that are indicative of an insurance claim related to water damage. The pattern results may be associated with a determined OE category or categories such as an OE category or categories that handles insurance claims related to water damage. In addition, any other properties include in the stored data representative of the insurable event may be utilized in the OE category determination.

The group component 222 and/or the complexity component 224 may or may not be utilized to determine properties associated with an insurable event. Where applicable, the group component 222 may retrieve a group ID associated with the stored insurable event. The group ID may be an identifier to associate related insurable events, such as insurance claims resulting from a single event such as a hurricane, fire, earthquake, etc. The complexity component 224 may retrieve a complexity identifier indicative of the level of complexity of the insurable event.

The group ID and/or complexity may be a manually entered within the stored data or may be determined with the pattern analyzer system 234. For example, the pattern analyzer system 234 may determine the group ID by pattern matching parameters within different insurable events. Complexity of an insurable event may also be determined with the pattern analyzer system 234 using, for example, pattern matching of estimates of loss, number of different individuals involved, severity of injury, complexity of the insurance policy involved, etc.

The pattern analyzer module 226 includes a pattern analyzer interface component 228, a multiple pattern component 230 and a pattern ranking component 232. The pattern analyzer interface component 228 may provide an interface between the automated assignment system 100 and the pattern analyzer system 234. The pattern analyzer interface component 228 may be used to trigger processing by the pattern analyzer system 234 of data associated with an insurable event. Processing may be triggered by transmitting over the network 110 a processing request that includes the data associated with the insurable event. Alternatively, identification of the insurable event may be transmitted, and the pattern analyzer system 234 may access the associated data directly from the memory device 106 (FIG. 1).

The pattern analyzer system 234 may analyze the data associated with an insurable event and return one or more pattern results. To obtain the pattern results the properties associated with individual insurable events may be divided into segments or dimensions that may also be referred to as pattern types. Each of the segments may be identified by matching the properties associated with the insurable event to one or more associated patterns that may also be referred to as components. Each of the matched patterns may provide an outcome resulting from analysis of the data associated with the insurable event that is matched to the pattern.

The outcomes from each of the patterns may be aggregated to form pattern result(s). Aggregation may involve automated analysis of the outcomes with respect to each other to arrive at a result that is representative of the patterns when considered in totality. For example, in an insurance claim, a first outcome from a first pattern may be indicative of unusually high financial losses. A second outcome from a second pattern may be indicative of an unusually high number of previous insurance claims. Aggregation of the first and second outcomes may therefore indicate a pattern result of high potential for fraud. The pattern result(s) may be transmitted over the network 110 to the pattern analyzer interface component 228. Another pattern analysis system and process is described by U.S. patent application Ser. No. 09/649,766 filed on Aug. 28, 2000 entitled "Insurance Exchange," which is herein incorporated by reference.

The pattern result(s) may provide a more informed automated decision regarding assignment of insurable events to an organizational entity or entities. Assignment may be accomplished by linking the different pattern results with organizational entities and/or groups of organizational entities associated with the insurance organization. For example, a pattern result of an insurance claim may indicate the insurance claim involves water damage with relatively high replacement/repair costs. In another example, a pattern result may indicate the insurance claim is for water damage and that the property damaged by water includes difficult to replace items, such as antique or custom built furniture. One or more organizational entities with heavy water damage expertise may be associated with the pattern result indicative of high replacement/repair costs. Similarly a different organizational entity or entities with unique property compensation expertise may be associated with the pattern result indicative of difficult to replace items. Alternatively, the pattern result(s) may be considered in some form of rules based logical analysis to identify organizational entity or entities or groups of organizational entities associated with the insurance organization.

Where multiple outcomes are identified for one or more segments of an insurable event, a number of different aggregations of outcomes may be performed to generate different pattern results. For example, both of the previously described pattern results indicative of water damage may be generated for the same insurance claim. Where there are multiple pattern results, the multiple pattern component 230 may be used to cache and analyze the various pattern results.

One or more of the pattern results may be selected for utilization during assignment of an insurable event. For example, the multiple pattern component 230 may launch an externalized function (not shown), such as some form of pattern selection application to determine which pattern result(s) may be used during assignment of an insurable event. In another example, an evaluation engine (not shown) may consider the various pattern results and the data associated with the insurable event to identify the most representative pattern result(s) for use in appropriate assignment of the insurable event.

Alternatively, the pattern ranking component 232 may perform ranking when multiple pattern results are identified for a single insurable event. The ranking may be based on any logical analysis of the pattern results that provides a relative importance among different pattern results. The criteria for deciding the relative importance of different pattern results may be determined by the insurance organization. For example, with insurance claims, ranking of pattern results may be based on potential financial impact of settlement of the insurance claim, potential level of fraud associated with the insurance claim, potential unwanted publicity associated with the insurance claim, potential customer satisfaction, etc. The highest ranked pattern result(s) may be selected for use during further operation of the automated assignment system 100.

The OE ID module 204 includes an OE list component 240, an OE availability component 242 and an OE decision component 244. In other examples, any number of components may be used to describe the functionality of the instructions in the OE ID module 204. The OE ID module 204 may be utilized to identify one or more target organizational entities within the OE category or categories identified with the properties ID module 202. Alternatively, where the properties ID module 202 is not present, the OE ID module 204 may consider all organizational entities associated with the insurance organization as candidates for identification as target organizational entities. In addition, instructions in the OE ID module 204 may be executed to determine the availability of the identified target organizational entities.

The OE list component 240 may be utilized to develop an OE list of target organizational entities within the identified OE category or categories. Development of the OE list of target organizational entities may be based on an assignment template. An assignment template may be selectively configured with one or more selection criteria for each organizational entity and/or group of organizational entities associated within an insurance organization that are eligible for assignment of insurable events. Configuration of the selection criteria for each assignment template may include indication of the corresponding line(s) of business, jurisdiction(s), complexity or complexities, group ID(s) (if available), OE category or categories and/or pattern results that correlate to an organizational entity or entities.

The OE list of target organization entities may be developed by matching the selection criteria in the different assignment templates with properties associated with an insurable event. Identification of target organizational entities for the OE list may be based on the configured selection criteria. Where a selection criterion is not configured within an assignment template, it may be assumed that there are no restrictions for the associated organizational entity or entities in handling insurable events for that selection criterion. For example, where the selection criteria related to complexity is left blank in an assignment template, the associated organizational entity or entities can handle any level of complexity of insurable events. Alternatively, a blank selection criterion may be used to indicate the inability of an associated organizational entity or entities to handle any insurable event that includes the respective property. For example, where the selection criteria related to the group ID is left blank in an assignment template, the associated organizational entity or entities is not capable of handling insurable events within any identified group of insurable events.

The OE availability component 242 may include instructions to determine the availability of target organizational entity or entities from the list developed by the OE list component 240. Alternatively, where the OE list component 240 is not present, the OE availability component 242 may determine the availability of all the organizational entities, or the organizational entities within the OE category or categories identified with the properties ID module 202.

Availability may be based on whether an organizational entity such as an individual employee is "in-office" or "out-of-office." "In office" refers to organizational entities that are currently available to handle an assigned insurable event such as physically present in the office, logged on to the network 110, or otherwise capable of receiving and responding to an assignment. "Out of office" refers to an organization entity that is not currently capable of responding to the assignment of an insurable event. When an organizational entity is marked as "out-of-office," the organizational entity may be considered as unavailable to have insurable events assigned to them, and the assignment may be made to a different organizational entity or entities.

The availability of each organizational entity may be maintained within the automated assignment system 100 and manually updated. For example, supervisor(s) of individual claim handlers and/or individual claim handlers may identify themselves as in or out of the office by toggling the appropriate indication within the automated assignment system 100. Such indication may be performed with the insurable event handler module 120 (FIG. 1). Future indications of when organizational entities are available may also be similarly identified. Alternatively, a calendaring system associated with the insurance organization and/or the organizational entities, such as MICROSOFT EXCHANGE® Calendar software, may be accessed by the automated assignment system 100 to provide indication of availability.

The availability determination with the OE availability component 242 may also include scheduling functionality. The scheduling functionality includes the capability to forecast and/or be provided the estimated time to complete work on an insurable event. The OE availability component 242 may utilize the estimated time to complete and review existing availability to more accurately identify whether an organizational entity is actually available. For example, if an organizational entity is indicated as available this, but unavailable for the following forty hours, the OE availability component 242 may consider the organizational entity currently unavailable in view of an insurable event with an estimated time of eight hours.

The OE decision component 244 may determine if there is an organizational entity or entities with availability as identified by the OE availability component 242. Where no organizational entities were identified with availability, instructions in the OE decision component 244 may be executed to transfer the insurable event to the exception module 208. Alternatively, where at least one organizational entity with availability has been identified, instructions in the OE decision component 244 may transfer the identified organizational entity or entities to the assignment module 206.

The illustrated assignment module 206 includes an OE load balance component 246, an automatic assignment component 248 and an assignment complete component 250. In addition, the assignment module 206 may have access to an allocation module 252. In other examples, any number of components and/or or modules may be used to illustrate the functionality of the instructions in the assignment module 206. The assignment module 206 may assign insurable events to organizational entity or entities based on the number of insurable events currently assigned, or assigned during a determined period of time. In addition, assignment may be based on a resource availability that is designated for each organizational entity.

The load balance component 246 includes instructions to consider workload capacity as well as determine existing workload and potential for additional workload for each of the target organizational entities. A workload capacity may be used to provide indication of the amount of work that is assignable to a target organizational entity. The workload capacity may be indicated by a value, such as, a workload percentage. The workload capacity may be used by the load balance component 246 to determine load balancing for insurable events to be assigned.

The workload capacity may be manually adjusted by, for example, a supervisor of the organizational entity. Manual adjustment may involve changing values stored in the automated assignment system 100. For example, if an organizational entity is a full-time employee and will be available for a full workweek of 40 hours, then the workload capacity may be set to 100, and the number of assigned insurable events that this particular resource can handle will be adjusted accordingly.

If this organizational entity switches to working as a part-time employee available only 20 hours per work week, the workload capacity may be reduced to 50, meaning that only 50% of the insurable events assigned to a full time organizational entity (100 workload capacity) will be assigned. The workload capacity may also be adjusted to account for other workload issues. For example, the workload capacity may be adjusted based on a learning curve, or to allow an organizational entity to have an easier week to catch up on things if the prior week was particularly grueling.

Automated adjustment of workload of an organizational entity may also be performed with the automated assignment system 100. Workload refers to the quantity and/or complexity of insurable events assigned to an organizational entity. Workload adjustments may be based on the estimated time to complete work on the insurable event as determined with the OE availability component 242. As insurable events are assigned and completed, workload may be adjusted automatically by the load balance component 246. A maximum and/or minimum workload may also be designated for each organizational entity. For example threshold quantities of assigned insurable events may be used to vary minimum/maximum workload. Similarly, threshold hours determined based on the total estimated time to complete previously assigned insurable events may be utilized to dynamically adjust workload.

The load balance component 246 may also be utilized to balance the amount of insurable events assigned to the different target organizational entities. Configuration of the workload balancing functionality within the load balance component 246 may be arranged in any of a number of different ways. For example, configuration may be based on the experiences of the insurance organization with certain types of insurable events. Certain types of insurable events may be identified by properties associated with each of the insurable events, as previously discussed. Alternatively, segments within each of the insurable events may be matched to patterns by the pattern analyzer system 234 to develop pattern results for use in identifying types of insurable events.

Workload balancing may be accomplished with the load balance component 246 based on the number of insurable events currently assigned to an organizational entity in a given period in view of the workload capacity of the organizational entity. The load balance component 246 may review the number of insurable events previously assigned to the target organizational entities. In addition, the workload capacity of each of the target organizational entities may be reviewed. The load balancing component 246 may operate linearly to select the organizational entity with remaining workload capacity and the lowest existing workload. For example, if a first identified target organizational entity with a workload capacity of 100 has 15 insurance claims assigned and a second identified target organizational entity with a workload capacity of 50 has 6 insurance claims assigned, then the second organizational entity may be assigned the next insurance claim.

Selection of the target organizational entity or entities for an insurable event may also include evaluation of the insurable event in view of the selected target organizational entity or entities by instructions in the automatic assignment component 248. The evaluation may include determining if additional manpower, oversight, technical support or any other form of cooperative operation is needed by other target organizational entity or entities. In addition, the evaluation may involve evaluation of the insurable event for partition into any number of sub-insurable events that are assignable to the same and/or different organizational entity or entities. The evaluation may be based on analysis of properties associated with the insurable event that include pattern results provided by the pattern analyzer system 234.

For example, where the insurable event is a very large and complex insurance claim involving multiple medical claims, property damage claims and uninsured motorist claims, the insurable event may be partitioned into a number of sub-insurable events each assigned to different claim handlers.

Similarly, where a selected target organizational entity with limited experience with certain aspects of an insurable event is assigned, another organizational entity or entities with that experience may be assigned to assist with the same insurable event.

The automatic assignment component 248 may also include instructions to assign the insurable event to a target organizational entity or entities selected by the load balancing component 246. Assignment of an insurable event may involve communication with the insurable event handler module 120 (FIG. 1) of the selected target organizational entity or entities. The communication may be in the form of a message advising of the assignment, transmittal of the stored data associated with the insurable event, addition of an entry in a list of assigned insurable events or any other form of notification that the insurable event has been assigned to the selected target organizational entity or entities.

The assignment complete component 250 may include instructions to indicate when an insurable event has been officially assigned. Official assignment of an insurable event may be used in record keeping. In addition, indication of official assignment may initiate and/or enable other processes cooperatively operating with the automated assignment system 100. For example, the indication of official assignment may initiate processes to maintain and track assignment of insurable events assigned by the automatic assignment component 248. Indication of assignment may also enable inclusion of the insurable event in a dynamic list of insurable events. The dynamic list may include the current status of each of the assigned insurable events, such as completed, pending, on hold, awaiting further information, settlement requested, etc. The current status may be entered by the organizational entity or entities assigned to the insurable event, stored and extracted for display in the dynamic list and/or printing in report form. In addition, the duration, time spent or any other parameters associated with processing the insurable event may be based on indication of official assignment of an insurable event.

Alternatively, prior to executing instructions in the assignment complete component 250, the automatic assignment component 248 may access the allocation module 252. When present, the allocation module 252 includes a credit determination component 254, an allocation validity component 256, a set allocation component 258 and an allocate insurable event component 260. In other examples any number of components may be used to indicate the functionality of the instructions within the allocation module 252.

The allocation module 252 may perform an administrative function to properly allocate credit for handling the insurable event to the proper area of the insurance organization. The proper area may be, for example, an organizational entity (such as a particular office) a grouping of organizational entities, or any other subdivision associated with the insurance organization. In other words, the allocation module 252 is utilized to account for the handling of insurable events, e.g. to give credit to the proper area associated with the insurance organization. Accordingly, in insurance organizations where such credit is not allocated or tracked, the allocation module 252 may be omitted.

The credit determination component 254 may include instructions to perform as a management tracking mechanism. The management tracking mechanism may identify target allocation(s) of an insurable event to an organizational entity, organizational entity grouping, or any other area of the insurance organization affiliated with the organizational entity or entities assigned the insurable event. Alternatively, target allocation(s) of an insurable event may be to an organizational entity, organizational entity grouping, etc., other than the organizational entity, organizational entity grouping, etc. affiliated with the organizational entity assigned to handle the insurable event. For example, when the insurable event is an insurance claim related to a hurricane in Florida, the organizational entity or entities assigned to handle the claim may be affiliated with an office in California. Credit for the insurance claim may, however, be identified by the target allocation as an office in Florida where the event occurred.

The allocation validity component 256 may be used to determine whether the target allocation(s) of the insurable event to an organizational entity, organizational entity grouping or any other area of the insurance organization is valid. Validity may be based on; for example, whether an organizational entity, organizational entity grouping, etc. indicated as the target allocation exists and is still active. When the target allocation is found to be valid, credit for the identified organizational entity, organizational entity grouping, etc. is set with the set allocation component 258. In addition, the insurable event may be officially allocated to the area identified as the target allocation with the allocate insurable event component 260. Official allocation may involve storing indication of the identified organizational entity, organizational entity grouping, etc. as part of the stored data associated with the insurable event. When the target allocation is found invalid with the allocation validity component 256, the insurable event may be transferred to the exception module 208 for further processing.

The exception module 208 includes an exception organizational entity (OE) resource component 264, an exception OE decision component 266, an exception OE load balance component 268 and an exception OE automatic assign component 270. In other examples, any number of components may be used to represent the functionality of the instructions in the exception module 208. The exception module 208 provides for automated assignment of insurable events that were not automatically processed and/or assigned with the other modules in the automated assignment system 100. Those insurable events identified as exceptions by the other modules may be handled with the exception module 208. As previously discussed, exceptions may occur when an organizational entity or entities is not identified by the OE ID module 204 and/or when allocation of the credit for an insurable event is invalidated by the allocation module 252. In addition, the exception module 208 may be configured based on the needs of a particular insurance organization to handle any other insurable events identified as exceptions.

The exception OE resource component 264 may be used to automatically develop a list of target exception OEs capable of handling the type(s) of exception(s). In addition, availability of the target exception OEs may be automatically determined with the exception OE resource component 264. The target exception OEs are organizational entity or entities identified by the insurance organization to manage and/or work on insurable events identified as exceptions by the automated assignment system 100.

For example, the list of exception OEs developed for an insurance claim may be the most experienced claim handlers associated with the insurance organization. In another example, the exception OEs may be organizational entity or entities with claim assignment experience capable of manually reviewing the data associated with the insurance claim and manually assigning the insurance claim to an appropriate organizational entity or entities. In yet another example, the exception OEs may be organizational entity or entities that review the stored data associated with the insurable event and make amendments. The amendments may include correcting the data associated with the insurable event, determining and adding additional data, etc. The amended data associated with the insurable event may then be re-processed with the automated assignment system 100 to automatically assign the insurable event.

Similar to the OE list component 240, the OE list of target exception OEs may be automatically developed with the exception OE resource component 264 based on an assignment template. In addition, the exception OE resource component 264 may determine the availability of target organizational entity or entities within the OE list similar to the OE availability component 242. The exception OE decision component 266 may be used to determine if any exception OEs were listed and available similar to the OE decision component 244. If at least one target exception OE is listed, the exception OE load balance component 268 may be used to perform workload balancing similar to the load balance component 246.

The exception OE automatic assignment component 270 may automatically assign the insurable event to a target exception OE similar to the automatic assignment component 248. The issue assignment complete component 250 may then be used as previously described to complete the automated assignment process. Alternatively, the allocation module 252 may also be used to allocate credit for the insurable event to the proper area in the insurance organization as previously discussed. Where no target exception OEs were available and/or included in the OE list, the exception OE decision component 266 may identify a default exception organizational entity or entities for automatic assignment by the exception OE component 270. The identified default exception organizational entity or entities may then be automatically assigned and the insurable event may be allocated as previously discussed.

Figure 3:
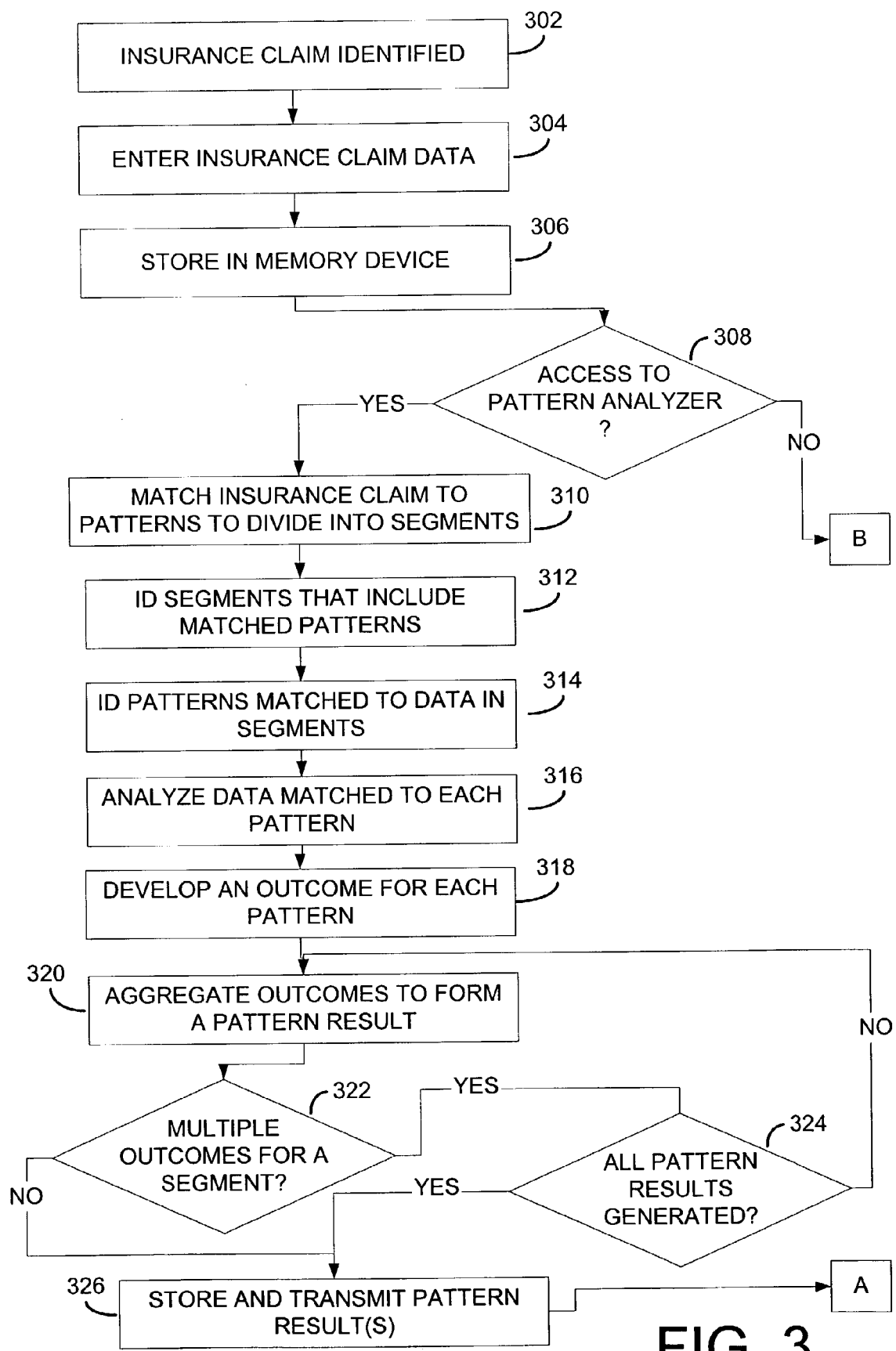
FIG. 3 is a process flow diagram depicting example operation of the automated assignment system of FIGS. 1 and 2.

FIG. 3 is a block diagram illustrating operation of the example automated assignment system 100 discussed with reference to FIGS. 1 and 2 when an insurable event in the form of an insurance claim is processed. As previously discussed, insurance claims are only one of many different types of insurable events capable of assignment with the automated assignment system 100. The operation begins at block 302 when the insurable event is identified as an insurance claim. At block 304, data associated with the insurance claim, such as the name of the insured, the type of insurance claim, etc. is entered via the data entry terminal 102. The data is transmitted over the network 110 to the server computer 104 and stored in the memory device 106 at block 306.

At block 308, it is determined if access to the pattern analyzer system 234 is available. If yes, the pattern analyzer interface component 228 is used to trigger operation of the pattern analyzer system 234 at block 310. At block 312, the insurance claim is divided into segments or pattern types by matching the data associated with the insurance claim to at least one of a plurality of determined patterns. The segments (or pattern types) that include pattern(s) that match the data associated with the insurance claim are identified at block 314. At block 316, the data associated with the insurance claim that is matched to each of the identified patterns is analyzed. An outcome for each matched pattern is developed based on the analysis of the data at block 318.

The outcomes from the matched patterns are aggregated to form a pattern result at block 320. At block 322, it is determined with the pattern analyzer system 234 if multiple matched patterns (and therefore multiple outcomes) exist for any segment of the insurance claim. If yes, at block 324 it is determined if a pattern result for each possible aggregation of the various outcomes has been generated. If no, the pattern analyzer system 234 aggregates the outcomes in a different variation and returns to block 320 to obtain another pattern result. If pattern results have been generated for all possible aggregations at block 324, the pattern result(s) are stored and transmitted to the pattern analyzer interface component 228 at block 326. Referring back to block 322, if there are not multiple outcomes for any segment of the insurance claim, the operation proceeds directly to block 326 to store and transmit the pattern result(s).

Figure 4:
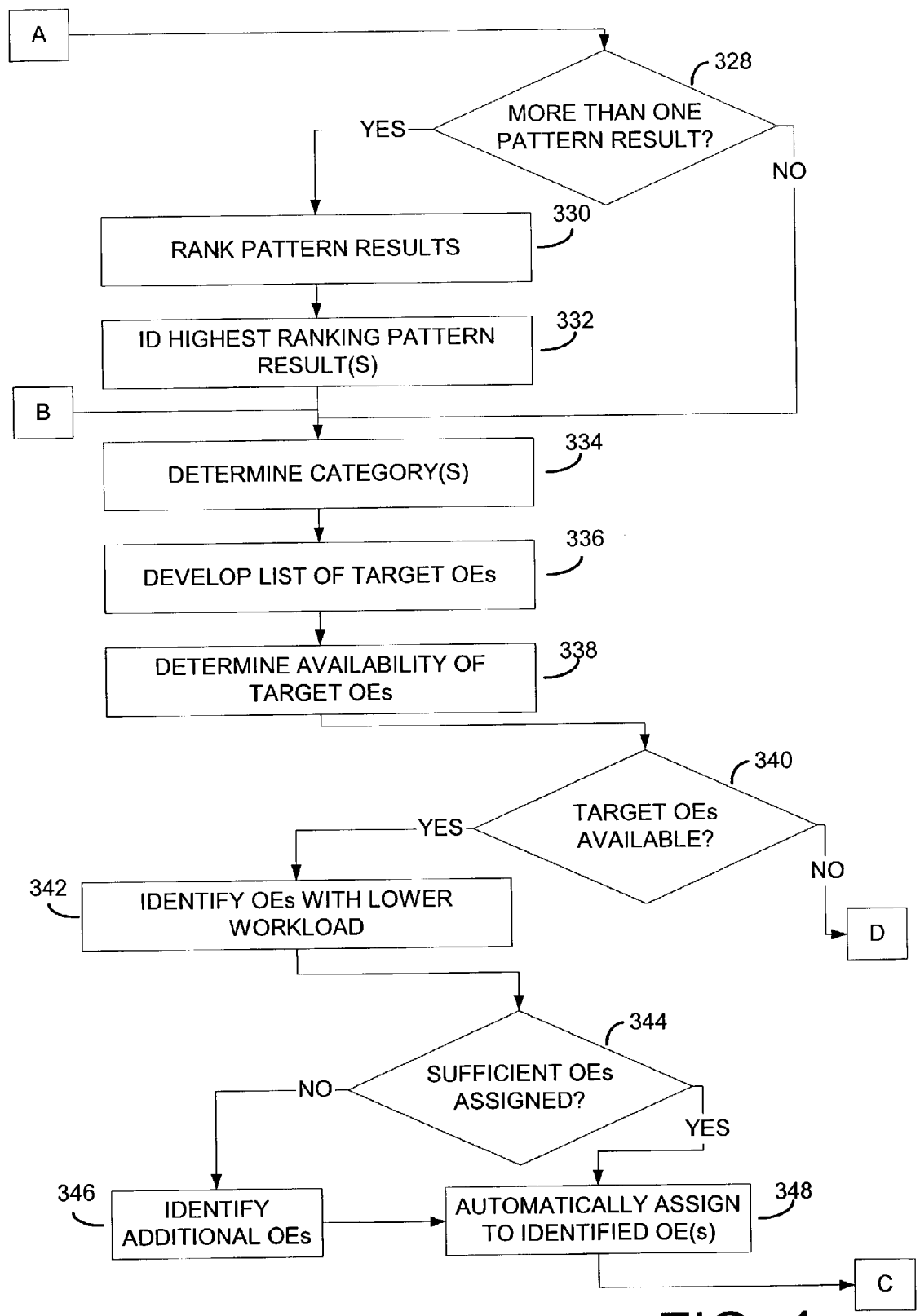
FIG. 4 is a second portion of the flow diagram illustrated in FIG. 3.

Referring now to FIG. 4, at block 328, it is determined if there is more than one pattern result transmitted to the automated assignment system 100. If yes, the pattern ranking component 232 is used to rank the different pattern results at block 330. At block 332, the highest ranking pattern result(s) is provided to the OE category module 220. The OE category module 220 is used to determine the OE category or categories at block 334. Referring again to block 328, if there is not more than one pattern result, the operation proceeds directly to block 334 to determine the OE category or categories. Similarly if at block 308 of FIG. 3, the pattern analyzer system 234 is unavailable, the operation proceeds to block 334 of FIG. 4 to determine the OE category or categories.

At block 336, the OE list component 240 is used to develop an OE list of target organizational entities (OEs) utilizing data associated with the insurable event and/or the pattern results from the pattern analyzer system 234. The OE list may be utilized with the OE availability module 242 to determine the availability of the target organizational entities at block 338. At block 340 the decision component module 244 is used to determine if one or more target organizational entities are available from the OE list.

If yes, the load balance component 246 is used to compare the workload of the target organizational entities in the OE list and identify target organizational entity or entities with lower workload at block 342. At block 344, the automatic assignment component 248 determines if sufficient target organizational entity or entities have been identified. If not, at block 346, additional target organizational entity or entities with lower workload are identified. The identified target organizational entity or entities are assigned by the automatic assignment component 248 at block 348. If at block 344 sufficient target organizational entity or entities have been identified, the identified target organizational entity or entities are assigned at block 348.

Figure 5:
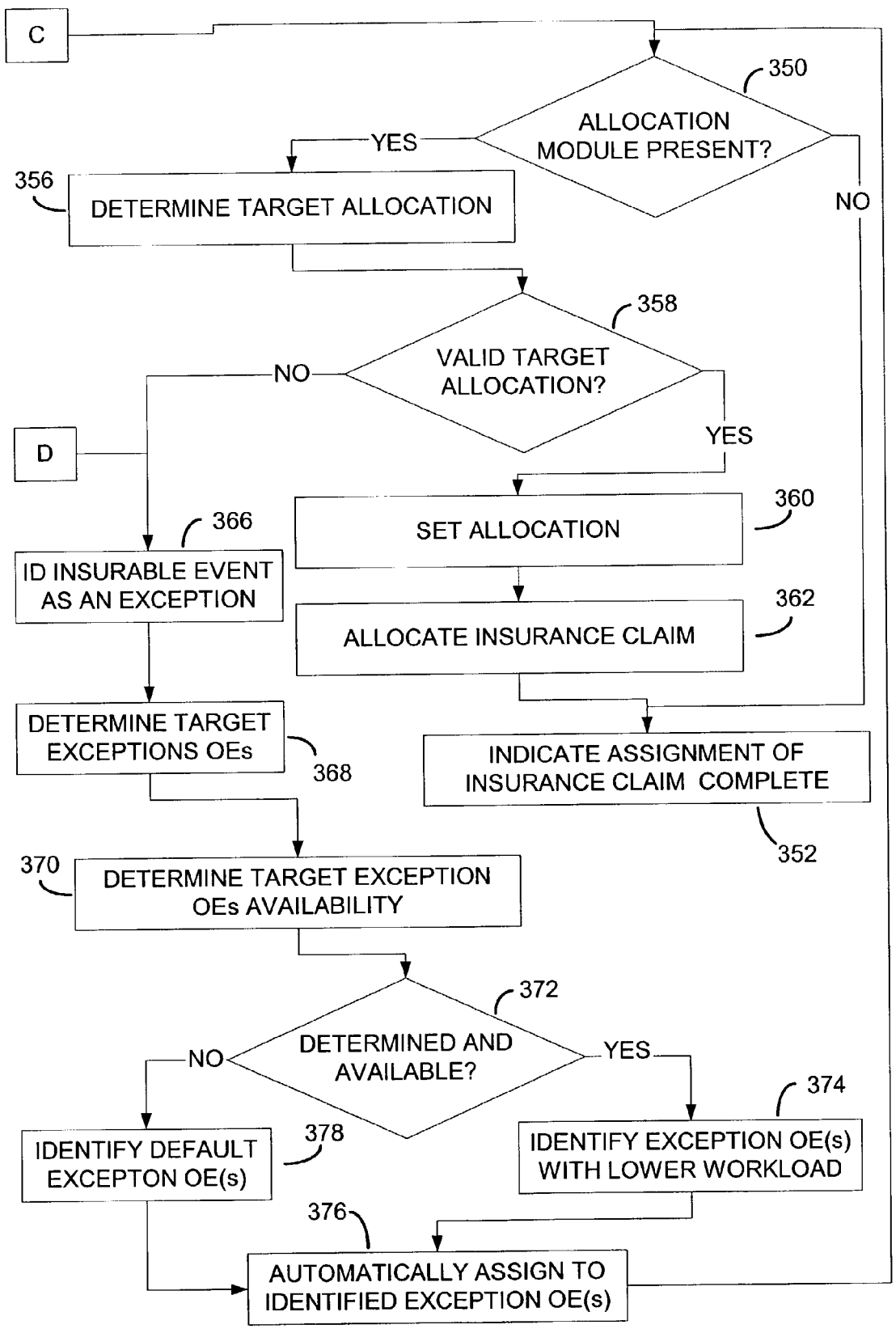
FIG. 5 is a third portion of the flow diagram illustrated in FIG. 3.

Referring now to FIG. 5, at block 350, it is determined if the allocation module 252 is present. If no, indication that assignment of the insurance claim is complete is performed with the assignment complete component 250 at block 352. If the allocation module 252 is available at block 350, the credit determination component 254 is used to determine the proper area of the insurance organization that should get credit for the insurance claim (the target allocation) at block 356. The validity of the target allocation is checked with the allocation validity component 256 at block 358. If the target allocation is valid, at block 360 allocation to the proper area is set with the set allocation component 258. At block 362, the insurance claim is allocated to the determined proper area of the insurance organization and the operation returns to block 352 to indicate the assignment of the insurance claim is complete.

If at block 358, the target allocation is invalid, the insurance claim is identified as an exception at block 366. At block 368, the exception OE resource component 264 is activated to determine target exception organizational entities. Referring again to block 340 of FIG. 4, where there are no target OEs available, the insurance claim is similarly identified as an exception at block 366 of FIG. 5 and determination of target exception organizational entities is determined. The exception OE resource component 264 determines availability of the determined target exception organizational entities at block 370.

At block 372, it is determined with the exception OE decision component 266 if any target exception OEs have been determined, and are available. If yes, the exception OE load balance component 268 reviews the workload of the target exception organizational entity or entities that are available and identifies an exception organizational entity or entities with a lower workload at block 374. At block 376, the exception OE automatic assignment component 270 automatically assigns the insurance claim to the identified target exception OE(s) and the operation returns to block 350 to determine if the allocation module 252 is present. If at block 372, no target exception organizational entities were available and/or determined, the exception OE decision component 266 identifies the default exception organizational entity or entities and the operation proceeds to block 376 to automatically assign the insurance claim.

The previously discussed automated assignment system 100 minimizes inefficiencies involved in assigning insurable events to organizational entities associated with an insurance organization. Manual assignment of insurable events may overlook the importance of maintaining a balanced workload, as well as failing to assign complex claims to the right resources with consideration toward availability, skills and expertise. The automated assignment system 100 provides automated decision making regarding assignment of insurable events that considers the status, capabilities, etc. of organizational entities during the assignment process. In addition, business rules of any insurance organization may be implemented within the automated assignment system 100 to customize the assignment process. Accordingly, the assignment process may be automated in a customized fashion to minimize the time and resources expended to get an insurable event assigned to the proper organizational entity or entities.

Referring again to FIG. 2, the automated assignment system 100 may also be leveraged through use of the pattern analyzer system 234. The pattern analyzer system 234 is an automated pattern-based decisioning process that may be utilized to perform more detailed alignment of an insurable event with the proper organizational entity or entities. By matching different segments of the insurable event to patterns, one or more outcomes may be developed for different segments of the insurable event. The outcomes from each of the segments may be aggregated to form a pattern result. Where multiple outcomes exist in a segment, each of the outcomes may be used in different aggregations to generate a plurality of pattern results.

The pattern analyzer system 234 successfully avoids the need for creation of large, complex and unwieldy super patterns by using multiple patterns and aggregating the outcomes. As such, the patterns may remain relatively small and compact allowing faster and more efficient processing by the pattern analyzer system 234. In addition, such patterns are relatively simple to create, customize, maintain and store. Further, since the outcomes of the patterns are aggregated to form pattern results simplicity and efficiency are maximized without sacrificing the level of granularity available to analyze the data associated with an insurable event.

The pattern result(s) may be used by the automated assignment system 100 during the process of assignment of the insurable event to an organizational entity or entities as previously described. For example, the pattern results may be used to identify insurance claims with immediate resolution possibilities, identify different tasks within an insurable event, identify the potential for fraud, bring consistency and optimization to the assignment process, more specifically identify required skills and expertise of organizational entities, identify "norms" within the insurable event, provide input to automated evaluations/recommendations/best practices, provide performance feedback, etc.

As should be recognized, the pattern results are readily customizable via the patterns and may be used to indicate any type of information related to the processing and/or the nature of an insurable event that is desired by an insurance organization. Accordingly, an insurance organization may develop one or more pattern results to identify different business conditions. For example, insurance events that are insurance claims may include the need for identification of a business condition of risky drivers. The business condition of risky drivers may be developed by creating patterns based on indicative properties associated with an insurance claim, such as, frequency of insurance claims, number of traffic violations, age of the driver, type of vehicle, etc.

Figure 6:
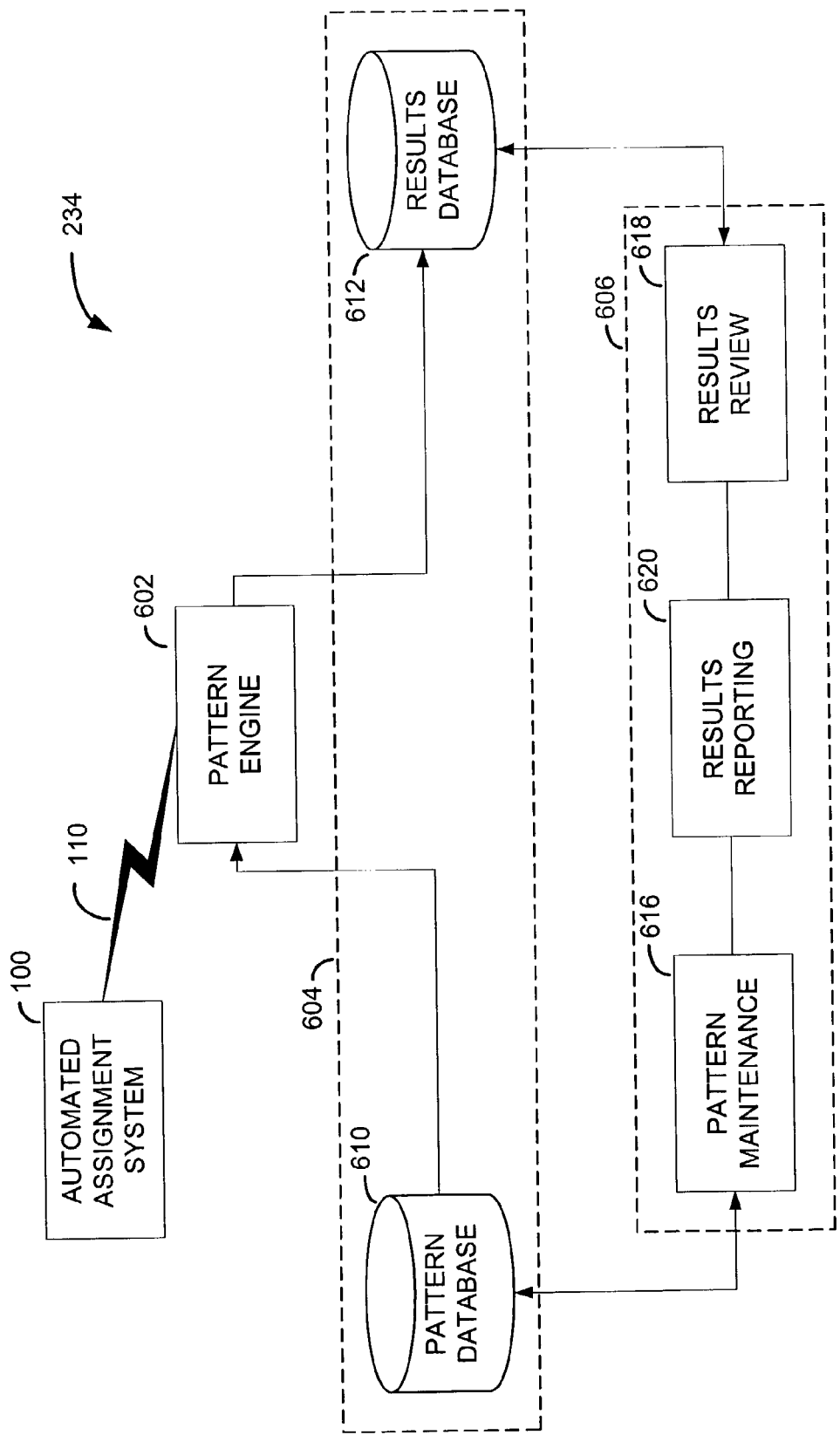
FIG. 6 is a block diagram of an example pattern analyzer system.

FIG. 6 is a block diagram depicting a more detailed example of the pattern analyzer system 234 illustrated in FIG. 2. The pattern analyzer system 234 may operate on one or more server computers capable of communication over the network 110 to generate pattern results for insurable events. Development of the pattern analyzer system 234 may be with any server computer compatible programming language, such as MICROSOFT VISUAL BASIC® software. Alternatively, the pattern analyzer system 234 may be developed with a rules based software application, proprietary software or any other application capable of providing the functionality described.

The illustrated pattern analyzer system 234 includes a pattern engine 602, a memory device 604 and a maintenance module 606. In other examples, any number of engines, modules and/or components may be used to illustrate the functionality of the pattern analyzer system 234.

The pattern engine 602 may include instructions to logically control the flow of execution of the pattern analyzer system 234. In addition, the pattern engine 602 may be used to evaluate data associated with an insurable event. Evaluation of the data associated with an insurable event may involve executing instructions in the form of rules that are stored in the memory device 604. Instructions within the pattern engine 602 may also be used to communicate the results of the evaluation of data associated with insurable events over the network 110. The results data may be communicated to the automated assignment system 100 as previously discussed. Alternatively, the results data may be communicated to other systems within an insurance organization such as, a task management system for managing and scheduling, etc. the tasks associated with an insurable event. The pattern engine 602 may also include instructions to store the results in the memory device 604. Accordingly, systems such as the automated assignment system 100 may access the memory device 604 to obtain the results.

The memory device 604 may be similar to the memory device 106 (FIG. 1) and may communicate with the pattern engine 602. The illustrated memory device 604 includes a pattern database 610 and a results database 612. The pattern database 610 may include all the rules and pattern related data utilized by the pattern engine 602. The results database 612 may include the results data generated during processing with the pattern engine 602. Accordingly, the patterns matched for each segment of an insurable event and associated outcomes, as well as the pattern results resulting from aggregation of the outcomes of the patterns may be part of the results included in the results database 612. Access to the memory device 604 may be performed with the maintenance module 606.

The maintenance module 606 includes instructions to create and maintain patterns and other rules related information, as well as view and maintain the results of processing of insurable events by the pattern engine 602. The illustrated maintenance module 606 includes a pattern maintenance component 616, a results review component 618 and a results reporting component 620. In other examples, any number of components may be illustrated to describe the functionality of the instructions in the maintenance module 606.

The pattern maintenance component 616 includes instructions to allow creation, amendment, deletion and other activities related to patterns and other related data included in the pattern database 610. Similarly, the results review component 618 may provide instructions for viewing and manipulating the results from insurable events processed with the pattern analyzer system 234 and stored in the results database 612. The results reporting component 620 may be used to generate transactional and/or summary level reports based on data in the pattern database 610 and/or the results database 612.

Figure 7:
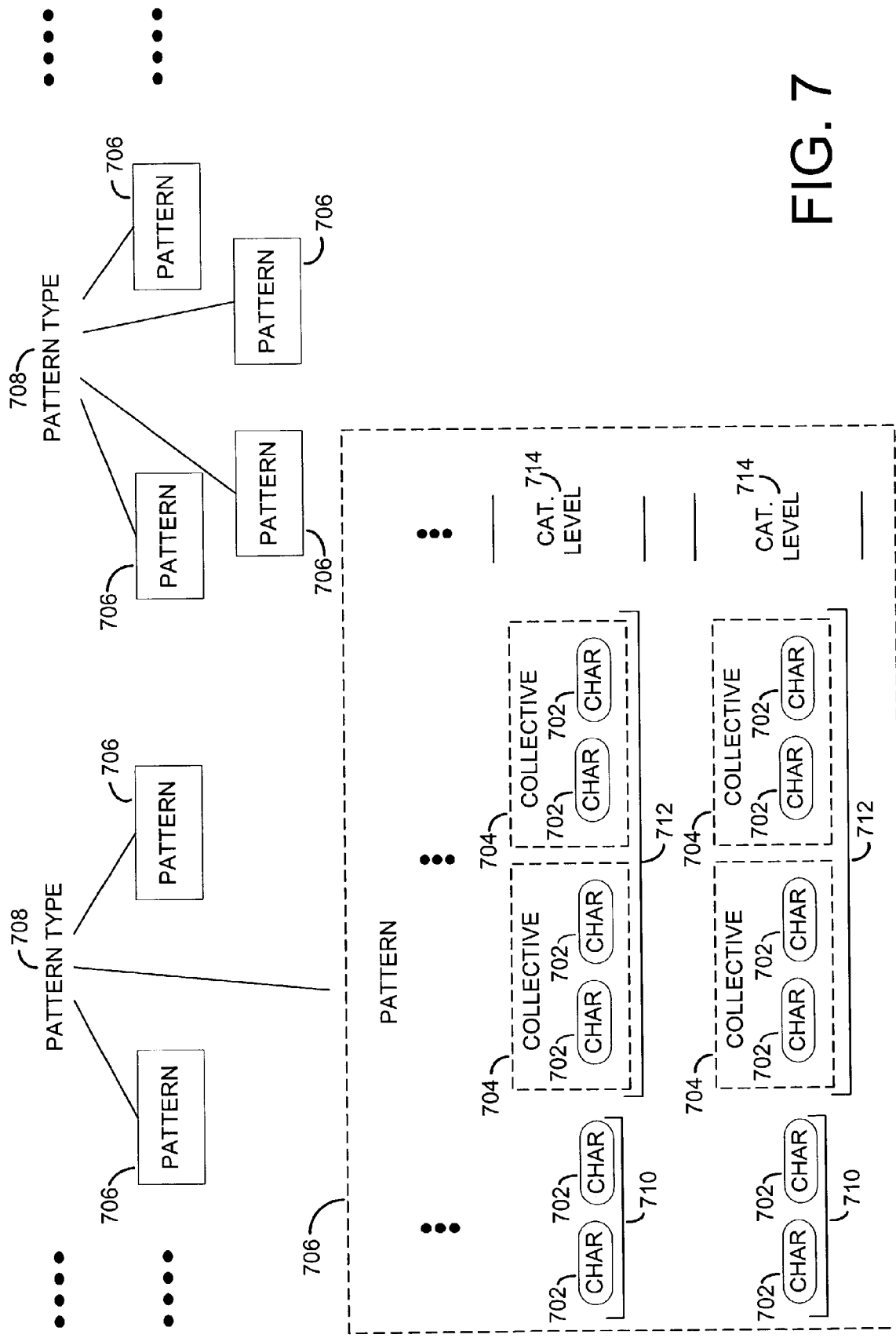
FIG. 7 is a block diagram depicting an example of data organization within a pattern database illustrated in FIG. 6.

FIG. 7 illustrates an example structure of the pattern-related data within the pattern database 612. The structure includes at least one characteristic 702 and/or at least one collective 704 that may be used to define a pattern 706. One or more patterns 706 may be included within a pattern type 708 as illustrated. A pattern type 708 may also be referred to as a dimension. Each pattern type 708 may be representative of a different segment, or class, of an insurable event. Accordingly, an insurance organization may identify any number of pattern types 708 for various types of insurable events. In addition, any number of patterns 706 representative of respective segments of the insurable event may be defined within each of the pattern types 708. Although not illustrated, the pattern types 708 may be in a hierarchal configuration to form tiers where multiple pattern types 708 in one tier may be within a pattern type 708 in a higher tier. Accordingly, the outcomes from each of a plurality of patterns 706 in one tier may be aggregated to form an outcome in another tier that may be aggregated with other outcomes in that tier.

The pattern analysis system 234 may be enabled through the user-defined components of the characteristic 702, the collective 704 and the pattern 706. As used herein, the term "pattern item" or "profile item" refers to any of the items which can make up a pattern 706, such as, characteristics 702 and collectives 704. Each pattern item may be represented by a characteristic(s) 702 or a collective(s) 704.

The characteristics 702 are the most basic component that can be used to define a pattern 706. The characteristics 702 may be considered an atomic level of assessment that look at actual data variables that are part of the data associated with an insurable event. The data variables may be compared to characteristic attributes such as, thresholds, timeframes, currency values, code values or any other value that may be associated with individual characteristics 702. The characteristic attributes may also be referred to as gradient definitions. A threshold characteristic attribute may be used in evaluation of numeric based data variables. Time frame characteristic attributes may be values in units such as days, months and years that may be used in evaluation of time-based data variables. Currency based evaluations of data variables may be performed using characteristic attributes that are currency values. Characteristic attributes that are code values may be used in code-based evaluations of codes defined at either the characteristic or characteristic category levels for individual characteristics or characteristic categories, respectively.

As a result of the comparison of the data variables to the characteristic attributes, an attribute is determined. Attributes may also be referred to as gradients. The attributes may be any determined discrete information that is descriptive of the data variables associated with the respective characteristic. For example, an attribute may be "true/false", "excellent/good/fair/poor", "above average/average/below average", "new/like new/middle age/old/unacceptable", etc. As described later, different logical combinations of the attributes may be created by logical configuration of the characteristics within a profile. The logical combination of the attributes results in outcomes. The outcomes may be aggregated to achieve a result.

An example of a characteristic for an insurance claim is "Age of Claimant Less Than 18 Years Old" or "4+Vehicles Involved in the Insurance Claim," and the corresponding characteristic attributes may be the threshold numeric values of 18 and 4, respectively. Accordingly, the characteristics 702 may be defined in view of one or more characteristic attributes that are compared to data variables expected to be present in the data associated with an insurable event. The resulting attribute for the example characteristic of "Age of Claimant Less Than 18 Years Old" may be "yes" or "no" depending on the data variable in the insurance claim that provides the claimants age.

The characteristics 702 may be grouped into characteristic categories 710 such as, in the case of an insurance claim, vehicle type, claimant age and number of claimants. Each characteristic category 710 may encapsulate one or more characteristics 702 that are defined based on the same characteristic attributes. Accordingly, the characteristics 702 grouped within a characteristic category 710 have resulting attributes that are mutually exclusive such that once the attribute for a characteristic 702 within a characteristic category 710 is defined, the attributes of other characteristics in the characteristic category are also defined. In other words, characteristic categories group characteristics that have attributes derived from the same factors or data variables.

Each characteristic 702 in a characteristic category 710 includes characteristic attributes that, when assigned a value, give the characteristic 702 a unique definition. For example, an insurance claim may have a characteristic category 710 of "claim status." A first characteristic 702 within the claim status characteristic category 710 may have a characteristic attribute of "insurance claim open." A second characteristic 702 in the claim status characteristic category 710 may have a characteristic attribute of "insurance claim closed." Depending on the values assigned to the characteristic attributes, the first and second characteristics 702 provide a unique definition (attribute) that the insurance claim is open, or that the insurance claim is closed. The unique definition is determined based on data variables within the insurable event that are analyzed with the characteristics 702. Since the first and second characteristics 702 are mutually exclusive, when the attribute of one of the first and second characteristics 702 is identified, the attribute of the other characteristic 702 is also identified. Each characteristic 702 may be defined using at least one characteristic attribute.

The collectives 704 may be defined from one or more combinations of characteristics 702 from different characteristic categories. Thus any number of characteristics 702 may be grouped together to form complex and/or reusable definitions. These definitions (collectives 704) can then be included as items in the building of patterns 706, which are the enabling component for segmentation of an insurable event. The collectives 704 may be similarly grouped into collective categories 712, with similar collectives 704 grouped into the same collective category 712. For example, in an insurance claim, injury severity or insurance claim complexity may be collective categories 712. One or more collectives 704 may also be associated with a category level 714 as described later.

A collective 704 may include at least one collective combination. A collective combination is a group of one or more characteristics 702 within the collective 704. Different collective combinations within a collective 704 may be "or"ed so that only one collective combination needs to be true for the entire collective 704 to evaluate to true. The characteristic(s) 702 within a collective combination are "or"ed if the subject characteristic(s) 702 belong to the same characteristic category 710. The characteristic(s) 702 within a collective combination are "and"ed if the subject characteristics 702 belong to different characteristic categories 710. A collective 704 may also have a collective description to identify the type of collective 704 and/or the intent of the collective 704. An example of a collective description might be "Good Operator Driving Record."

The patterns 706 may thus be developed by combining one or more rules comprised of characteristics 704 and collectives 706 organized in a logical structure. In addition, multiple patterns 706 may be developed within a pattern type 708. The rules, patterns 706 and pattern types 708 may be developed based on segmenting an insurable event into manageable segments. Segmentation allows an insurance organization to group insurable events based on similar properties associated with the insurable events and/or performance objectives of the insurance organization. The individual segments may represent levels of risk, insurance claim types or any other insurable event quality capable of being segmented. Selection of the segments in a particular type of insurable event may be specified by the insurance organization. Once an insurable event is segmented, tailored business strategies, processes, and practices based on experience and best practices may be determined for each segment.

Referring now to FIGS. 6 and 7, the pattern maintenance component 616 enables the viewing, adding, editing, and deleting of characteristics 702, collectives 704, characteristic categories 710, collective categories 712, collective descriptions, collective combinations, etc. within the pattern database 610. By providing for the creation of characteristics 702 with associated characteristic attributes, the pattern maintenance component 616 may provide the granularity necessary to build combinations and/or collectives 704 utilizing the characteristics 702. As such, the pattern maintenance component 616 may be used to create the building blocks for the pattern criteria by defining the characteristics 702 as well as characteristic categories 710 and/or collectives 704.

In addition, various category levels 714 within the pattern database 610 may be defined with the pattern maintenance component 616. The category levels 714 (or hierarchical data levels) may each include characteristics 702 and/or collectives 704 that are logically related among the various levels to form a pattern 706. For example, the category levels 714 in patterns 706 for an insurance claim may be defined as claim, line or participant to identify pattern items related to the entire insurance claim (claim), the line of business (line) and the individuals identified in the insurance claim (participants). A category level 714 is a level of data that may be defined by one or more collectives 704 and/or characteristics 702. For example, where the subject of a collective 704 is evaluated to be true based on the data variable(s) of an insurable event, the subject is true for that category level 714. The pattern maintenance component 616 may therefore provide for the creation of complex and reusable definitions/rules that may be used to build various patterns 706 to be matched against segments of an insurable event.

Existing patterns 706 may be viewed, copied, modified or deleted with the pattern maintenance component 616. In addition, the pattern maintenance component 616 may be used to add new patterns 706, view lists of selected patterns 706 as well as to search for individual patterns 706 and/or groups of patterns 706. Modification of existing patterns 706 involves amending the pattern items defining the pattern 706. Where a significant change to the pattern items is desired, a new version of the pattern 706 may be created with the pattern maintenance component 616. When a new version is desired, the pattern maintenance component 616 may create a new pattern with the same identifier, but with a new version number. Versions may also include both a "start date" and a "stop date" to indicate the timeframe when a version should utilize.

When adding a characteristic 702 and/or collective 704 to an existing pattern 706, the associated characteristic attribute(s) may be specified to be matched for any or all of a particular data variable in the data associated with an insurable event. For example, in an insurance claim, one pattern 706 may specify "ANY vehicle involved in the insurance claim is a truck", whereas a second pattern 706 may specify "ALL vehicles involved in the insurance claim are trucks", depending on the goal of the pattern 706. In this example, the underlying characteristic is "Vehicle involved in the insurance claim is a truck," and can apply to any or all vehicles depending on the usage in the pattern 706. ANY/ALL may be relevant whenever a particular characteristic 702 or collective 704 refers to entities that may have multiple occurrences in a single transaction. For example, vehicles, operators, participants, etc.

Figure 8:
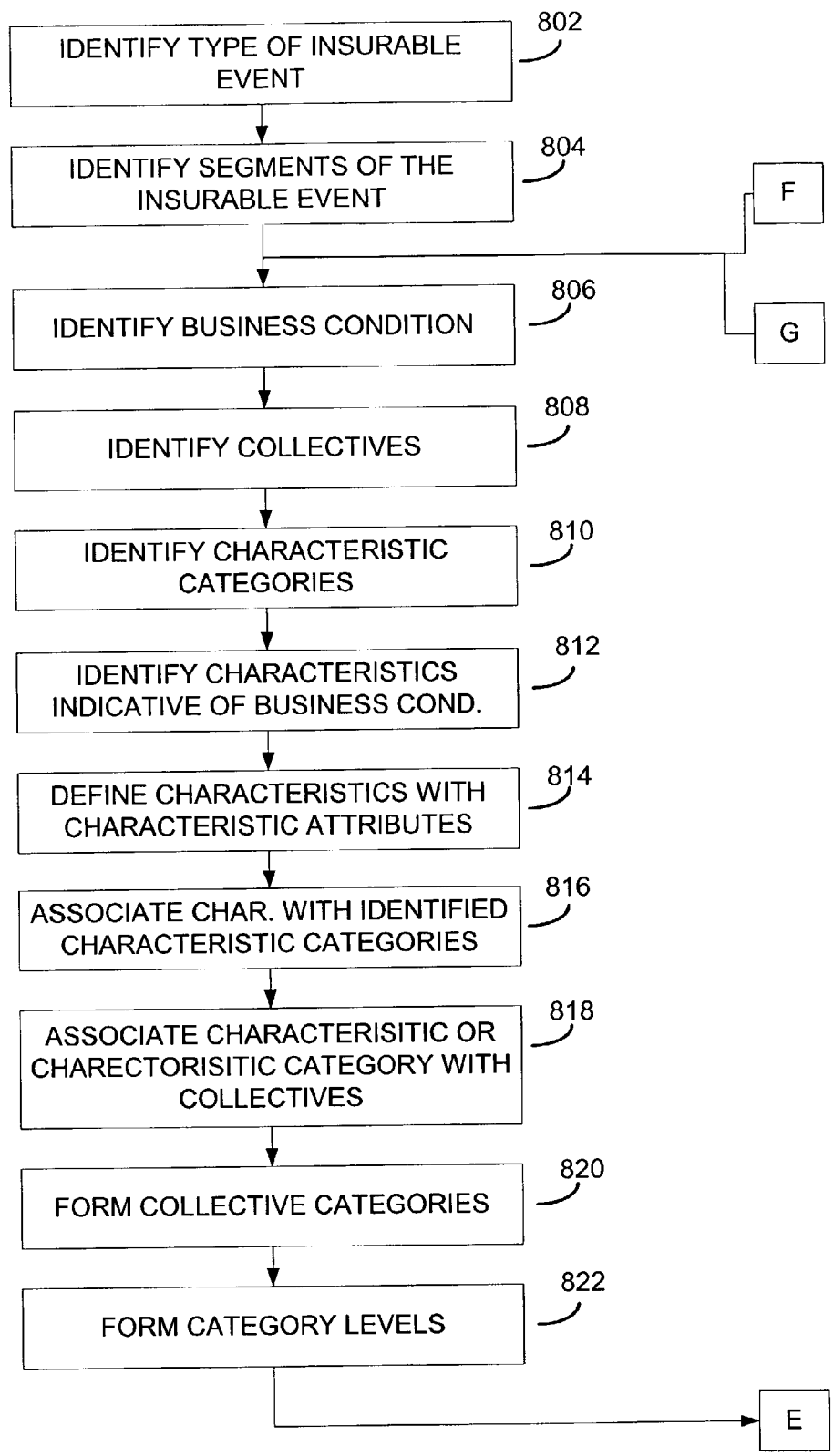
FIG. 8 is a process flow diagram illustrating example operation of the pattern analyzer system of FIG. 6 to configure the data organization depicted in FIG. 7.

FIG. 8 is a process flow diagram illustrating example configuration of the pattern analyzer system 234 illustrated in FIGS. 6 and 7 for an expected type of insurable event. At block 802, the expected type of insurable event, such as an insurance claim is identified. Various pattern types 708, such as personal injury, property damage, etc. are identified as segments of the insurable event at block 804. At block 806, a certain business condition, such as severity of personal injury, extent of property damage, fraud, etc. is identified within one of the pattern types 708.

The collectives 704 associated with the identified business condition, such as type of injury, type of property damaged, etc. are identified at block 808. At block 810, characteristic categories 710, such as length of hospital stay, vehicle type, etc. are identified for the identified business condition. The characteristics 702 indicative of the business condition such as number of individuals injured, length of hospital stay, absence from employment, etc. may be identified at block 812. At block 814, the characteristics 702 may be defined with characteristic attributes or gradients. Some of the characteristics 702 may be logically added to the identified characteristic categories 710 at block 816.

At block 818, some of the characteristics 702 may be logically added to the identified collectives 704. Some of the collectives 704 may be further logically associated to form collective categories 712 at block 820. At block 822, the collectives and/or collective categories 712 may be logically associated to form one or more category levels 714.

Figure 9:
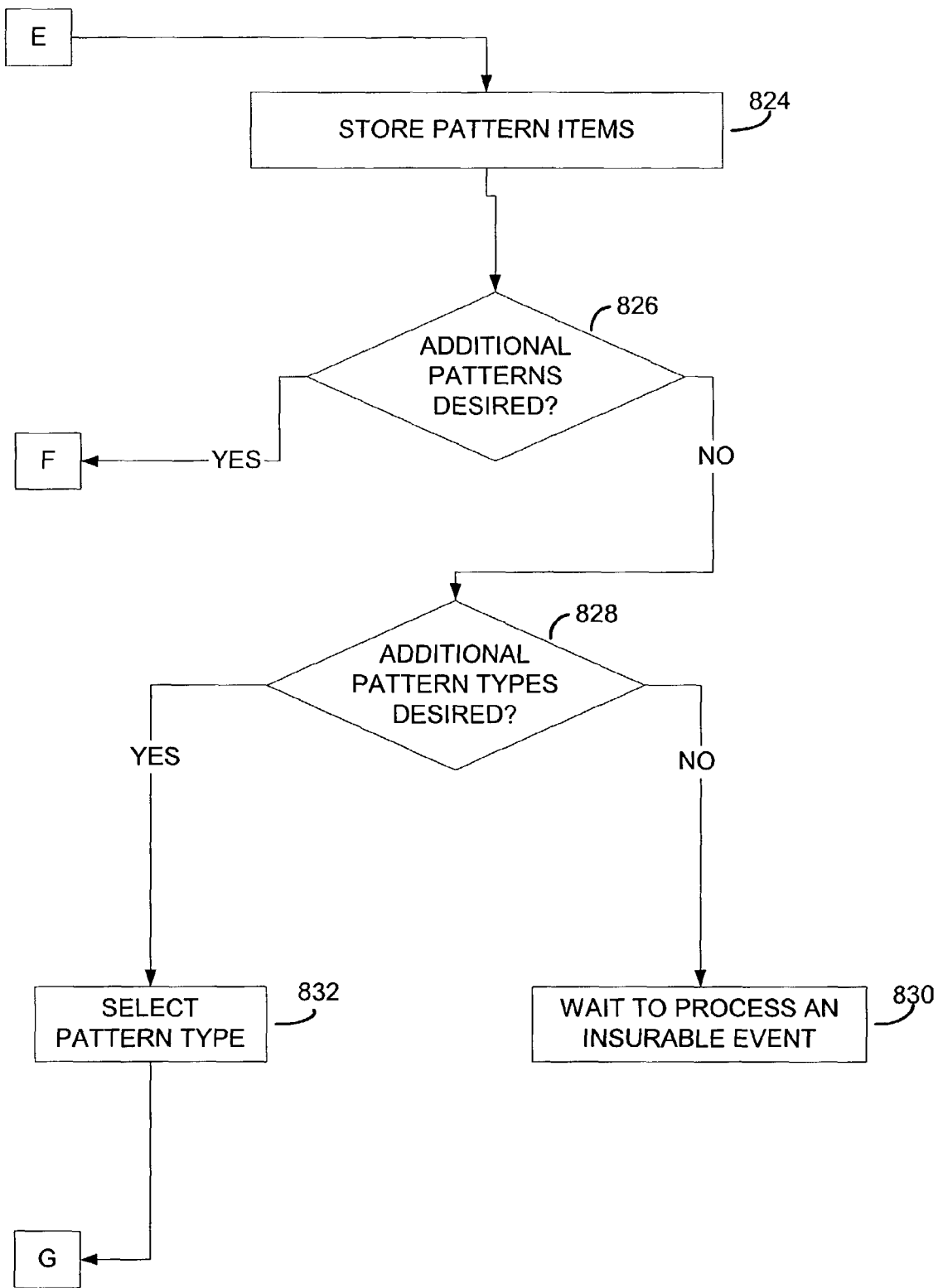
FIG. 9 is a second portion of the flow diagram illustrated in FIG. 8.

Referring now to FIG. 9, the pattern items forming a pattern 706 are stored in the pattern database 610 at block 824. At block 826, it is determined if additional patterns 706 within the pattern type 708 are desired. If yes, the operation returns to block 806 of FIG. 8 to identify another business condition and build another pattern 706 using characteristics 702 and collectives 704.

If no additional patterns 706 within the pattern type 708 are desired at block 826 of FIG. 9, it is determined if additional patterns 706 in other pattern types 708 are desired at block 828. If no, the pattern analyzer system 234 waits to process an insurable event at block 830. If patterns 706 are desired in other pattern types 708, a different pattern type 708 is selected at block 828, and the operation returns to block 806 of FIG. 8 to identify a business condition and build a corresponding pattern 706.

Figure 10:
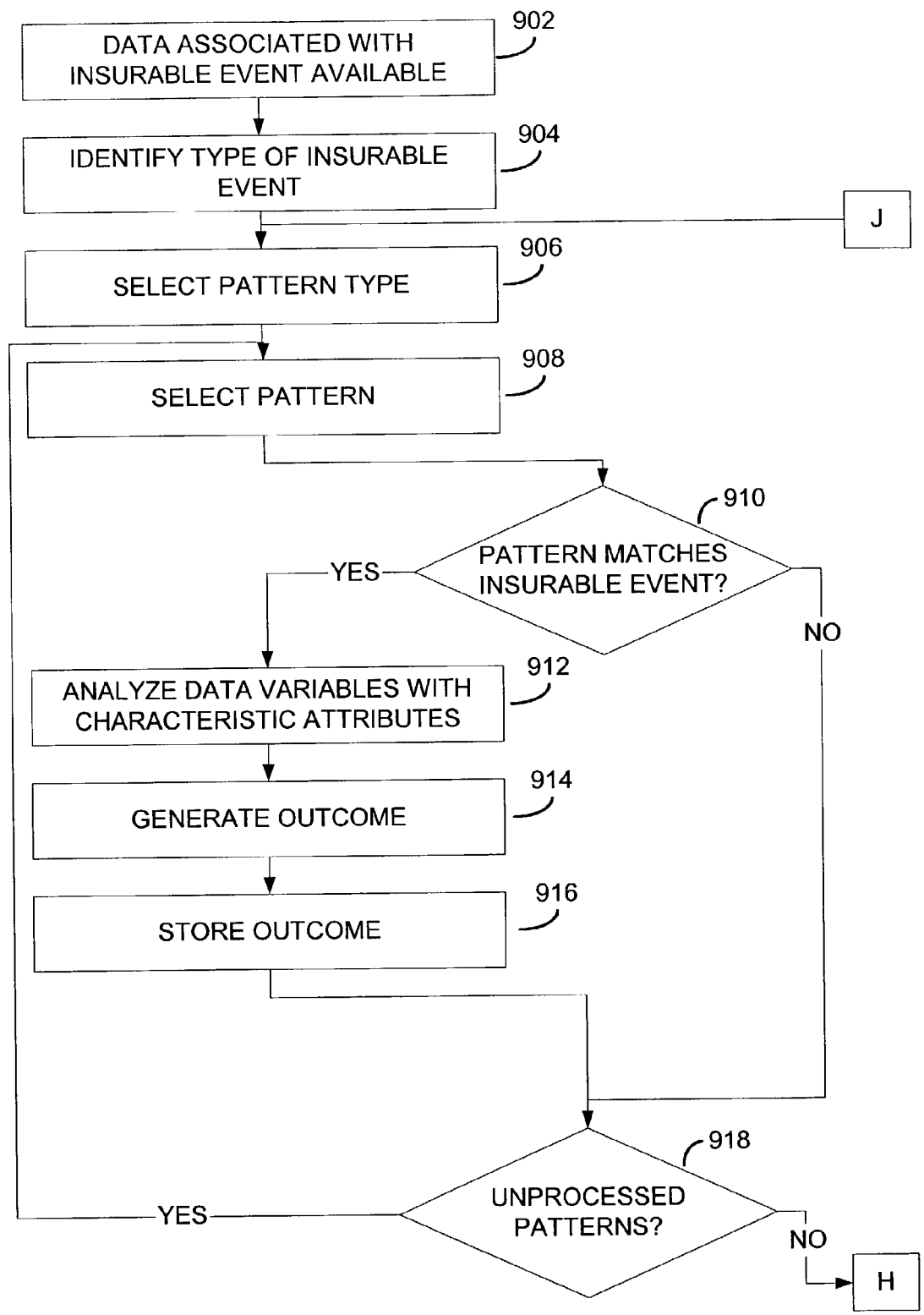
FIG. 10 is a process flow diagram illustrating example operation of the pattern analyzer system of FIG. 6 when data associated with an insurable event is processed.

FIG. 10 is a process flow diagram illustrating example operation of the pattern analyzer system 234 depicted in FIGS. 6 and 7 following configuration as described in FIG. 8. Operation of the pattern analyzer system 234 begins when data associated with an insurable event, such as an insurance claim, is made accessible to the pattern engine 602 at block 902. At block 904, the pattern engine 602 identifies the type of insurable event.

One of the determined pattern types 708 associated with the identified type of insurable event is selected by the pattern engine 602 at block 906. At block 908, one of the patterns 706 within the selected pattern type 708 is selected by the pattern engine 602. It is determined if the characteristics 702 defining the selected pattern 706 match the data associated with the insurable event at block 910. If yes, data variables within the segment of the insurable event (e.g. the matched data) are analyzed with the characteristic attributes associated with the characteristics 702 at block 912.

At block 914, the logic associated with the characteristics 702, characteristic categories 710, collectives 704, collective categories 712, etc. is processed to generate an outcome for the pattern 706. The outcome for the particular pattern 706 is stored in the results database 612 at block 916. At block 918, it is determined if additional unprocessed patterns 706 exist within the selected pattern type 708. Referring again to block 910, if the characteristics 702 defining the pattern 706 do not match the data associated with the insurable event, the operation proceeds directly to block 916 to determine if additional unprocessed patterns 706 exist within the selected pattern type 708. If additional patterns 706 do exist in the selected pattern type 708, the operation returns to block 908 to select one of the unprocessed patterns 706 to match to the insurable event.

Figure 11:
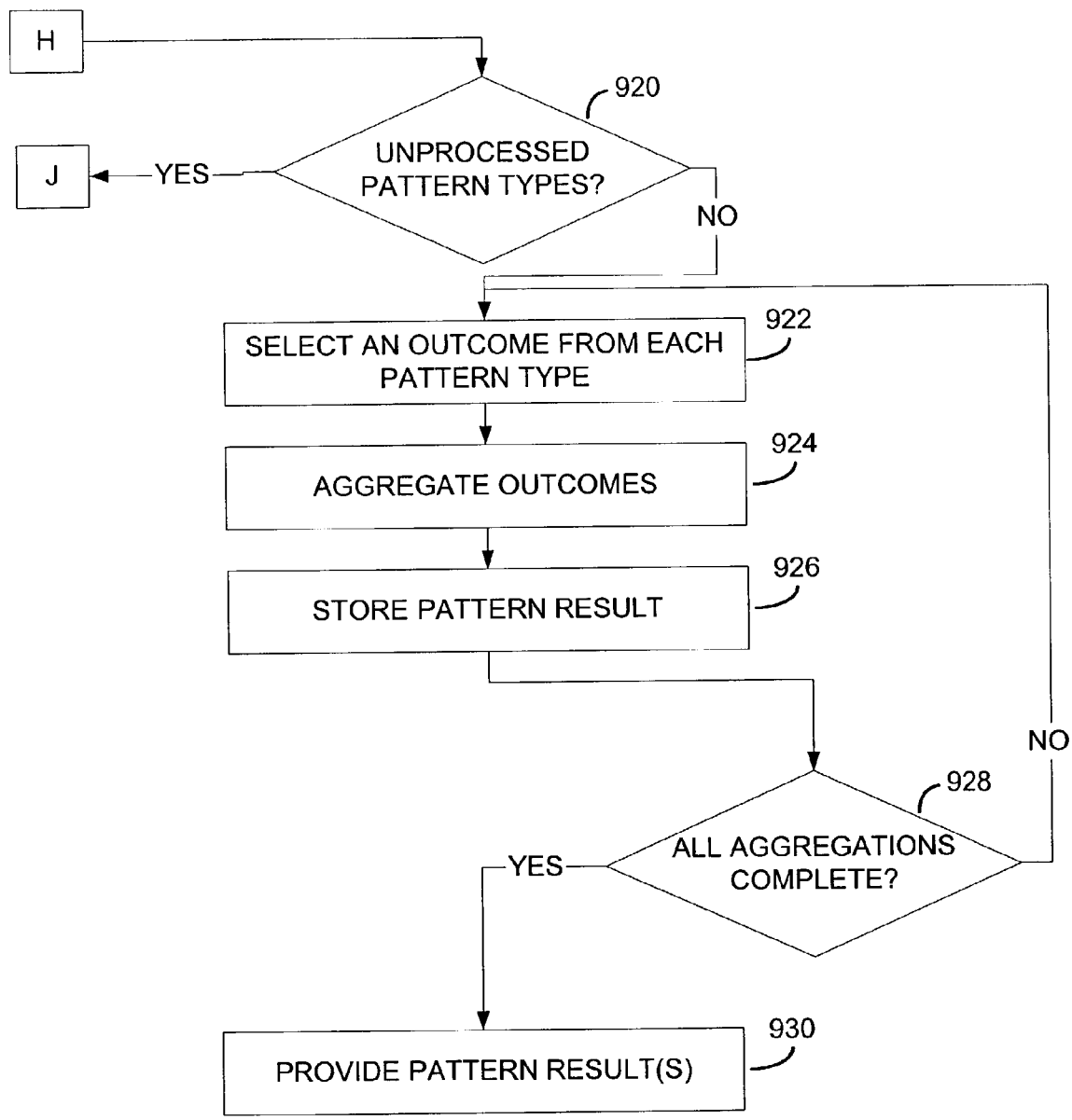
FIG. 11 is a second portion of the flow diagram illustrated in FIG. 10.

Referring now to FIG. 11, if there are no additional unprocessed patterns 706 in the pattern type 708, it is determined if there are additional unprocessed pattern types 708 associated with the type of insurable event at block 920. If there are additional unprocessed pattern types 708, the operation returns to block 906 of FIG. 10 to select an unprocessed pattern type 708 and process the associated pattern(s) 706. If there are no unprocessed pattern types 708 at block 920 of FIG. 11, the pattern engine 602 selects an outcome from one of the patterns 706 within each pattern type 708 at block 922.

At block 924, the outcomes are aggregated to produce a pattern result. The pattern result is stored in the results database 612 at block 926. At block 928, it is determined if all the possible aggregations of the different stored outcomes have been performed. If no, the operation returns to block 922 to sequentially select outcomes from each pattern type 708 that, when aggregated, result in a different pattern result. If all possible aggregations of the stored outcomes associated with the insurable event have been performed, the pattern engine 602 provides all the stored pattern results over the network 110 to, for example, the automated assignment system 100 at block 930.

The previously discussed pattern analyzer system 234 performs automated segmentation of insurable events based on user defined business rules. The rules may be developed and maintained with the maintenance module 606. Users of the pattern analyzer system 234 may define individual rules using characteristics 702 and/or collectives 704. The rules may be based on the expected data associated with an insurable event. Multiple rules may be logically combined to define patterns 706.

The rules may be executed by the pattern engine 602. The pattern engine 602 may attempt to match the characteristics 702 and/or collectives 704 grouped into patterns 706 to the data variables within data associated with insurable events in order to provide more accurate and efficient classification of the nature of the insurable event. The patterns 706 may be created to encapsulate the knowledge of experts, institutionalize best practices, capture situational complexity, provide flexibility, extensibility and precision, support macro/micro segmentation, and/or allow quantitative/qualitative attributes. Matching an insurable event to defined patterns 706 and aggregating the outcomes of the patterns 706 can, for example, provide a road map for the recommended tasks which should be performed to process the insurable event properly and efficiently.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for assigning at least a portion of an insured loss to an insurance claim processing organization comprising:

receiving, with a computer processor in communication with a memory, insurance claim data for an insurance claim, the insurance claim data including insurance claim data variables corresponding to the insurance claim;

determining, with the computer processor, matches between the insurance claim data variables and a plurality of predetermined insurance claim business rules based upon expected insurance claim data types corresponding to each of the predetermined insurance claim business rules;

segmenting, with the computer processor, the insurance claim data variables into a plurality of insurance claim data segments based upon the matches between the insurance claim data variables and the predetermined insurance claim business rules, a respective insurance claim data segment including an insurance claim pattern type, wherein the insurance claim pattern type includes at least one of a type of insurance claim pattern type and an insurance business condition pattern type, and the insurance claim pattern type including insurance claim characteristics;

matching, with the computer processor, each of the insurance claim characteristics in the insurance claim pattern type to a respective insurance claim data variable in the respective insurance claim data segment, each of the insurance claim characteristics including an insurance claim attribute and a claim characteristic attribute;

assigning, with the computer processor, a discrete value to the insurance claim attribute for each of the insurance claim characteristics, the assigned discrete value for a respective insurance claim characteristic based upon the matched insurance claim data variable and the claim characteristic attribute of the respective insurance claim characteristic, wherein the discrete value is descriptive of the matched insurance claim data variable;

grouping, with the computer processor, the insurance claim characteristics of the insurance claim pattern type to form insurance claim patterns within the insurance claim pattern type;

generating, with the computer processor, one or more insurance claim pattern outcomes for each of the one or more insurance claim patterns based upon the discrete value assigned to the insurance claim attribute of each of the one or more insurance claim characteristics;

storing, in the memory, the one or more insurance claim pattern outcomes for each of the one or more insurance claim patterns;

generating, with the computer processor, a first pattern result for the insurance claim pattern type based upon pattern analysis of a first selection of the one or more stored insurance claim pattern outcomes;

generating, with the computer processor, a second pattern result for the insurance claim pattern type based upon pattern analysis of a second selection of the one or more stored insurance claim pattern outcomes;

storing, in the memory, the first pattern result and the second pattern result in the memory as insurance claim pattern results; and assigning, with the computer processor, at least one target organizational entity to at least one portion of the insurance claim based upon a match between at least some of the insurance claim pattern results stored in the memory and an assignment template associated with the at least one target organization entity.

2. The method of claim 1, wherein assigning, with the computer processor, the at least one target organizational entity to the at least one portion of the insurance claim based upon the match between the at least some of the insurance claim pattern results stored in the memory and the assignment template associated with the at least one target organization entity comprises:

matching, with the computer processor, selection criteria in the assignment template to the at least some of the insurance claim pattern results stored in the memory.

3. The method of claim 1, wherein assigning the at least one target organizational entity to the at least one portion of the insurance claim comprises:

determining, with the computer processor, an assignability of the at least one targeted organizational entity to the at least one portion of the insurance claim to generate a target organizational entity availability indication;

detecting, with the computer processor, generation of a target organizational entity availability indication to assign the at least one target organizational entity to the at least one portion of the insurance claim; and assigning, with the computer processor, the at least one target organizational entity to the at least one portion of the insurance claim based on the generated target organizational entity availability indication.

4. The method of claim 1, further comprising:

detecting, with the computer processor, a failure to assign the at least one target organizational entity to the at least one portion of the insurance claim;

in response to the detected failure to assign the at least one target organizational entity to the insurance claim, identifying, with the computer processor, at least one target exception organizational entity based on the at least some of the insurance claim pattern results stored in the memory and the insurance claim data;

determining, with the computer processor, an assignability of the at least one target exception organizational entity to the at least one portion of the insurance claim; and assigning, with the computer processor, the at least one target exception organizational entity to the at least one portion of the insurance claim based on the determined assignability of the at least one target exception organizational entity.

5. The method of claim 4, the computer executable program code further comprising:

detecting, with the computer processor, a failure to assign the at least one target exception organizational entity to the at least one portion of the insurance claim;

identifying, with the computer processor, a default target organizational entity in response to the detected failure to assign the at least one target exception organizational entity to the at least one portion of the insurance claim; and assigning, with the computer processor, the at least one portion of the insurance claim to the default target organizational entity based on identification of the default target organizational entity.

6. The method of claim 1, further comprising:

allocating, with the computer processor, a management tracking credit for the insurance claim to an area of an insurance organization based on the assignment of the at least one portion of insurance claim to the at least one target organizational entity; and wherein the management tracking credit acknowledges assignment of the at least one portion of the insurance claim within the insurance organization.

7. The method of claim 1, further comprising:

aggregating, with the computer processor, based upon a logic based operation, at least some portion of the insurance claim pattern results stored in the memory to determine additional properties associated with the insurance claim, wherein the additional properties are stored as insurance claim pattern results in the memory.

8. The method of claim 1, wherein assigning, with the computer processor, the at least one target organizational entity to the at least one portion of the insurance claim based upon the match between the at least some of the insurance claim pattern results stored in the memory and the assignment template associated with the at least one target organization entity comprises:

assigning, with the computer processor, an importance rank to each of the insurance claim pattern results based upon relative importance factors; and identifying, with the computer processor, the at least one target organizational entity for the at least one portion of the insurance claim based upon the at least some of the insurance claim pattern results and the importance rank of at least some of the insurance claim pattern results.

9. The method of claim 8, wherein the relative importance factors include a financial impact of settlement of the insurance claim, an unwanted publicity factor associated with the insurance claim, and a customer satisfaction factor.

10. A tangible computer readable media comprising:

computer program code stored on the tangible computer readable media, the computer program code executable on a computer processor, wherein the computer program code includes:

an instruction to receive insurance claim data for an insurance claim, the insurance claim data including insurance claim data variables corresponding to the insurance claim;

an instruction to determine matches between the insurance claim data variables and a plurality of predetermined insurance claim business rules based upon expected insurance claim data types corresponding to each of the predetermined insurance claim business rules;

an instruction to segment the insurance claim data variables into a plurality of insurance claim data segments based upon the matches between the insurance claim data variables and the predetermined insurance claim business rules, a respective insurance claim data segment including an insurance claim pattern type, wherein the insurance claim pattern type includes at least one of a type of insurance claim pattern type and an insurance business condition pattern type, and the insurance claim pattern type including insurance claim characteristics;

an instruction to match each of the insurance claim characteristics in the insurance claim pattern type to a respective insurance claim data variable in the respective insurance claim data segment, each of the insurance claim characteristics including an insurance claim attribute and a claim characteristic attribute;

an instruction to assign a discrete value to the insurance claim attribute for each of the insurance claim characteristics, the assigned discrete value for a respective insurance claim characteristic based upon the matched insurance claim data variable and the claim characteristic attribute of the respective insurance claim characteristic, and wherein the discrete value is descriptive of the matched insurance claim data variable;

an instruction to group the insurance claim characteristics of the insurance claim pattern type to form insurance claim patterns within the insurance claim pattern type;

an instruction to generate one or more insurance claim pattern outcomes for each of the one or more insurance claim patterns based upon the discrete value assigned to the insurance claim attribute of each of the one or more insurance claim characteristics;

an instruction to store the one or more insurance claim pattern outcomes for each of the one or more insurance claim patterns;

an instruction to generate a first pattern result for the insurance claim pattern type based upon pattern analysis of a first selection of the one or more stored insurance claim pattern outcomes;

an instruction to generate a second pattern result for the insurance claim pattern type based upon pattern analysis of a second selection of the one or more stored insurance claim pattern outcomes;

an instruction to store the first pattern result and the second pattern result as insurance claim pattern results; and an instruction to assign at least one target organizational entity to at least one portion of the insurance claim based upon a match between at least some of the insurance claim pattern results and an assignment template associated with the at least one target organization entity.

11. The tangible computer readable media of claim 10, wherein the instruction to assign the at least one target organizational entity to the at least one portion of the insurance claim based upon the match between the at least some of the insurance claim pattern results and the assignment template associated with the at least one target organization entity comprises:

an instruction to match selection criteria in the assignment template to the at least some of the insurance claim pattern results.

12. The tangible computer readable media of claim 10, where the instruction to assign the at least one target organizational entity to the at least one portion of the insurance claim further comprises:

an instruction to determine an assignability of the at least one targeted organizational entity to the at least one portion of the insurance claim to generate a target organizational entity availability indication;

an instruction to detect generation of a target organizational entity availability indication to assign the at least one target organizational entity to the at least one portion of the insurance claim; and an instruction to assign the at least one target organizational entity to the at least one portion of the insurance claim based on the generated target organizational entity availability indication.

13. The tangible computer readable media of claim 10, further comprising:

an instruction to detect a failure to assign the at least one target organizational entity to the at least one portion of the insurance claim;

an instruction to identify, in response to the detected failure to assign the at least one target organizational entity to the insurance claim at least one target exception organizational entity based on the at least some of the insurance claim pattern results and the insurance claim data;

an instruction to determine an assignability of the at least one target exception organizational entity to the at least one portion of the insurance claim; and an instruction to assign the at least one target exception organizational entity to the at least one portion of the insurance claim based on the determined assignability of the at least one target exception organizational entity.

14. The tangible computer readable media of claim 13, the computer executable program code further comprising:

an instruction to detect failure to assign the at least one target exception organizational entity to the at least one portion of the insurance claim;

an instruction to identify a default target organizational entity in response to the detected failure to assign the at least one target exception organizational entity to the at least one portion of the insurance claim; and an instruction to assign the at least one portion of the insurance claim to the default target organizational entity based on identification of the default target organizational entity.

15. The tangible computer readable media of claim 12, further comprising:

an instruction to allocate a management tracking credit for the insurance claim to an area of an insurance organization based on the assignment of the at least one portion of insurance claim to the at least one target organizational entity; and wherein the management tracking credit acknowledges assignment of the at least one portion of the insurance claim within the insurance organization.

16. The tangible computer readable media of claim 10, further comprising:

an instruction to aggregate, with a logic based operation, at least some portion of the insurance claim pattern results to determine additional properties associated with the insurance claim, wherein the additional properties are stored as pattern results.

17. The tangible computer readable media of claim 10, wherein the instruction to assign the at least one target organizational entity to the at least one portion of the insurance claim based upon the match between the at least some of the insurance claim pattern results and the assignment template associated with the at least one target organization entity comprises:

29 an instruction to assign an importance rank to each of the insurance claim pattern results based upon relative importance factors; and an instruction to identify the at least one target organizational entity for the at least one portion of the insurance claim based upon the at least some of the insurance claim pattern results and the importance rank of at least some of the insurance claim pattern results.

18. The computer readable tangible media of claim 17, wherein the relative importance factors include a financial impact of settlement of the insurance claim, an unwanted publicity factor associated with the insurance claim, and a customer satisfaction factor.

19. A system for automated assignment of at least part of an insurance claim comprising:

a computer processor in communication with a memory, the computer processor configured to retrieve insurance claim data from the memory;

the computer processor further configured to segment the insurance claim data based upon a plurality of predetermined insurance business rules;

the computer processor further configured to associate a segment of the insurance claim data with an insurance claim pattern type, wherein the insurance claim pattern type includes a first insurance claim pattern and a second insurance claim pattern;

the computer processor further configured to assign first discrete information to the first insurance claim pattern for pattern analysis based upon the segment of the insurance claim data associated with the insurance claim pattern type;

the computer processor further configured to assign second discrete information to the second insurance claim pattern for pattern analysis based upon the segment of the insurance claim data associated with the insurance claim pattern type;

the computer processor further configured to generate a first insurance claim pattern outcome for the first insurance claim pattern based upon a first combination of the first discrete information assigned to the first insurance claim pattern;

the computer processor further configured to generate a second insurance claim pattern outcome for the first insurance claim pattern based upon a second combination the first discrete information assigned to the first insurance claim pattern;

the computer processor further configured to generate a first insurance claim pattern outcome for the second insurance claim pattern based on a first combination of the second discrete information;

the computer processor further configured to store the first insurance claim pattern outcome for the first insurance claim pattern, the second insurance claim pattern outcome for the first insurance claim pattern, and the first insurance claim pattern outcome for the second insurance claim pattern in the memory as stored insurance claim pattern outcomes associated with the insurance claim pattern type;

the computer processor further configured to generate a first insurance claim pattern result for the insurance claim pattern type based upon a first logical combination of a first selection of the stored insurance claim pattern outcomes;

the computer processor further configured to generate a second insurance claim pattern result for the insurance

30 claim pattern type based upon a second logical combination of a second selection of the stored insurance claim pattern outcomes;

the computer processor further configured to store the first insurance claim pattern result and the second insurance claim pattern result in association with the insurance claim pattern type in the memory; and the computer processor further configured to assign at least a portion of the insurance claim associated with the segment of insurance claim data to one or more target organizational entities based upon at least one of the first insurance claim pattern result, the second insurance claim pattern result, and a combination thereof.

20. The system of claim 19, wherein the processor is further configured to assign the at least a portion of the insurance claim associated with the segment of insurance claim data the one or more target organizational entities based upon the at least one of the first insurance claim pattern result, the second insurance claim pattern result, and the combination thereof, comprises:

the computer processor configured to match selection criteria in the assignment template to the at least some of the insurance claim pattern results stored in the memory.

21. The system of claim 19, further comprising:

the computer processor further configured to determine an assignability of each of the one or more targeted organizational entities to the portion of the insurance claim; and in response to determination that one or more of the target organization entities is available, the computer processor is further configured to assign an available target organizational entity to the at least a portion of the insurance claim.

22. The system of claim 19, further comprising:

in response to determination that all of the one or more target organization entities are unavailable for assignment to the portion of the insurance claim, the computer processor further configured to identify at least one target exception organizational entity based on at least one of the first insurance claim pattern result, the second insurance claim pattern result, and the insurance claim data, and a combination thereof;

the computer processor further configured to determine an assignability of the at least one identified target exception organizational entity to the at least a portion of the insurance claim; and in response to determination that the at least one identified target exception organizational entity is available, the computer processor further configured to assign the at least a portion of the insurance claim to the identified at least one target exception organizational entity.

23. The system of claim 22, further comprising:

in response to determination that the identified at least one target exception organizational entity is unavailable for assignment to the at least a portion of the insurance claim, the computer processor further configured to identify a default target organizational entity; and the computer processor further configured to assign the at least a portion of the insurance claim to the default target organizational entity based on identification of the default target organizational entity.

24. The system of claim 19, further comprising:

the computer processor further configured to allocate a management tracking credit for the at least a portion of the insurance claim to an area of an insurance organization based on the assignment of the at least a portion of the insurance claim to the one or more target organizational entities; and wherein the management tracking credit acknowledges assignment of the portion of the insurance claim within the insurance organization.

25. A tangible computer readable media comprising:

computer program code stored on the tangible computer readable media, the computer program code executable on a computer processor, wherein the computer program code includes:

an instruction to retrieve insurance claim data;

an instruction to segment the insurance claim data based upon a plurality of predetermined insurance business rules;

an instruction to associate a segment of the insurance claim data with an insurance claim pattern type, wherein the insurance claim pattern type includes a first insurance claim pattern and a second insurance claim pattern;

an instruction to assign first discrete information to the first insurance claim pattern for pattern analysis based upon the segment of the insurance claim data associated with the insurance claim pattern type;

an instruction to assign second discrete information to the second insurance claim pattern for pattern analysis based upon the segment of the insurance claim data associated with the insurance claim pattern type;

an instruction to generate a first insurance claim pattern outcome for the first insurance claim pattern based upon a logic based analysis of a first combination of the first discrete information;

an instruction to generate a second insurance claim pattern outcome for the first insurance claim pattern based upon a logic based analysis of a second combination of the first discrete information;

an instruction to generate a first insurance claim pattern outcome for the second insurance claim pattern based upon a logic based analysis of a first combination of the second discrete information;

an instruction to store the first insurance claim pattern outcome of the first insurance claim pattern, the second insurance claim pattern outcome of the first insurance claim pattern, and the first insurance claim pattern outcome of the second insurance claim pattern in the memory as stored insurance claim pattern outcomes associated with the insurance claim pattern type;

an instruction to pattern analyze a first combination of the stored insurance claim pattern outcomes to generate a first insurance claim pattern result for the insurance claim pattern type;

an instruction to pattern analyze a second combination of the stored insurance claim pattern outcomes to generate a second insurance claim pattern result for the pattern type;

an instruction to store the first pattern result and the second pattern result in association with the pattern type; and an instruction to assign at least a portion of the insurance claim to at least one target organizational entity based upon a combination of the first insurance claim pattern result and the second insurance claim pattern result.

26. The tangible computer readable media of claim 25, wherein assigning the at least one target organizational entity based upon the combination of the first insurance claim pattern result and the second insurance claim pattern result further comprises:

an instruction to identify the at least one target organizational entity based upon the combination of the first insurance claim pattern result and the second insurance claim pattern result.

27. The tangible computer readable media of the insurance claim of claim 25, further comprising:

an instruction to determine an assignability of the at least one targeted organizational entity to the insurance claim to generate a target organizational entity availability indication;

an instruction to detect generation of a target organizational entity availability indication to assign the at least one target organizational entity to the insurance claim; and an instruction to assign, in response to detection of the generation of the target organization entity availability indication, the at least one target organizational entity to the insurance claim based on the generated target organizational entity availability indication.

28. The tangible computer readable media of claim 27, further comprising:

an instruction to detect a failure to assign the at least one target organizational entity to the insurance claim;

an instruction to identify in response to detection of the failure to assign the at least one target organization entity to the insurance claim, at least one target exception organizational entity based on at least one of the first insurance claim pattern result, the second insurance claim pattern result, and the insurance claim data;

an instruction to determine an assignability of the at least one target exception organizational entity to the insurance claim; and an instruction to assign the at least one target exception organizational entity to the at least a portion of the insurance claim based on the determined assignability of the at least one target exception organizational entity.

29. The tangible computer readable media of claim 25, further comprising:

an instruction to detect a failure to assign the at least one target exception organizational entity to the insurance claim;

an instruction to identify, in response to detection of the failure to assign the at least one target exception organizational entity to the insurance claim, identifying a default target organizational entity to the insurance claim; and an instruction to assign the insurance claim to the default target organizational entity based upon identification of the default target organizational entity.

30. The tangible computer readable media of claim 25, further comprising:

an instruction to allocate a management tracking credit for the insurance claim to an area of an insurance organization based on the assignment of the at least a portion of the insurance claim to the at least one target organizational entity; and wherein the management tracking credit acknowledges assignment of the portion of the insurance claim within the insurance organization.

31. A system for assigning at least portions of an insurance claim to an organization comprising:

a computer processor in communication with a memory, the processor configured to receive insurance claim data for the insurance claim, the insurance claim data including insurance claim data variables corresponding to the insurance claim;

the computer processor further configured to determine matches between the insurance claim data variables and a plurality of predetermined insurance claim business rules based upon expected insurance claim data types corresponding to each of the predetermined insurance claim business rules;

the computer processor further configured to segment the insurance claim data variables into a plurality of insurance claim data segments based upon the matches between the insurance claim data variables and the predetermined insurance claim business rules, a respective insurance claim data segment including an insurance claim pattern type, wherein the insurance claim pattern type includes at least one of a type of insurance claim pattern type and an insurance business condition pattern type, and the insurance claim pattern type including insurance claim characteristics;

the computer processor further configured to match each of the insurance claim characteristics in the insurance claim pattern type to a respective insurance claim data variable in the respective insurance claim data segment, each of the insurance claim characteristics including an insurance claim attribute and a claim characteristic attribute;

the computer processor further configured to assign a discrete value to the insurance claim attribute for each of the insurance claim characteristics, the assigned discrete value for a respective insurance claim characteristic based upon the matched insurance claim data variable and the claim characteristic attribute of the respective insurance claim characteristic, wherein the discrete value is descriptive of the matched insurance claim data variable;

the computer processor further configured to group the insurance claim characteristics of the insurance claim pattern type to form insurance claim patterns within the insurance claim pattern type;

the computer processor further configured to generate one or more insurance claim pattern outcomes for each of the one or more insurance claim patterns based upon the discrete value assigned to the insurance claim attribute of each of the one or more insurance claim characteristics;

the computer processor further configured to store the one or more insurance claim pattern outcomes for each of the one or more insurance claim patterns;

the computer processor further configured to generate a first pattern result for the insurance claim pattern type based upon pattern analysis of a first selection of the one or more stored insurance claim pattern outcomes;

the computer processor further configured to generate a second pattern result the insurance claim pattern type based upon pattern analysis of a second selection of the one or more stored insurance claim pattern outcomes;

the computer processor further configured to store the first pattern result and the second pattern results in the memory as insurance claim pattern results; and the computer processor further configured to assign at least one target organizational entity to at least one portion of the insurance claim based upon a match between at least some of the insurance claim pattern results stored in the memory and an assignment template associated with the at least one target organization entity.

32. The system of claim 31, wherein the computer processor is further configured to assign the at least one target organizational entity to the at least one portion of the insurance claim based upon the match between the at least some of the insurance claim pattern results stored in the memory and the assignment template associated with the at least one target organization entity comprises:

the computer processor further configured to match selection criteria in the assignment template to the at least some of the insurance claim pattern results stored in the memory.

33. The system of claim 31, further comprising:

the computer processor further configured to determine an assignability of the at least one targeted organizational entity to the at least one portion of the insurance claim to generate a target organizational entity availability indication;

the computer processor further configured to detect generation of a target organizational entity availability indication to assign the at least one target organizational entity to the at least one portion of the insurance claim; and the computer processor further configured to assign the at least one target organizational entity to the at least one portion of the insurance claim based on the generated target organizational entity availability indication.

34. The system of claim 31, further comprising:

the computer processor further configured to detect, with the processor, a failure to assign the at least one target organizational entity to the at least one portion of the insurance claim;

the computer processor further configured to identify, in response to the detected failure to assign the at least one target organizational entity to the insurance claim, with the processor, at least one target exception organizational entity based on the at least some of the insurance claim pattern results stored in the memory and the insurance claim data;

the computer processor further configured to determine an assignability of the at least one target exception organizational entity to the at least one portion of the insurance claim; and the computer processor further configured to assign the at least one target exception organizational entity to the at least one portion of the insurance claim based on the determined assignability of the at least one target exception organizational entity.

35. The system of claim 34, further comprising:

the computer processor further configured to detect failure to assign the at least one target exception organizational entity to the at least one portion of the insurance claim;

the computer processor further configured to identify, with the processor, a default target organizational entity in response to the detected failure to assign the at least one target exception organizational entity to the at least one portion of the insurance claim; and the computer processor further configured to assign the at least one portion of the insurance claim to the default target organizational entity based on identification of the default target organizational entity.

36. The system of claim 31, further comprising:

the computer processor further configured to allocate a management tracking credit for the insurance claim to an area of an insurance organization based on the assignment of the at least one portion of insurance claim to the at least one target organizational entity; and wherein the management tracking credit acknowledges assignment of the at least one portion of the insurance claim within the insurance organization.

37. The system of claim 34, further comprising:
the computer processor further configured to determine additional properties associated with the insurance claim based upon aggregation of at least some portion of the insurance claim pattern results stored in the memory.

38. The system of claim 31, the computer processor further configured to assign the at least one target organizational entity to the at least one portion of the insurance claim based upon the match between the at least some of the insurance claim pattern results stored in the memory and the assignment template associated with the at least one target organization entity comprises:
the computer processor further configured to assign an importance rank to each of the insurance claim pattern results based upon relative importance factors; and
the computer processor further configured to identify the at least one target organizational entity for the at least one portion of the insurance claim based upon the at least some of the insurance claim pattern results stored in the memory and the importance rank of at least some of the insurance claim pattern results.

39. The system of claim 38, wherein the relative importance factors include a financial impact of settlement of the insurance claim, an unwanted publicity factor associated with the insurance claim, and a customer satisfaction factor.

* * * * *

UNITED STATES PATENT AND TRADEMARK OFFICE
CERTIFICATE OF CORRECTION

| | | |
|---|---|---|
| PATENT NO. | : 8,126,742 B2 | Page 1 of 1 |
| APPLICATION NO. | : 10/434827 | |
| DATED | : February 28, 2012 | |
| INVENTOR(S) | : William E. Bond, Jr. et al. | |

It is certified that error appears in the above-identified patent and that said Letters Patent is hereby corrected as shown below:

On Page 9, Column 1

Change "Redacted version of Opening Brief in Support of Motion for Summary Judgment (Partial) of filed January 8, 2010, in lawsuit asserting U.S. Patent No. 7,013,284 B2, captioned *Accenture Global Services GmbH, et al. v. Guidewire Software, Inc.*, Case No. 07cv826, D. Del. December 18, 2007. 75 pages. (Dkt. No. 393)." to --Redacted version of Opening Brief in Support of Motion for Summary Judgment (Partial) of Invalidity of '284 Patent because of an On-Sale Bar, filed January 8, 2010, in lawsuit asserting U.S. Patent No. 7,013,284 B2, captioned *Accenture Global Services GmbH, et al. v. Guidewire Software, Inc.*, Case No. 07cv826, D. Del. 12/18/07. 75 pages. (Dkt. No. 393).--

On Page 10, Column 2

Change "Stipulation and Order to Amend Answer and Counterclaims filed Sep. 13, 2010, in lawsuit asserting U.S. Patent No. 7,617,240, captioned *Accenture Global Services GmbH, et al. v. Guidewire Software, Inc.*, Case No. 07cv826, D. Del. Dec. 18, 2007. 46 pages. (Dkt. No. 47)." to --Stipulation and Order to Amend Answer and counterclaims filed September 13, 2010, in lawsuit asserting U.S. Patent No. 7,617,240, captioned *Accenture Global Services GmbH, et al. v. Guidewire Software, Inc.*, Case No. 09cv848, D. Del. 11/10/09. 46 pages. (Dkt. No. 47).--

In the Specification

Column 8, Line 16, delete "a" before --manually--.

Signed and Sealed this
First Day of May, 2012

David J. Kappos
*Director of the United States Patent and Trademark Office*